United States Patent
Fergason

(10) Patent No.: US 7,352,347 B2
(45) Date of Patent: *Apr. 1, 2008

(54) OPTICAL DISPLAY SYSTEM AND METHOD, ACTIVE AND PASSIVE DITHERING USING BIREFRINGENCE, COLOR IMAGE SUPERPOSITIONING AND DISPLAY ENHANCEMENT WITH PHASE COORDINATED POLARIZATION SWITCHING

(75) Inventor: James L. Fergason, Menlo Park, CA (US)

(73) Assignee: Fergason Patent Properties, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,403

(22) Filed: Nov. 8, 2004

(65) Prior Publication Data

US 2005/0093796 A1 May 5, 2005

Related U.S. Application Data

(63) Continuation of application No. 09/676,915, filed on Oct. 2, 2000, now Pat. No. 6,816,141, which is a continuation of application No. 08/817,846, filed as application No. PCT/US95/13722 on Oct. 25, 1995, now Pat. No. 6,184,969, which is a continuation-in-part of application No. 08/398,292, filed on Mar. 3, 1995, now Pat. No. 5,715,029, which is a continuation-in-part of application No. 08/392,055, filed on Feb. 22, 1995, now Pat. No. 5,572,341, which is a continuation-in-part of application No. 08/328,375, filed on Oct. 25, 1994, now Pat. No. 5,537,256.

(60) Provisional application No. 60/001,972, filed on Jul. 23, 1995.

(30) Foreign Application Priority Data

Oct. 25, 1995 (US) .................................. 95/13722

(51) Int. Cl.
*G09G 3/36* (2006.01)

(52) U.S. Cl. .......................... 345/89; 345/88; 345/102; 345/690

(58) Field of Classification Search ............ 345/87–89, 345/102, 204, 690
See application file for complete search history.

(56) References Cited

U.S. PATENT DOCUMENTS 2,885,551 A 5/1959 Greanias (Continued)

FOREIGN PATENT DOCUMENTS

AU 579534 11/1988

(Continued)

OTHER PUBLICATIONS

Asia Display '95; A Practical Wobbling Device Using Ferroelectric Liquid Crystals for Realizing High Resolution Projectors, pp. 79-81.

* cited by examiner

*Primary Examiner*—Regina Liang
(74) *Attorney, Agent, or Firm*—Renner, Otto, Boisselle & Sklar, LLP

(57) ABSTRACT

A display apparatus includes a passive display, a light source, and a video signal input, in operation in response to a video signal the passive display modulates light from the light source to provide an image, and the intensity of the light source is controlled by the video signal.

A method of producing a displayed image using a passive display illuminated by a light source is characterized in controlling the light source to obtain a displayed image with a desired amount of information, gray scale and/or color characteristics.

A method of reducing power consumption by a display system in which a light modulating display modulates incident light from a light source to provide images is characterized in controlling power provided to the light source to reduce output thereof for relatively dark images.

23 Claims, 26 Drawing Sheets

U.S. PATENT DOCUMENTS

| | | | |
|---|---|---|---|
| 3,329,474 A | 7/1967 | Harris et al. |
| 3,375,052 A | 3/1968 | Kosanke |
| 3,428,743 A | 2/1969 | Hanlon |
| 3,439,348 A | 4/1969 | Harris et al. |
| 3,499,700 A | 3/1970 | Harris et al. |
| 3,503,670 A | 3/1970 | Kosanke et al. |
| 3,554,632 A | 1/1971 | Chitayat |
| 3,854,793 A | 12/1974 | Kahn |
| 4,012,116 A | 3/1977 | Yevick |
| 4,090,219 A | 5/1978 | Ernstoff et al. |
| 4,097,128 A | 6/1978 | Matsumoto et al. |
| 4,110,794 A | 8/1978 | Lester |
| 4,114,990 A | 9/1978 | Mash et al. |
| 4,385,806 A | 5/1983 | Fergason |
| 4,410,238 A | 10/1983 | Hanson |
| 4,436,376 A | 3/1984 | Fergason |
| 4,468,703 A | 8/1984 | Fujiwara et al. |
| 4,516,837 A | 5/1985 | Soref et al. |
| 4,540,243 A | 9/1985 | Fergason |
| 4,582,396 A | 4/1986 | Bos et al. |
| 4,611,889 A | 9/1986 | Buzak |
| 4,648,691 A | 3/1987 | Oguchi et al. |
| 4,649,425 A | 3/1987 | Pund |
| RE32,521 E | 10/1987 | Fergason |
| 4,719,507 A | 1/1988 | Bos |
| 4,755,038 A | 7/1988 | Baker |
| 4,760,389 A | 7/1988 | Aoki |
| 4,834,500 A | 5/1989 | Hilsum et al. |
| 4,910,413 A | 3/1990 | Tamune |
| 4,917,452 A | 4/1990 | Liebowitz |
| 4,923,286 A | 5/1990 | Grupp |
| 4,958,915 A | 9/1990 | Okada et al. |
| 4,969,717 A | 11/1990 | Mallinson |
| 4,991,924 A | 2/1991 | Shankar et al. |
| 4,997,263 A | 3/1991 | Cohen et al. |
| 5,012,274 A | 4/1991 | Dolgoff |
| 5,013,140 A | 5/1991 | Healey et al. |
| 5,074,647 A | 12/1991 | Fergason et al. |
| 5,083,199 A | 1/1992 | Borner |
| 5,093,652 A | 3/1992 | Bull et al. |
| 5,122,791 A | 6/1992 | Gibbons |
| 5,128,782 A | 7/1992 | Wood |
| 5,138,449 A | 8/1992 | Kerpchar |
| 5,143,433 A * | 9/1992 | Farrell ..................... 345/102 |
| 5,144,292 A | 9/1992 | Shiraishi et al. |
| 5,162,785 A | 11/1992 | Fagard |
| 5,164,829 A | 11/1992 | Wada |
| 5,187,603 A | 2/1993 | Bos |
| 5,206,633 A | 4/1993 | Zalph |
| 5,221,982 A | 6/1993 | Faris |
| 5,295,009 A | 3/1994 | Barnik et al. |
| 5,300,942 A | 4/1994 | Dolgoff |
| 5,305,146 A | 4/1994 | Nakagaki et al. |
| 5,311,217 A | 5/1994 | Guerin |
| 5,313,225 A | 5/1994 | Miyadera |
| 5,315,695 A | 5/1994 | Saito et al. |
| 5,317,400 A | 5/1994 | Gurley et al. |
| 5,319,478 A | 6/1994 | Funfschilling et al. |
| 5,325,218 A | 6/1994 | Willett et al. |
| 5,357,369 A | 10/1994 | Pilling et al. |
| 5,359,345 A | 10/1994 | Hunter |
| 5,369,266 A | 11/1994 | Nohda et al. |
| 5,398,038 A | 3/1995 | Hoashi |
| 5,416,496 A | 5/1995 | Wood |
| 5,422,680 A | 6/1995 | Lagoni et al. |
| 5,436,755 A | 7/1995 | Guerin |
| 5,485,172 A * | 1/1996 | Sawachika et al. ......... 345/102 |
| 5,519,524 A | 5/1996 | Fergason et al. |
| 5,532,854 A | 7/1996 | Fergason |
| 5,537,256 A | 7/1996 | Fergason |
| 5,572,341 A | 11/1996 | Fergason |
| 5,606,458 A | 2/1997 | Fergason |
| 5,617,112 A | 4/1997 | Yoshida et al. |
| 5,621,572 A | 4/1997 | Fergason |
| 5,689,283 A | 11/1997 | Shirochi |
| 5,715,029 A | 2/1998 | Fergason |
| 5,717,422 A | 2/1998 | Fergason |
| 5,764,287 A | 6/1998 | Tatsumi |
| 5,858,589 A | 1/1999 | Govaert et al. |
| 5,907,358 A | 5/1999 | Tatsumi |
| 6,111,559 A | 8/2000 | Motomura et al. |
| 6,184,969 B1 | 2/2001 | Fergason |
| 6,233,389 B1 | 5/2001 | Barton et al. |
| 6,268,843 B1 | 7/2001 | Arakawa |
| 6,448,944 B2 | 9/2002 | Ronzani et al. |
| 6,519,410 B1 | 2/2003 | Okada et al. |
| 6,519,772 B1 | 2/2003 | Bopardikar |
| 6,714,337 B1 | 3/2004 | Amm |
| 6,816,141 B1 | 11/2004 | Fergason |

FOREIGN PATENT DOCUMENTS

| | | |
|---|---|---|
| EP | 0606162 A2 | 7/1994 |
| EP | 0 730 371 A2 | 9/1996 |
| EP | 0 730 371 A3 | 9/1996 |
| FR | 2611389 A | 2/1987 |
| GB | 2033602 | 5/1980 |
| JP | 5573023 | 6/1980 |
| JP | 56114931 | 9/1981 |
| JP | 58142315 | 8/1983 |
| JP | 60083486 | 5/1985 |
| JP | 1985-125891 | 7/1985 |
| JP | 6247623 | 3/1987 |
| JP | 62231221 | 10/1987 |
| JP | 6313018 | 1/1988 |
| JP | 01-98383 | 7/1989 |
| JP | 3-179886 A | 12/1989 |
| JP | 039320 | 1/1991 |
| JP | 3-071111 | 3/1991 |
| JP | 1991-179886 | 8/1991 |
| JP | 03249730 | 11/1991 |
| JP | 1991-125333 | 12/1991 |
| JP | 1991-288885 | 12/1991 |
| JP | 3288885 | 12/1991 |
| JP | 04-113308 | 4/1992 |
| JP | 1993-66501 | 3/1993 |
| JP | 5-80717 | 4/1993 |
| JP | 5-127608 | 5/1993 |
| JP | 1993-188345 | 7/1993 |
| JP | 5-241525 | 9/1993 |
| JP | 05-289044 | 2/1994 |
| JP | 6-82846 | 3/1994 |
| JP | 6-102484 | 4/1994 |
| JP | 6102484 | 4/1994 |
| JP | 6-160811 | 6/1994 |
| JP | 6-161383 | 6/1994 |
| JP | 7-129113 A | 5/1995 |
| JP | 1995-129113 | 5/1995 |
| WO | WO 93/15497 | 8/1993 |
| WO | WO 9410675 | 5/1994 |

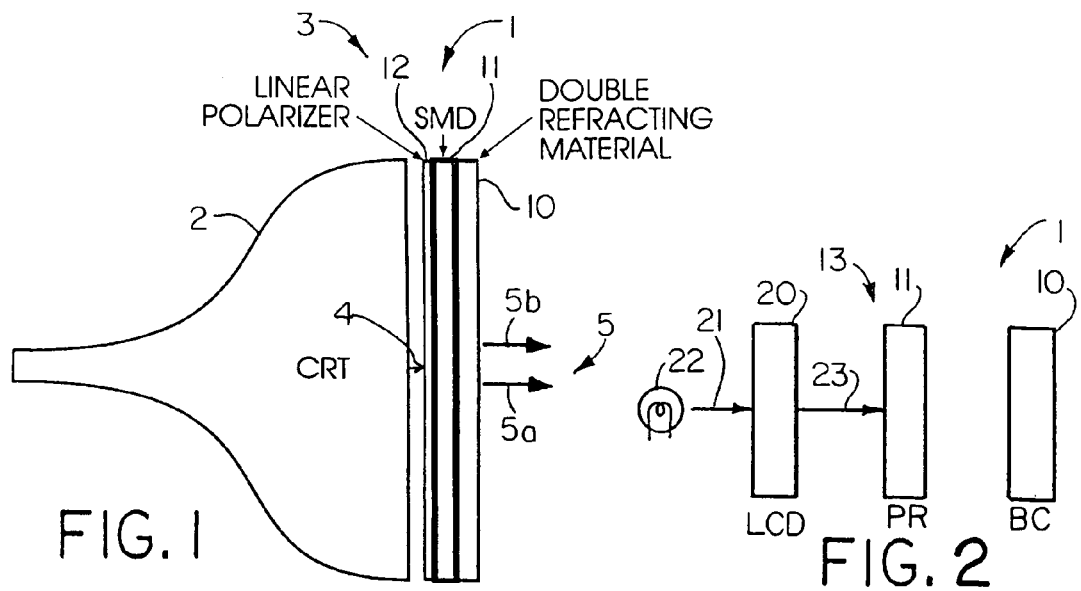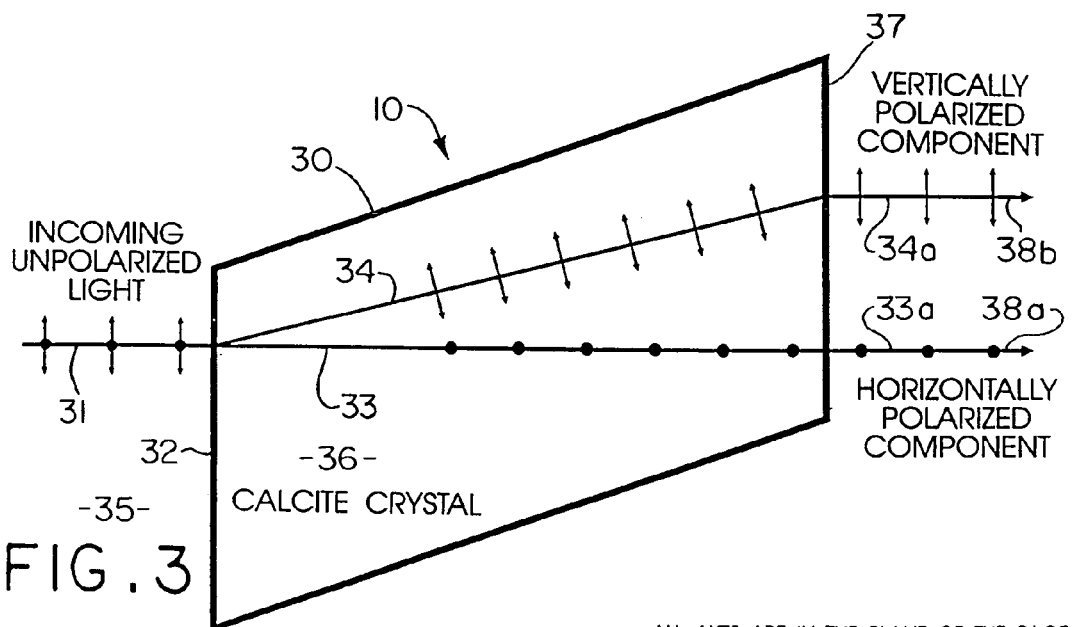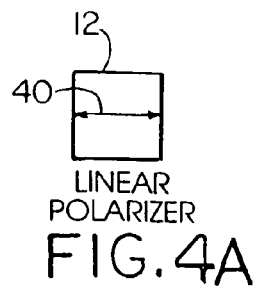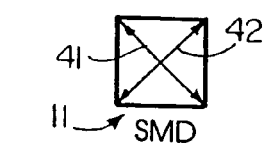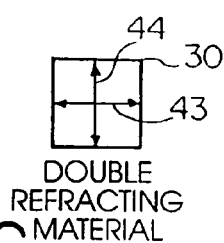

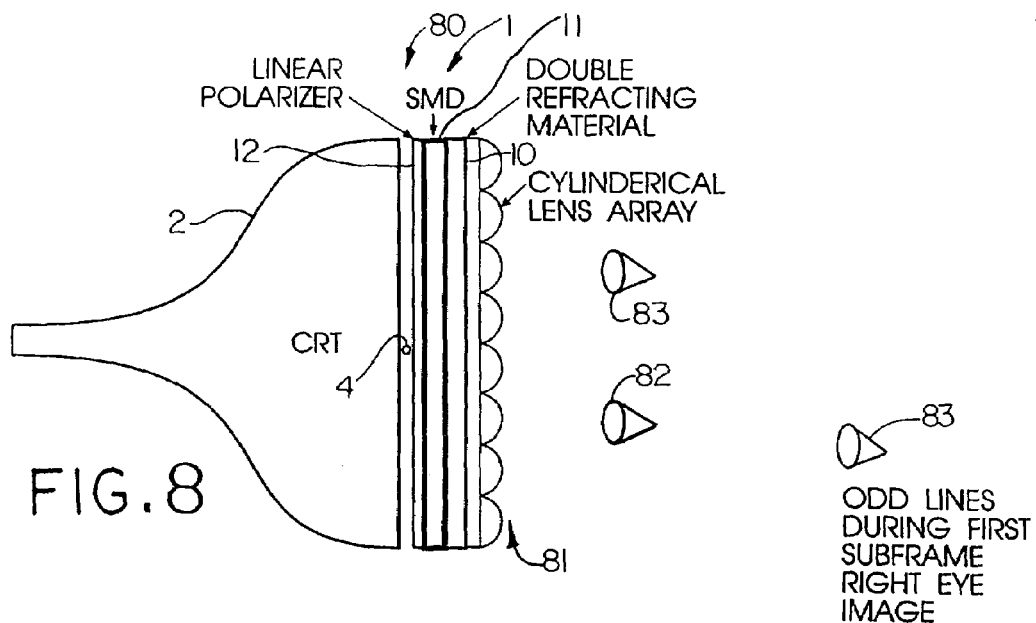
FIG. 8
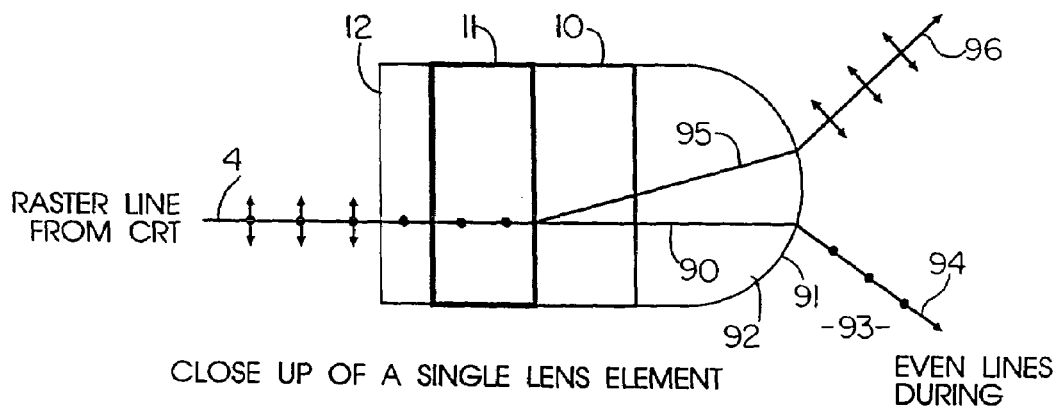
CLOSE UP OF A SINGLE LENS ELEMENT
FIG. 9
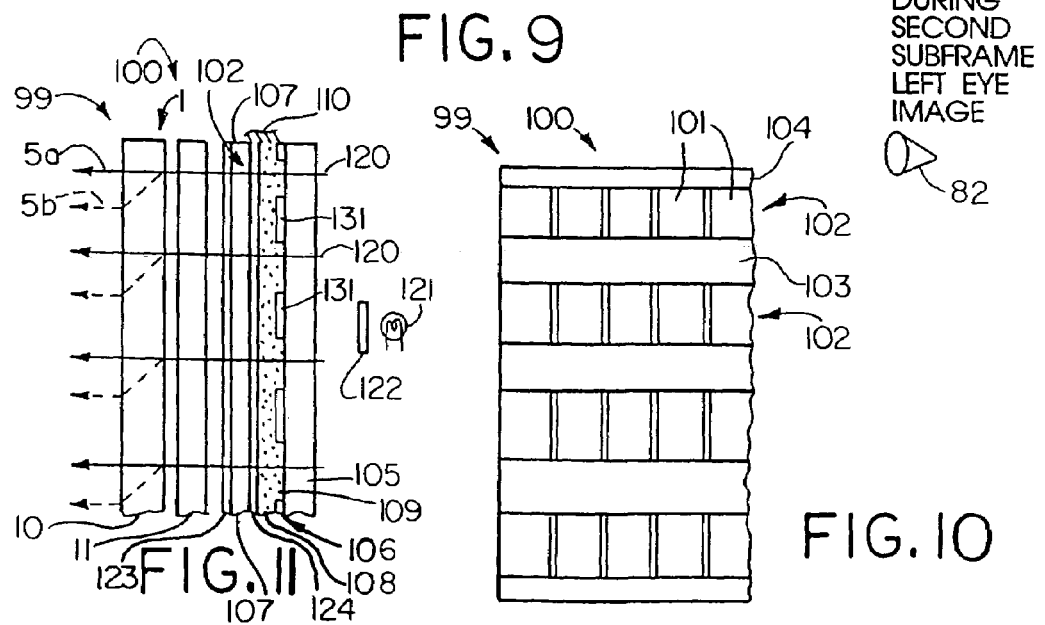
FIG. 11
FIG. 10

ONE POSSIBLE SET OF ORIENTATIONS FOR THE AXES OF THE UNENERGIZED COMPONENTS

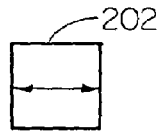
LINEAR POLARIZER TRANSMISSION AXIS HORIZONTAL
FIG.15A

SMD VARIABLE RETARDER #1 OPTIC AXIS AT −45°
FIG.15B

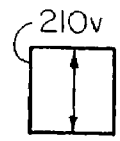
DOUBLE REFRACTING LAYER #1 OPTIC AXIS VERTICAL
FIG.15C

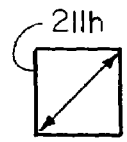
SMD VARIABLE RETARDER #2 OPTIC AXIS AT +45°
FIG.15D

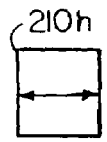
DOUBLE REFRACTING LAYER #2 OPTIC AXIS HORIZONTAL
FIG.15E

FIRST SUB-FRAME   SMD #1 HIGH VOLTAGE   SMD #2 HIGH VOLTAGE

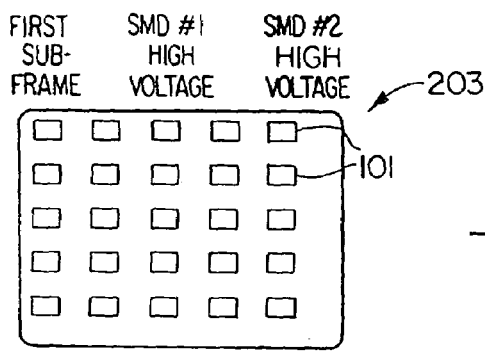

FIG.16A

SECOND SUB-FRAME   SMD #1 HIGH VOLTAGE   SMD #2 LOW VOLTAGE

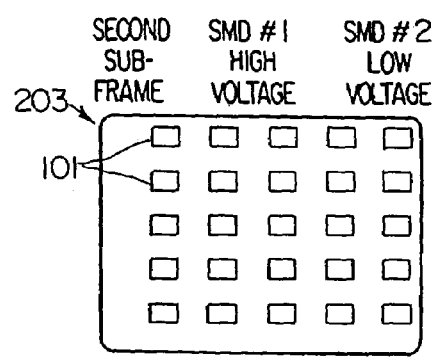

FIG.16B

FOURTH SUB-FRAME   SMD #1 HIGH VOLTAGE   SMD #2 LOW VOLTAGE

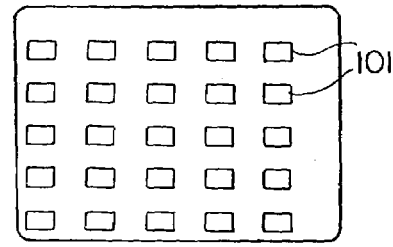

FIG.16D

THIRD SUB-FRAME   SMD #2 LOW VOLTAGE   SMD #1 LOW VOLTAGE

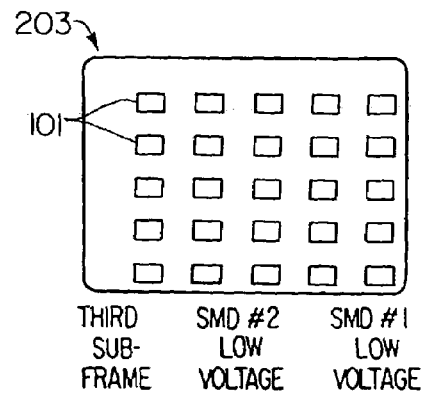

FIG.16C

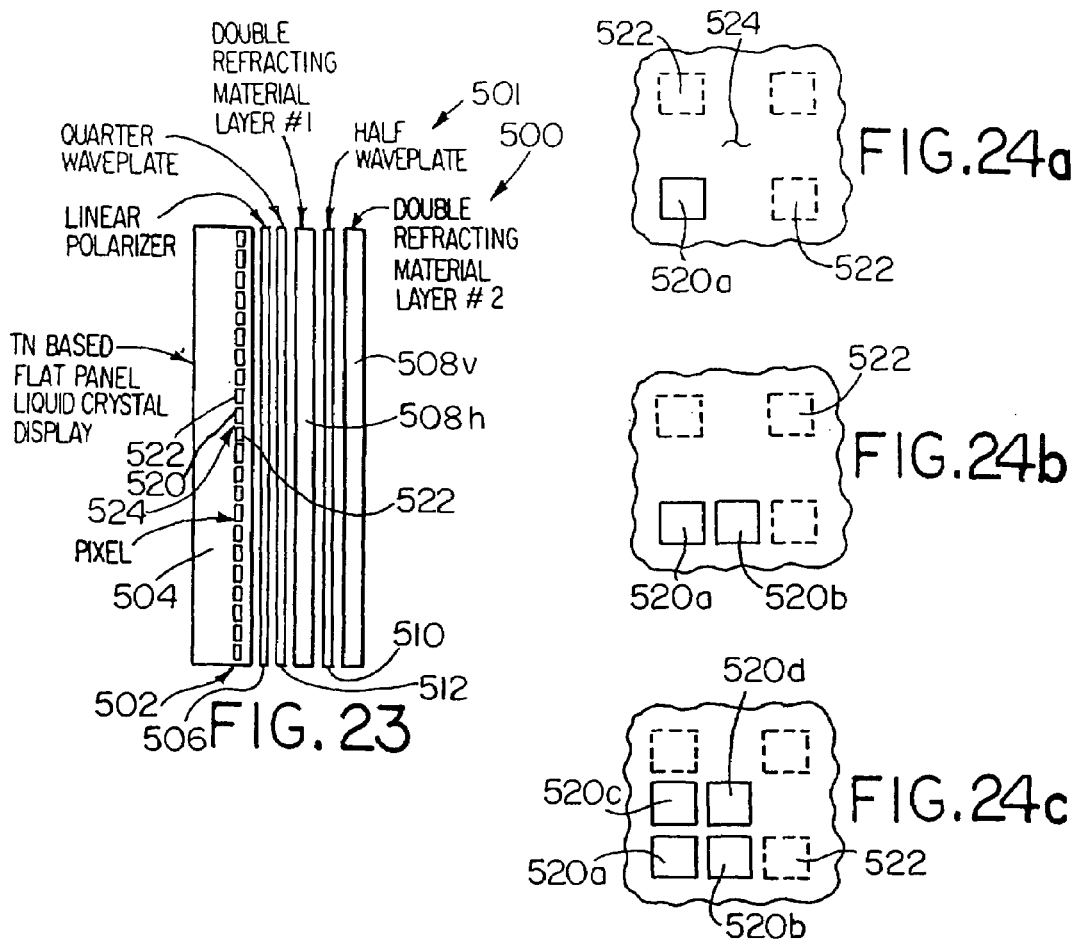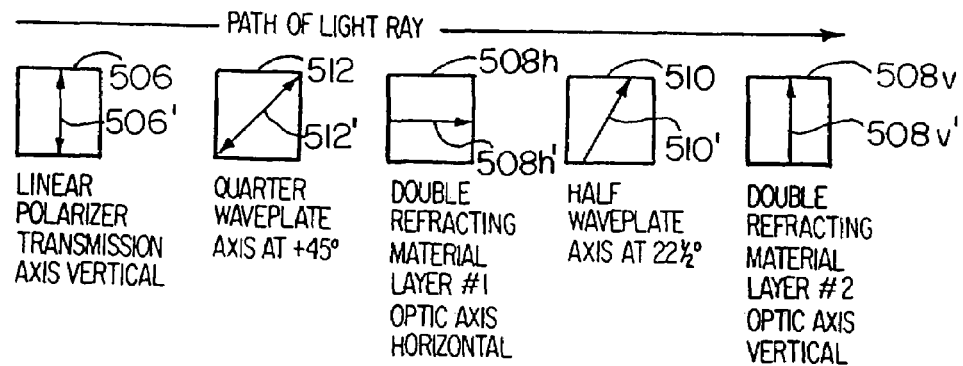

THE APPEARANCE AND POLARIZATION OF THE PIXEL AT VARIOUS POINTS ALONG THE PATH OF THE LIGHT RAY

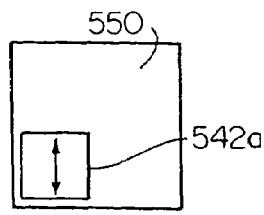
FIG.30a
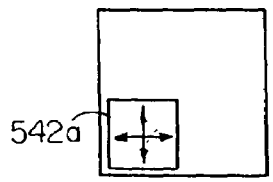
FIG.30b
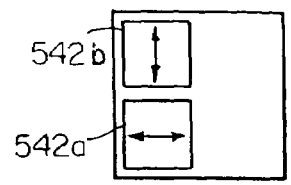
FIG.30c
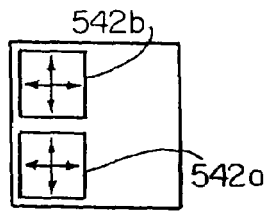
FIG.30d
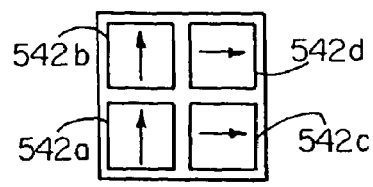
FIG.30e
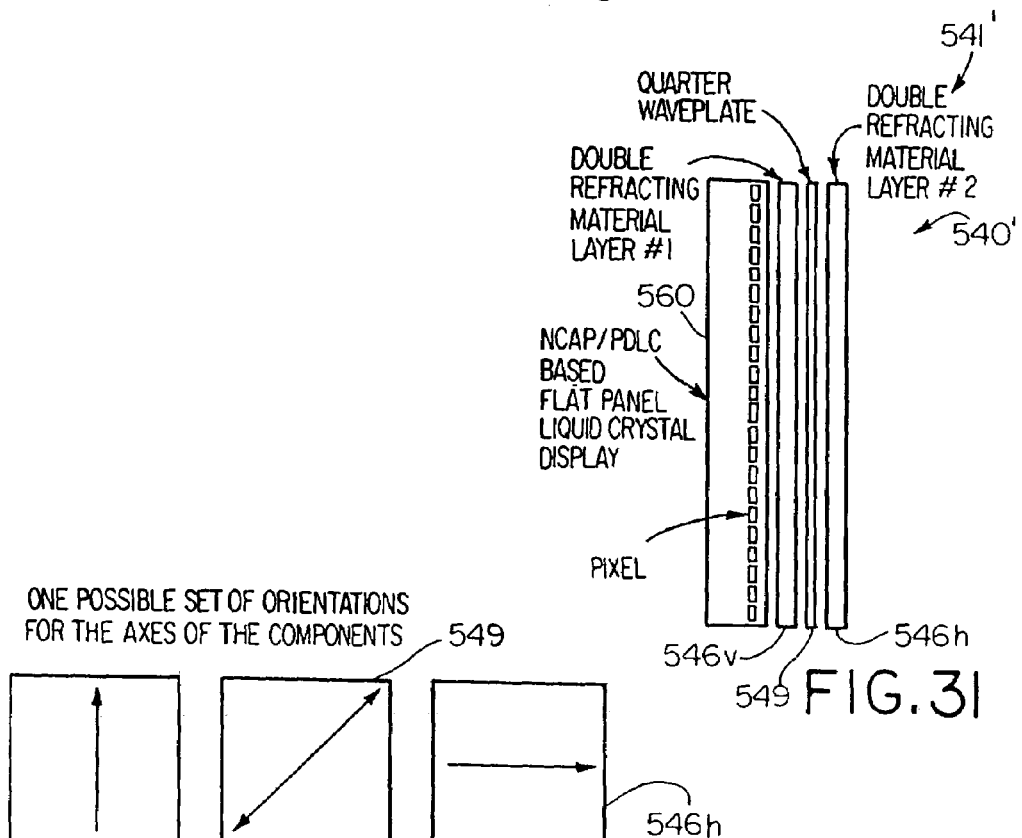
FIG.31
ONE POSSIBLE SET OF ORIENTATIONS FOR THE AXES OF THE COMPONENTS
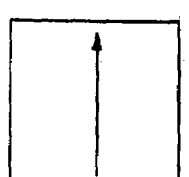
DOUBLE REFRACTING MATERIAL LAYER #1 OPTIC AXIS VERTICAL
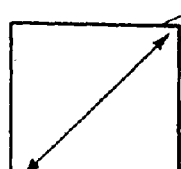
QUARTER WAVEPLATE AXIS +45°
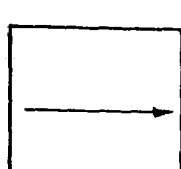
DOUBLE REFRACTING MATERIAL LAYER #2 OPTIC AXIS HORIZONTAL
FIG.32

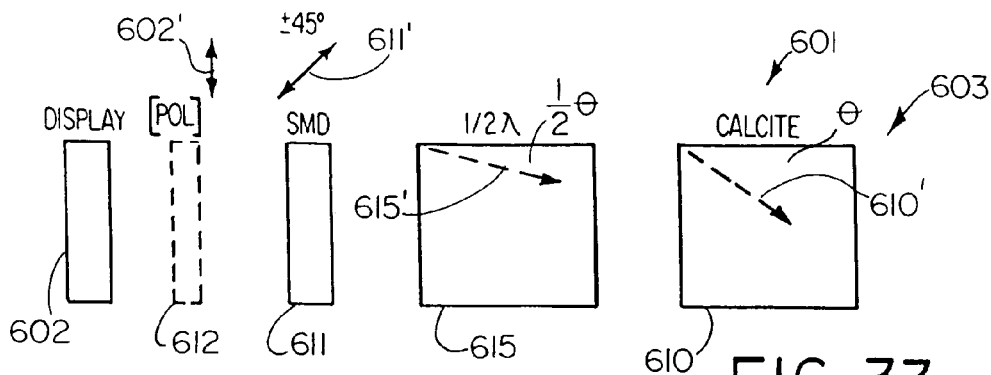
FIG. 33
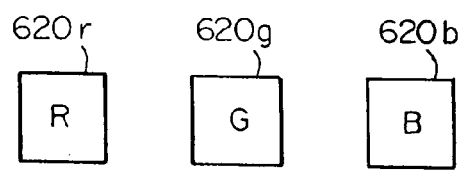
FIG. 34
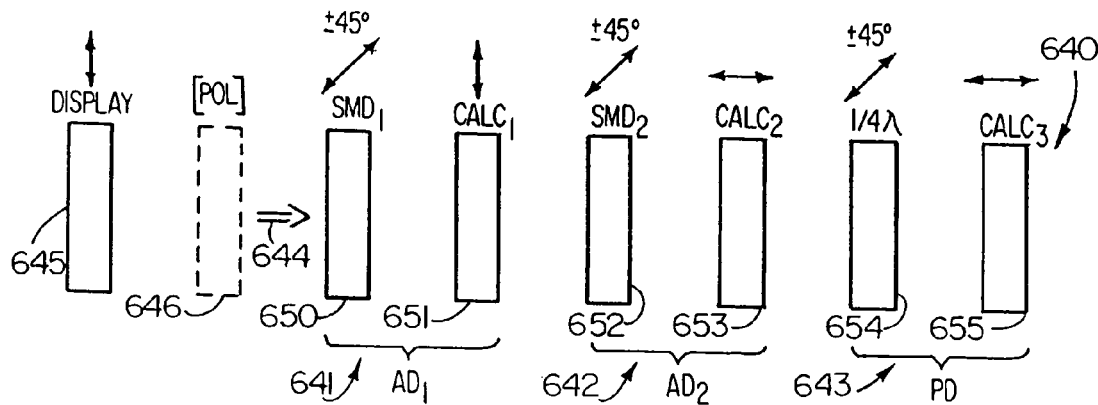
FIG. 35
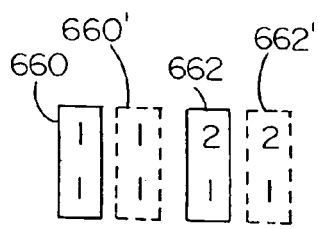
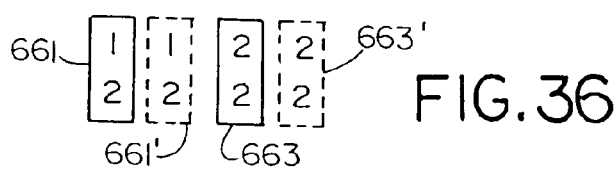
FIG. 36

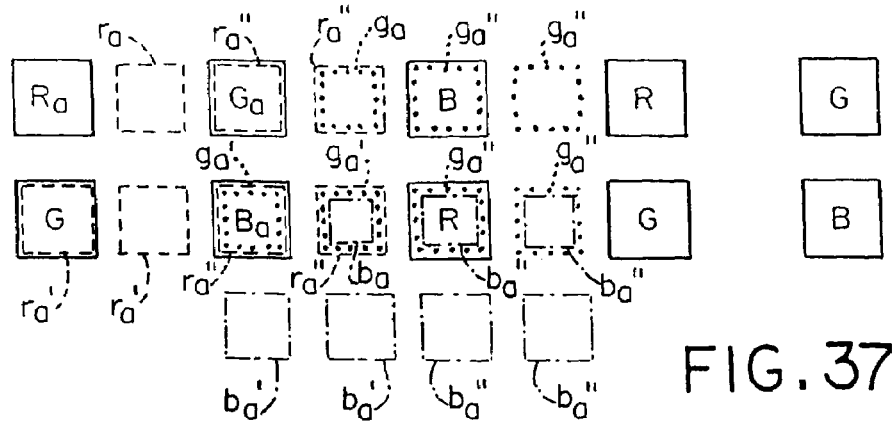
FIG. 37
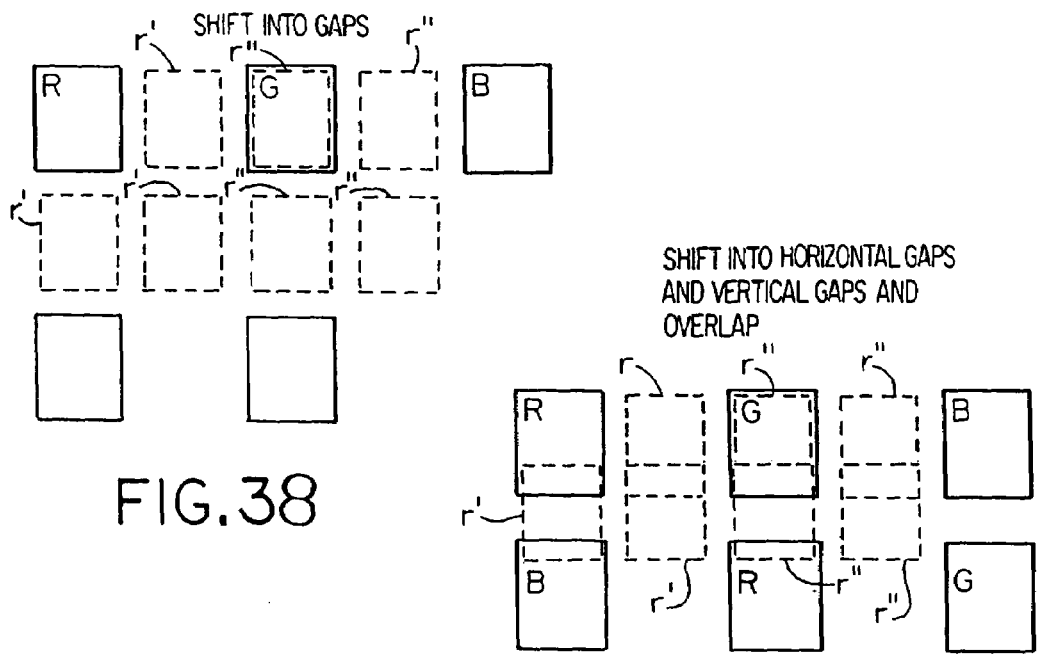
FIG. 38
SHIFT INTO HORIZONTAL GAPS AND VERTICAL GAPS AND OVERLAP
FIG. 39
SHIFT 1/2 TRIAD PITCH TO RIGHT;
1 PIXEL PITCH LEFT;
1/2 VERTICAL PIXEL PITCH DOWN.
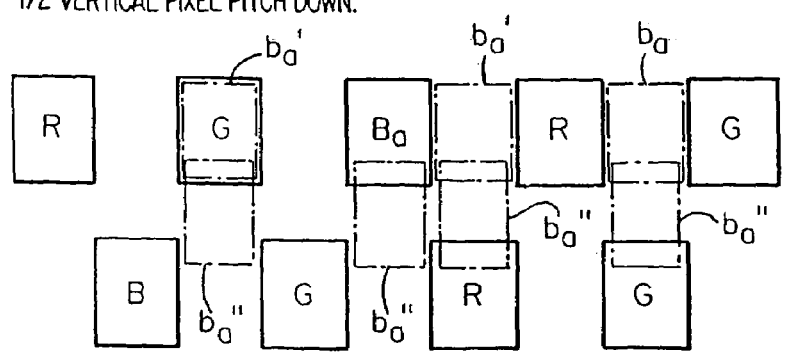
FIG. 40

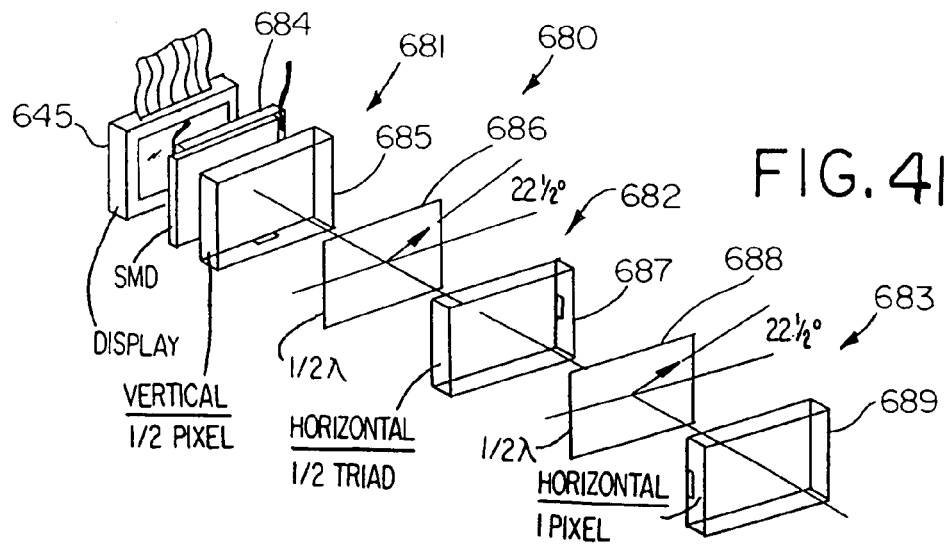
FIG. 41
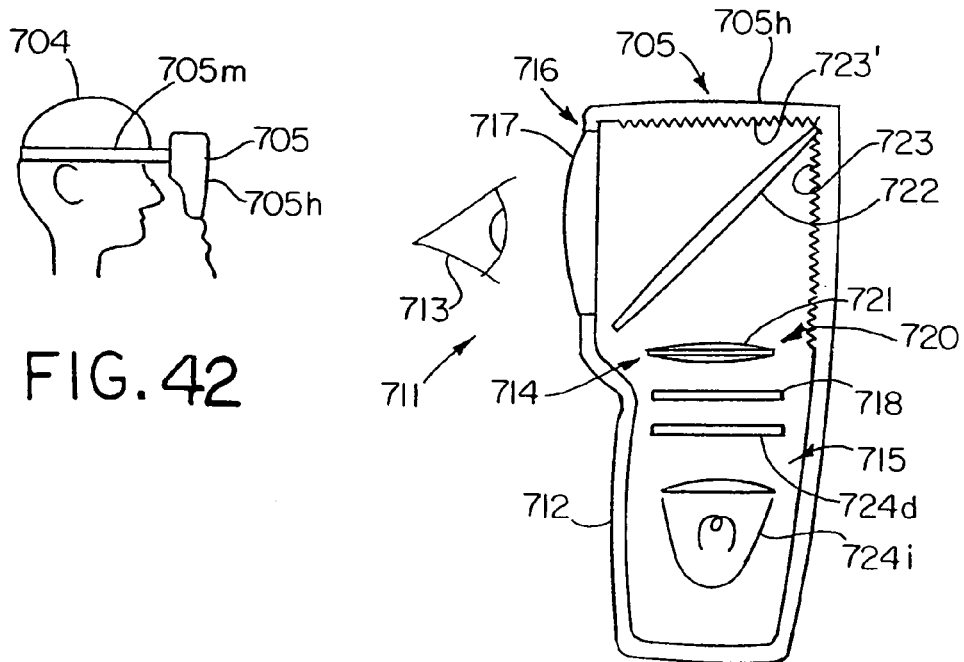
FIG. 42
FIG. 43

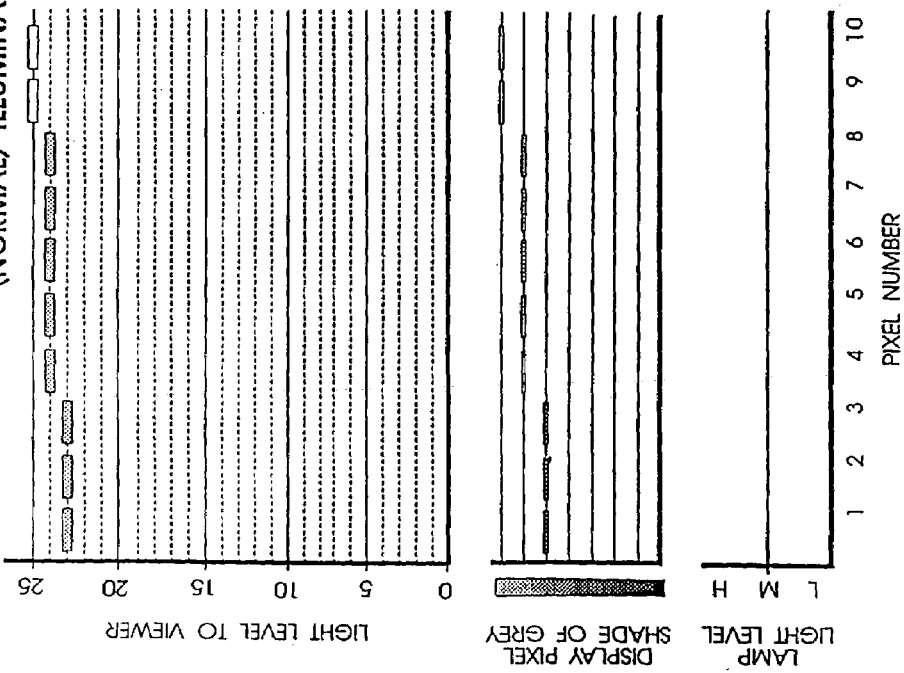
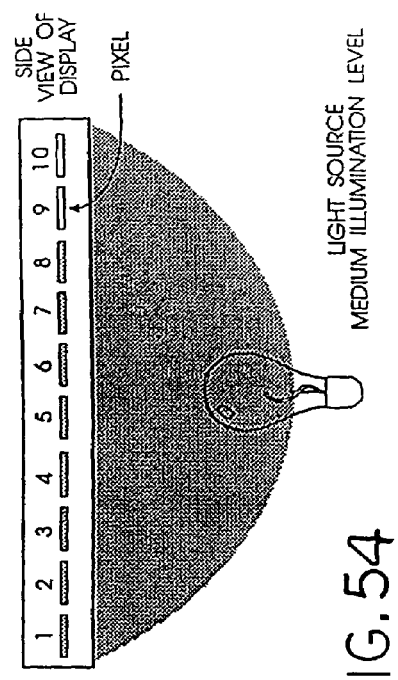
FIG. 54

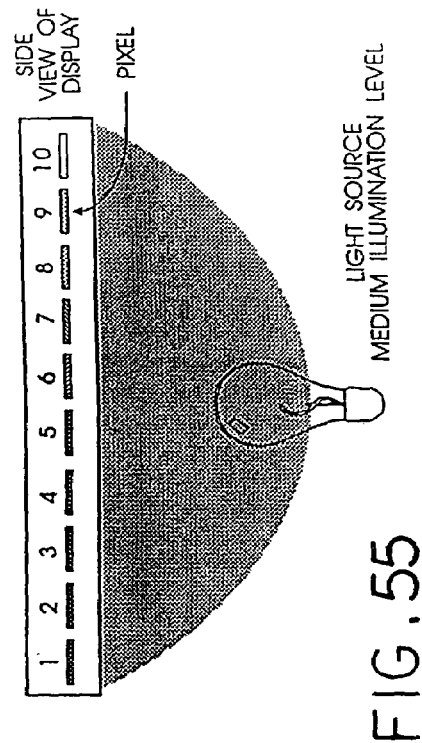
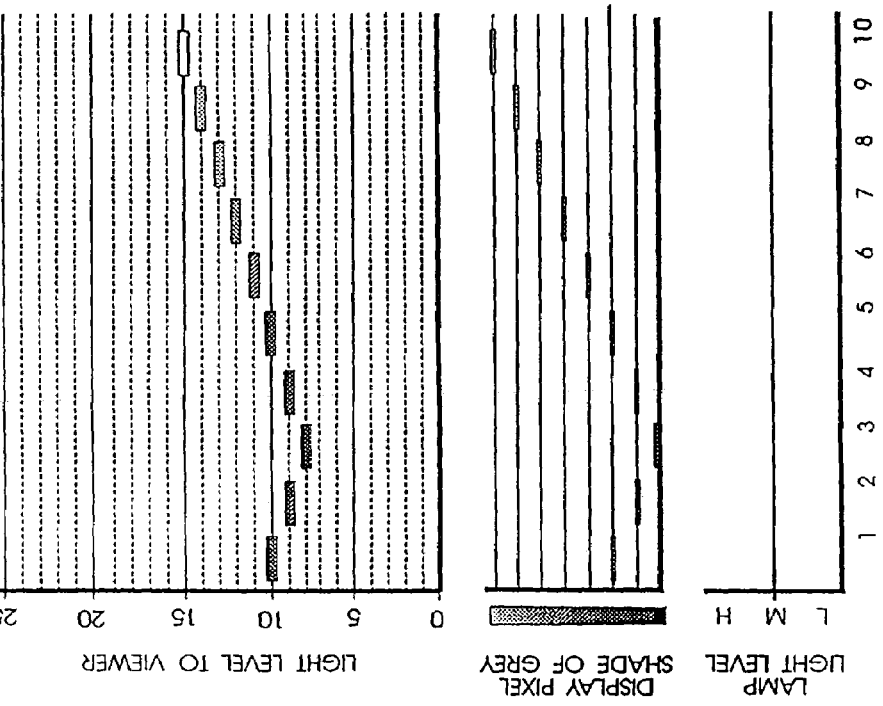
FIG. 55

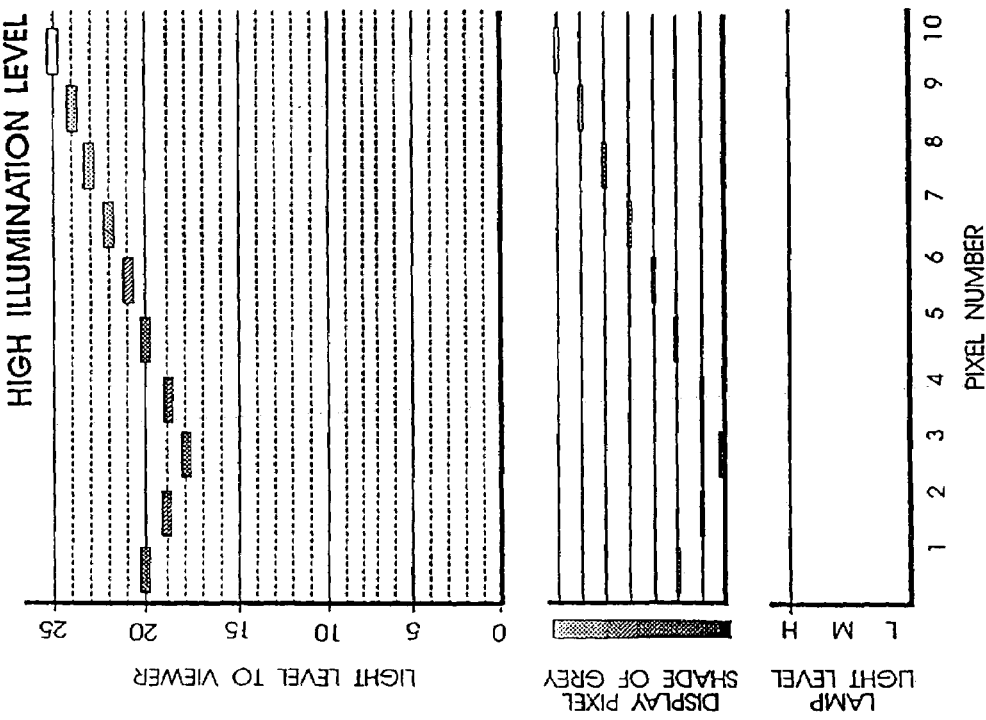
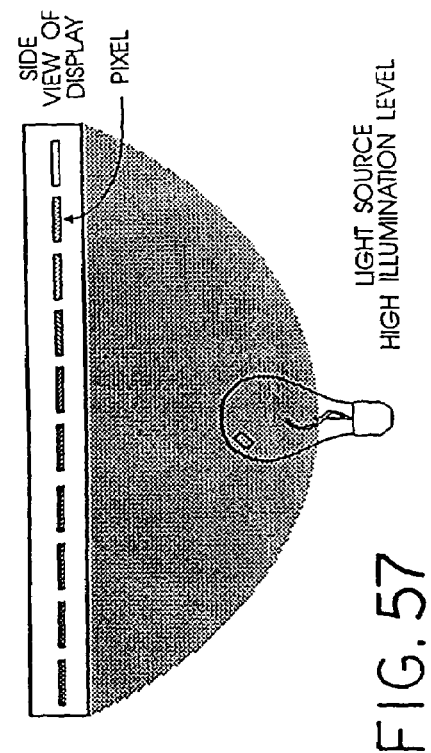
FIG. 57

OPTICAL DISPLAY SYSTEM AND METHOD, ACTIVE AND PASSIVE DITHERING USING BIREFRINGENCE, COLOR IMAGE SUPERPOSITIONING AND DISPLAY ENHANCEMENT WITH PHASE COORDINATED POLARIZATION SWITCHING

This is a continuation of commonly owned U.S. patent application Ser. No. 09/676,915, filed Oct. 2, 2000 now U.S. Pat. No. 6,816,141; which is a continuation of commonly owned U.S. patent application Ser. No. 08/817,846, filed Apr. 25, 1997 now U.S. Pat. No. 6,154,969, which is the National Stage of International Application No. PCT/US95/13722, filed Oct. 25, 1995, which claims benefit under 35 USC 119(e) of U.S. provisional application Ser. No. 60/001,972, filed Jul. 23, 1995, and which is a continuation-in-part of commonly owned U.S. patent application Ser. No. 08/398,292, filed Mar. 3, 1995, now U.S. Pat. No. 5,715,029; which is a continuation-in-part of commonly owned U.S. patent application Ser. No. 08/392,055, filed Feb. 22, 1995, now U.S. Pat. No. 5,572,341; which is a continuation-in-part of commonly owned U.S. patent application Ser. No. 08/328,375, filed Oct. 25, 1994, now U.S. Pat. No. 5,537,256; the entire disclosures of all of which hereby are incorporated by reference.

CROSS REFERENCE TO RELATED PATENTS AND PATENT APPLICATIONS

Reference is made to commonly owned U.S. patent application Ser. No. 08/187,262, filed Jan. 25, 1994 (now U.S. Pat. No. 5,717,422 issued Feb. 10, 1998); Ser. No. 08/187,050, filed Jan. 25, 1994 (now U.S. Pat. No. 5,532,854, issued Jul. 2, 1996); Ser. No. 08/187,163, filed Jan. 25, 1994; Ser. No. 08/275,907, filed Jul. 5, 1994 (now U.S. Pat. No. 5,519,524, issued May 21, 1996), Ser. No. 08/328,375, filed Oct. 25, 1994 (now U.S. Pat. No. 5,537,256, issued Jul. 16, 1996); Ser. No. 08/392,055, filed Feb. 22, 1995 (now U.S. Pat. No. 5,572,341, issued Nov. 5, 1996); Ser. No. 08/398,292, filed Mar. 3, 1995 (now U.S. Pat. No. 5,715,029, issued Feb. 3, 1998); Ser. No. 08/295,383, filed Aug. 24, 1994 (now U.S. Pat. No. 5,621,572, issued Apr. 15, 1997); Ser. No. 08/328,371, filed Oct. 25, 1994 (now U.S. Pat. No. 5,858,589, issued Sep. 15, 1998); Ser. No. 08/383,466, filed Feb. 3, 1995 (now U.S. Pat. No. 5,606,458, issued Feb. 5, 1997); and provisional patent applications Ser. No. 60/002,780 entitled Optical system and method for a head mounted display providing both front and peripheral fields of view and Ser. No. 60/002,779 entitled Monocular viewing device with retroreflector display system, telecommunication system, and method, both filed Jul. 19, 1995. The entire disclosures thereof hereby are incorporated by reference.

TECHNICAL FIELD

The present invention relates generally, as is indicated, to optical display system and method, active and passive dithering using birefringence, color image superpositioning, and display enhancement with phase coordinated polarization switching. The present invention also relates to dithering systems for optical displays and methods, and, more particularly, to passive dithering systems and methods for changing the location of an optical signal and for improving an optical display. The present invention also relates to the enhancing of optical displays and methods to enhance such displays, and, more particularly, to enhancing optical displays and methods by coordinating the phase of switching light with the dynamic operation of the displayed image developing device.

BACKGROUND

Dithering systems have been used in a number of technologies in the past. The objective of a dithering system is to change a characteristic of a particular signal in a periodic (or random) fashion in order to provide a useful output. As is described in further detail, the dithering system of the invention may be used to change the relative location of an optical signal.

The present invention may be used with various types of displays and systems. Exemplary displays are a CRT (sometimes referred to herein as cathode ray tube) display, a liquid crystal display (sometimes referred to herein as "LCD"), especially those which modulate light transmitted therethrough, reflective liquid crystal displays, light emitting displays, such as electroluminescent displays, plasma displays and so on.

Conventional optical displays typically display graphic visual information, such as computer generated graphics, and pictures generated from video signals, such as from a VCR, from a broadcast television signal, etc.; the pictures may be static or still or they may be moving pictures, as in a movie or in a cartoon, for example. Conventional displays also may present visual information of the alphanumeric type, such as numbers, letters, words, and/or other symbols (whether in the English language or in another language). Visual information viewed by a person (or by a machine or detector) usually is in the form of visible light. Such visible light is referred to as a light signal or an optical signal. The term optical signal with which the invention may be used includes visible light, infrared light, and ultraviolet light, the latter two sometimes being referred to as electromagnetic radiation rather than light. The optical signal may be in the form of a single light ray, a light beam made up of a plurality of light rays, a light signal such as a logic one or a logic zero signal used in an optical computer, for example, or the above-mentioned alphanumeric or graphics type display. Thus, as the invention is described herein, it is useful with optical signals of various types used for various purposes. Therefore, in the present invention reference to optical signal, light ray, light beam, light signal, visual information, etc., may be used generally equivalently and interchangeably.

In an exemplary liquid crystal display sometimes referred to as an image source, there usually are a plurality of picture elements, sometimes referred to as pixels or pels, and these pixels can be selectively operated to produce a visual output in the form of a picture, alphanumeric information, etc. Various techniques are used to provide signals to the pixels. One technique is to use a common electrode on one plate of a liquid crystal cell which forms the display and an active matrix electrode array, such as that formed by thin film transistors (TFT), on the other plate of the liquid crystal cell. Various techniques are used to provide electrical signals to the TFT array to cause a particular type of optical output from respective pixels. Another technique to provide signals to the pixels is to use two arrays of crossed electrodes on respective substrates of an LCD; by applying or not applying a voltage or electric field between a pair of crossed electrodes, a particular optical output can be obtained.

One factor in determining resolution of a liquid crystal display is the number of pixels per unit area of the liquid crystal display. For example, Sony Corporation recently announced a 1.35 inch diagonal high resolution liquid crystal display which has 513,000 pixels arranged in 480 rows of 1,068 pixels per row.

Another factor affecting resolution is the space between adjacent pixels sometimes referred to "as optical dead space". Such space ordinarily is not useful to produce an optical signal output. The space usually is provided to afford a separation between the adjacent pixels to avoid electrical communication between them. The space also is provided to accommodate circuitry, leads, and various electrical components, such as capacitors, resistors, and even transistors or parts of transistors. The proportion of optical dead space to useful space of pixels that can produce optical output tends to increase as the physical size of the image source is decreased, for the space required to convey electrical signals, for example, may remain approximately constant although the actual size of the useful space of the pixels to produce optical output can be reduced because of anticipated image magnification. However, upon magnification of the image produced by such a miniature image source both the optical dead space and the useful optical space of the pixels are magnified. Thus, resolution tends to be decreased, especially upon such magnification.

The picture elements (pixels or pels) may be discrete pixels, blocks or areas where an optical signal can be developed by emission, reflection, transmission, etc. such as the numerous pixels in the miniature image source of Sony Corporation mentioned above. The optical signal referred to may mean that light is "on" or provided as an output from the device, or that the pixel has its other condition of not producing or providing a light output, e.g., "off"; and the optical signal also may be various brightnesses of light or shades of gray. Alternatively, the optical output or optical signal produced by a pixel may be a color or light of a particular color.

The pixels may be a plurality of blocks or dots arranged in a number of lines or may be a number of blocks or dots randomly located or grouped in a pattern on the display or image source (source of the optical signal). The pixels may be a number of lines or locations along the raster lines that are scanned in a CRT type device or the pixels may be one or a group of phosphor dots or the like at particular locations, such as along a line in a CRT or other device. The optical signal produced by one or more pixels may be the delivery of light from that pixel or the non-delivery of light from that pixel, or various brightnesses or shades of gray. To obtain operation of a pixel, for example, the pixel may be energized or not. In some devices energizing the pixel may cause the pixel to provide a light output, and in other devices the non-energizing of the pixel may cause the providing of a light output; and the other energized condition may cause the opposite light output condition. It also is possible that the nature of the light output may be dependent on the degree of energization of a pixel, such as by providing the pixel with a relatively low voltage or relatively high voltage to obtain respective optical output signals (on and off or off and on, respectively).

For example, in a conventional twisted nematic liquid crystal display device, polarized light is received by a liquid crystal cell, and depending on whether the liquid crystal cell receives or does not receive a satisfactory voltage input, the plane of polarization of the light output by the liquid crystal cell will or will not be rotated; and depending on that rotation (or not) and the relative alignment of an output analyzer, light will be transmitted or not. In an optical phase retardation device that has variable birefringence, such as those disclosed in U.S. Pat. Nos. 4,385,806, 4,540,243, and RE.32,521 (sometimes referred to as surface mode liquid crystal cells), depending on the optical phase retardation provided by the liquid crystal cell, plane polarized light may be rotated, and the optical output can be determined as a function of the direction of the plane of polarization. In a CRT light emission or not and brightness may be determined by electrons incident on a phosphor at a pixel. In electroluminescent displays and plasma displays light output may be determined by electrical input at respective areas on pixels.

The interlacing of raster lines or display lines is a known practice used in television and in other types of display systems. For example, in NTSC and PAL television type cathode ray tube (CRT) displays it is known that two interlaced fields of horizontal lines are used to provide an entire image frame. First one raster or set of lines is scanned to cause one subframe (sometimes referred to as field) to be displayed; and then a second raster or set of lines is scanned to cause a second subframe (field) to be displayed. The electrical signals used to scan one line in one subframe and the electrical signals used to scan the relatively adjacent line of the subsequent subframe may be different, and, therefore, the optical outputs of those lines may be different. The two raster subframes are presented sufficiently fast that the eye of an observer usually cannot distinguish between the respective images of the two successive subframes but rather integrates the two subframes to see a composite image (sometimes referred to as a frame or picture). The two subframes are created sequentially by "writing" the image to respective pixels formed by phosphors to which an electron beam may be directed in response to electrical signals which control the electron beam in on-off and/or intensity manner. After the electron beam has reached the end of its scanning to create one subframe, e.g., the last pixel or phosphor dot area of that field, there is a period of time while the electron beam is moved or directed to the first pixel of the next subframe. During that period of time a blanking pulse is provided to prevent electrons from being directed to phosphors or pixels causing undesired light emission. Sometimes various circuits of a television or CRT display are synchronized to the operative timing of the television, CRT, etc. by synchronization with such blanking pulses.

The density of pixels, e.g., number of pixels per unit area, in a CRT display usually is, in a sense, an analog function depending on characteristics of the electron beam, drive and control circuitry for the beam, phosphor dot layout, shadow mask(s), etc., as is known. Usually a CRT is driven using the interlaced lines forming the subframes mentioned above. In an LCD, though, there is a fixed number of pixels per line or row; and data, e.g., whether a given pixel in a row is to transmit light or to block light transmission, usually is written to the pixels a row at a time. The data is written to one row, then to the next, and so on, and there usually is no interlacing of rows or of subframes as there is in CRT driving techniques.

In some LCD's the two subframes mentioned above usually are effectively averaged together, when driven by a CRT type of interlaced signal, since there usually is no physical interlacing of LCD pixels to form respective subframes as there are respective scan lines of phosphor dots, for example, in a CRT. Rather, the electrical signals for driving adjacent scan lines of different respective interlaced subframes of a CRT display, both usually are delivered to only a single row of pixels in an LCD. Each pixel responds to the electrical signal applied thereto to transmit or to block light, for example. Those two sets of electrical signals are applied to the row of pixels at different times. Therefore, at one time a given row of LCD pixels may present as an optical output optical information from one subframe and at a later time present optical information from the other subframe.

Since the optical information presented in one subframe is expected to be displaced in space from the optical information presented in the other subframe to obtain the interlacing pattern of a CRT display, careful examination of the optical output from the above-mentioned LCD will show an amount of "jittering" of the image. This jittering is caused by the pixels of one row periodically being changed so the optical output thereof sequentially displays the result of energization by signals representing one scan line of information from one subframe and then energization by electrical signals representing the adjacent scan line of information from the next subframe.

This jittering can degrade the displayed image and can make viewing uncomfortable. Also, the problems, such as viewing discomfort and/or image degrading, caused by jittering tend to increase as the image is enlarged or magnified, e.g., when the image is created by a relatively miniature image source, such as the SONY display mentioned above, and is magnified for direct viewing or for projection by a projector.

One technique for reducing the jittering is to use relatively slow liquid crystal display devices. Therefore, the liquid crystal display element or pixel tends to average the electrical signals applied thereto. A disadvantage to this technique, though, is that image resolution is reduced because the information representing two scan lines is combined into a single line. Also, a slow acting liquid crystal display element tends to have undesirable hysteresis that slows motion being shown by the display.

In a color display, such as a LCD (liquid crystal display), there usually are red, green and blue pixels which form a color triad (hereinafter referred to as triad). By operating the LCD in such a way that one or more of the pixels forming a triad provides (or produces) the respective color light of that pixel, different respective colors and white can be produced as output light. For example, if the red pixel of a triad were providing red output light; and the green and blue pixels were not providing output light, the light output from that triad would be red. Further, when two or more pixels of a triad are providing light output, a combination of those colors is seen by a person viewing (sometimes referred to as the viewer) the light output or image. The viewer usually visually superimposes the output light from the pixels of the triad; and the combined or superimposed lights therefrom provide the net effect or integrated light output of the triad. As an example, to produce a white light output from a triad, the red, green and blue pixels of that triad would provide, respectively, red, green and blue light; and those lights would be, in effect, superimposed by the viewer and seen as white light.

There is a continuing need and/or desire to improve resolution of displays. It also would be desirable to facilitate the placing of circuitry in a display while minimizing the optical dead space caused by the circuitry. There also is a need to reduce jitter.

In the above-mentioned patent applications are disclosed techniques for actively dithering, moving an optical signal, changing the location or optical path of an optical signal, etc. for several purposes, such as to increase resolution, to reduce jitter, and so on. There also are disclosed techniques for passive dithering, moving of optical signals, etc., for example to increase the fill factor of an image provided by a display by expanding the image or pixels forming the image.

An LCD using the twisted nematic effect usually cannot switch between transmission states as rapidly as changes occur in the applied electrical signal which operates the LCD. For example, the electrical input to a twisted nematic LCD can change nearly instantly, but it takes a number of milliseconds for the LCD to respond dynamically to the change in electrical input to change the optical response of the LCD. When an LCD is used in a display system that employs dithering to double, quadruple or otherwise to change the effective number of pixels, for convenience hereinafter, sometimes referred to as optical line doubling (or OLD), the relatively slow response of the twisted nematic LCD compared to the faster operation of the dithering optics can result in an optical output that does not achieve the desired improvement in resolution or other optical effect.

The displaying of a dark scene using a display device (sometimes referred to as a passive display), which modulates light received from a separate light source, encounters a disadvantage which ordinarily is not present for displays which produce their own light, such as a cathode ray tube (CRT). The problem has to do with reduced resolution and/or contrast of the displayed image.

In a CRT, for example, when it is desired to display a dark scene, the intensity of the output light can be reduced. The different parts of the dark scene, then, all may be output at the reduced brightness or illuminance level. All pixels (e.g., picture elements, phosphor dots in a monochrome display or group of three red, green and blue phosphor dots for a multicolor display, etc.) of the CRT can be active so that resolution is maintained even though intensity of the light produced by the phosphors is reduced.

However, in a passive display device, such as a liquid crystal display, an electrochromic display, etc., whether of the light transmitting type or of the light reflecting type, the usual practice to reduce brightness of a displayed image or scene is to reduce the number of pixels which are transmitting light at a particular moment. Such a reduction reduces the resolution of the display. Also, such a reduction can reduce the contrast of the display.

The human eye has difficulty distinguishing between seeing or recognizing the difference between low and high brightness and contrast ranges. This difficulty is increased when the number of pixels is decreased and resolution is degraded.

It would be desirable to improve the contrast and resolution of passive displays.

In U.S. patent application Ser. No. 08/187,163 is disclosed a passive apparatus, such as an LCD, and method for displaying images with high contrast by controlling the light input to the display to control brightness of the output while operating respective pixels of the display to obtain good contrast substantially without regard to the output brightness. Different color effects also are disclosed using, for example, field sequential switching of respective color light. However, this is another example of a passive optical device, in this case an LCD, in which field sequential switching could be improved if coordinated with the delays inherent in the dynamic optical response of a liquid crystal cell, for example, relative to the changes in operating signal, such as electric field, voltage, etc.

As is described in application Ser. No. 08/187,163, an image of a candlelit room would be dim. In the prior art devices a relatively small number of pixels would be used, then, to transmit light to create the image, whereas a relatively large number of pixels would be used to block light transmission to give the effect of the reduced intensity or dim room. In the invention of such application, though, the number of pixels used to create the image remains constant, and the contrast ratio between one portion and another portion of the image remain constant; only the intensity of the illuminating light changes thereby to diminish the brightness of the room. Therefore, with the invention image data is not lost regardless of the brightness of the image, whereas in the prior art image data is lost because the additional pixels are used to brighten or darken the brightness of the image.

The features of the invention as described in that patent application can be used in a frame sequential basis. The features of the invention can be used regardless of whether the display is operated in reflective mode or in transmissive mode. Also, the features of the invention can be used in a virtual reality type display in order to provide a very wide range of contrast and of image brightness characteristics. The picture information is used to derive the brightness of the display, not the surrounding ambient. Using the invention of that application, the amount of information that can be conveyed by the display is substantially increased over the prior art.

For example, if there were a grey scale of 100 shades of grey and a display with 10 shades of grey, the intensity of the illuminating source can be changed at 10 different levels, for example, and there also can be 10 different shades of grey provided by the display itself. Therefore, this provides 100 shades of grey. This characteristic can be increased by another factor of 10 by going to r, g, b (red, green, blue) modulation on a field sequential basis, which allows the possibility of 10 to the 6th different illumination levels and colors. The foregoing is especially important in head mounted displays where immersion in the image is extremely important. Using features of such patent application, there can be high illumination of the scene, then, the grey scale contrast ratio of the real image can be adjusted. As a result, there is a high contrast image presented in a bright motif. Another example using such invention is the ability to display a sunrise scene in which the red image is enhanced and the blue and green are minimized.

The invention of that application, then, can separate the two functions of brightness and image. The image is a function of the operation of the liquid crystal modulator and the illumination brightness is the function of the light source intensity. The r, g, b colors can be changed to give a candlelight or moonlight effect with good resolution and color function, but the brightness of the scene is a function of the background. As a result, it is possible to photograph the scene in daylight to get good contrast; and then by reducing the display illumination it is possible to give the impression of a moonlit or candlelit environment.

SUMMARY

With the foregoing in mind, then, one aspect of the invention is to increase the resolution of a display by electro-optically dithering an optical signal.

Another aspect relates to use of electro-optical dithering to obtain three dimensional images, especially using auto-stereoscopic effect.

Another aspect relates to using electro-optical dithering to effect beam switching of optical signals.

Another aspect is electro-optically to change selectively the location at which an optical output signal is presented to another location. A further aspect is to effect such change in more than one direction, e.g., along more then one axis.

According to another aspect, a device for changing or determining the location of an optical signal includes birefringent means for selectively refracting light based on optical polarization characteristic of the light, and means for changing such optical polarization characteristic of light, the birefringent means and the changing means being cooperative selectively to change the location of the optical signal.

According to another aspect, a system for increasing the resolution of an optical display having a plurality of picture elements includes birefringent means for selectively refracting light based on polarization characteristics of the light, changing means for selectively changing the polarization characteristics of light, and the birefringent means and the changing means being in optical series and cooperative in response to selective operation of the changing means to change the location of output optical signals therefrom.

According to another aspect, a display system includes a display for producing visual output information by selective operation of a plurality of picture elements at respective locations, and means for changing the location of the output information as a function of optical polarization thereby effectively to increase the number of picture elements.

According to another aspect, a display system includes a display for producing visual output information by selective operation of a plurality of picture elements at respective locations, and means for changing the location of the output information without physical realignment of a mechanical device thereby effectively to increase the number of picture elements.

According to another aspect, a display system includes a display for producing visual output information by selective operation of a plurality of picture elements at respective locations, and means for electro-optically changing the location of the output information thereby effectively to increase the number of picture elements.

According to another aspect, a method for displaying visual information includes presenting a first optical output from a source by providing plural optical signals arranged in a pattern, presenting a second optical output from the source by providing plural optical signals arranged in a pattern, and selectively shifting the location of the pattern of the second optical output relative to the location of the patten of the first optical output based on optical polarization.

According to another aspect, an electro-optical dithering system for shifting polarized light includes birefringent means for selectively refracting light as a function of a polarization characteristic of the light, and changing means for changing the polarization characteristic of polarized light to provide output light that is shifted or not as a function of optical polarization.

According to another aspect, a method of making a display includes positioning in optical series an image source, a birefringent means for selectively refracting light based on optical polarization characteristic of the light, and a changing means for changing such optical polarization characteristic.

Using principles of the invention, the location of an optical signal can be changed, and the change can be used for a number of purposes. For example, the change can be used to improve resolution of a display, to provide an auto-stereoscopic output, to interlace optical signals, to facilitate positioning and hiding of circuitry used in a display, to facilitate overlapping of tiles or pixels in a display, etc. A number of these examples are presented below. The invention may be used to achieve one or more of those and other uses.

An aspect of the invention relates to an optical line increaser, wherein the number of pixels in a optical display can be increased by electro-optical means.

An aspect of the invention relates to an optical line increaser, wherein the number of pixels in a optical display can be increased by electro-optical means, for example, to double, triple, quadruple, or otherwise to increase the effective number of pixels presenting output optical information for viewing by a person, machine, other device, etc., and/or for other use.

Another aspect is to hide or to reduce optical dead space in a display.

Another aspect is to use a switchable electro-optical device to effect dithering (changing effective location) of an optical signal.

Another aspect is to reduce jitter in an optical display.

Another aspect is to drive a non-interlaced display using an interlaced signal and electro-optically dithering the optical output of the display to reduce jitter.

Another aspect is to increase the effective number of pixels and/or lines of an optical display.

In accordance with a further aspect of the invention, a passive dithering display system includes an optical display including a plurality of pixels with optical dead space between the pixels for producing an image, and a birefringent material for shifting one polarization component of the image relative to a second polarization component of the image such that the shifted polarization component lies in the dead space.

In accordance with another aspect, a display system includes an optical display for producing an image and a first birefringent material for refracting one component of the image relative to a second component of the image based on polarization characteristics of the components to produce a plurality of adjacent images.

In accordance with a still further aspect of the invention, a method of reducing optical background noise includes the steps of displaying a plurality of pixels with optical dead space between said pixels for producing an image and shifting one polarization component of the image relative to a second polarization component of the image such that the shifted polarization component lies in the dead space.

Another aspect relates to expanding an image or pixels of an image to increase the fill factor of the image, the fill factor relating to the amount of area of the image actually occupied by image compared to that part of the image occupied by optical dead space.

Another aspect relates to using passive image or pixel expanding to increase the fill factor of an image.

Another aspect relates to using active image or pixel doubling (or other increasing) to increase fill factor and resolution of an image.

Another aspect relates to techniques to superimpose color pixel image light outputs to obtain respective color outputs for a display.

Another aspect is to increase the amount of data able to be displayed from a video signal or the like provided to a display system, such as an LCD display system or other display system.

As is described further below, the invention is useful to coordinate light output by an optical device, such as an LCD, for example, and the dynamic operation of such optical device with another optical device, such as one that switches or shifts the location of the output light for use, such as viewing, projection, etc., one that displays images in field (sometimes referred to as frame or part of a frame) sequential operation to present images with good contrast and/or color effect that are independent of the brightness of the output light, and so on.

One or more of these and other objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 1 is a schematic side elevation view of a CRT display including an electro-optical dithering system according to the present invention;

FIG. 2 is a schematic illustration of the components of the electro-optical dithering system of FIG. 1;

FIG. 3 is a schematic illustration of the double refraction effect through a calcite crystal which may be used in the electro-optical dithering system of the invention;

FIGS. 4A, 4B and 4C are, respectively, schematic illustrations indicating exemplary axial alignment of the several components of the electro-optical dithering system shown in FIG. 2;

FIG. 8 is a schematic side elevation view of the electro-optical dithering system of the invention used in an auto-stereoscopic display;

FIG. 9 is an enlarged view of a single lens element of the auto-stereoscopic display of FIG. 8;

FIG. 10 is a schematic plan view of part of a liquid crystal display showing areas where pixels are located and areas where there is circuitry or dead space located between adjacent pixels and including the electro-optical dithering system of the invention;

FIG. 11 is a schematic top view of the display of FIG. 10 showing the paths of optical signals that are shifted in location according to the on or off state of the electro-optical dithering system of the display;

FIGS. 14 and 15A-15E are schematic illustrations of a display system and parts thereof with a double electro-optical dithering system;

FIGS. 16A-16D are schematic illustrations of a pixel pattern that is dithered or not in up to four different spatial pattern locations;

FIG. 23 is a schematic illustration of a passive dithering system used in connection with a display which produces a polarized output;

FIG. 24 is a schematic illustration of the effect of dithering in both horizontal and vertical directions;

FIG. 30 is a schematic illustration of the passive dithering system of FIG. 28 used in connection with a display which produces a nonpolarized light output;

FIG. 31 is a schematic illustration of an optical display system using an alternate embodiment of a passive dithering system using unpolarized light input;

FIG. 32 is a schematic illustration of the orientations of the optic axes of the components of the passive dithering system of FIG. 31;

FIG. 33 is a schematic illustration of an alternate embodiment of optical display system using an active dithering system for diagonally displacing a pixel image;

FIG. 34 is a schematic illustration of the locations of the original pixel images unshifted and of the shifted pixel images using the dithering system of FIG. 33;

FIG. 35 is a schematic illustration of an alternate embodiment of optical display system using active and passive dithering system for displacing pixel images;

FIG. 36 is a schematic illustration of the locations of the original pixel images unshifted and of the shifted pixel images using the dithering system of FIG. 35 in four respective operations;

FIG. 37 is a schematic illustration of the display output from an optical display system of the type shown in FIG. 35, for example, showing shifting of pixel images relative to each other to obtain superpositioning of color pixel images and increased fill factor;

FIGS. 38 and 39 are schematic illustrations of display outputs from an optical display system of the type shown in FIG. 35 and or in other figures hereof, for example, showing shifting of pixel images into gaps between pixels and in overlapping relative to each other;

FIG. 40 is a schematic illustration of the display output from an optical display system of the type shown in FIG. 41, for example, showing shifting of pixel images according to an exemplary prescribed pattern;

FIG. 41 is a schematic illustration of an optical display system including the components to obtain the operation depicted in FIG. 40 for a head mounted or boom mounted display system or other display system;

FIG. 42 is a schematic illustration of a display system in accordance with an embodiment of the invention including a head mounted portion;

FIG. 43 is a schematic section elevation view showing the various operational parts of the monocular viewing device used in the display system of FIG. 1;

FIGS. 53-58 are schematic graphical illustrations depicting operation of the invention.

DESCRIPTION

Figure 5A:
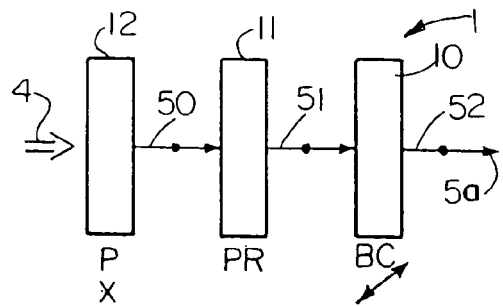
FIGS. 5A, 5B and 5C are, respectively, schematic illustrations similar to FIG. 2 showing the operation of the electro-optical dithering system on light in respective operational modes.

Referring, now in detail to the drawings wherein like reference numerals designate like parts in the several figures and initially to FIG. 1, an electro-optical dithering system in accordance with an embodiment of the present invention is generally indicated at 1 in use with a display 2 to form an optical display system 3 for providing optical signals, visual information, etc., as the output therefrom. The display 2 provides a source of light or optical signals, and such light is transmitted through the electro-optical dithering system to provide optical signals at respective locations for viewing or the like. Exemplary light is represented by an arrow 4, such as an optical signal produced at a particular location by the display 2 or produced by some other source and modulated by the display 2 as the output therefrom.

The location of the output optical signal 5 is represented by arrows 5*a*, 5*b*. Those arrows 5*a*, 5*b* represent the location of the output optical signal 5 resulting from the optical signal 4 being transmitted through the electro-optical dithering system 1 while the electro-optical dithering system is in a respective one or the other of the operative states thereof, such as off or on.

In the embodiment illustrated in FIG. 1 the display 2 is a CRT. It will be appreciated that the display 2 may be an LCD or another display, such as an electroluminescent display, plasma display, flat panel display or other display.

Dithering may refer to the physical displacement of an image. An electro-optical dithering system (EDS) refers to an electro-optical means to physically shift, translate or to change the location of an optical signal, such as an image. The image may be shifted along an axis from one location to another and then back to the first, e.g. up and then down, left and then right, etc. The optical signal may be moved in another direction along a straight or other axis or not along an axis at all. The dithering may be repetitive or periodic or it may be asynchronous in moving an image from one location to another and then holding it there, at least for a set or non-predetermined time.

The electro-optical dithering system 1, as it is shown in FIG. 1, includes birefringent material, which sometimes is referred to as double refracting material, 10. An example of birefringent material is a calcite crystal material. Other double refracting (birefringent) materials also may be used. Birefringent material may transmit light straight through or may refract the light which is incident thereon, depending on a characteristic of the light incident thereon, such as optical polarization characteristic. In the illustrated embodiment the optical polarization characteristic is the direction of the electric vector of plane polarized light. Plane polarized light having one direction of electric vector (sometimes referred to as direction of the polarization axis, the transmission axis of the polarizer or of the light, the plane of polarization of the light, the direction of polarization, etc.) may transmit directly through the birefringent material 10 without being refracted or bent, whereas light having a different direction of plane of polarization may be refracted (bent) by the birefringent material 10. For example, plane polarized light which encounters one index of refraction characteristic, such as an ordinary index of refraction characteristic, of the birefringent material may be transmitted without refraction. However, plane polarized light which encounters a different index of refraction characteristic, such as the extraordinary index of refraction, of the birefringent material will bend or refract at the interface with the birefringent material, both upon entering and upon leaving the birefringent material. Therefore, in a sense the birefringent material 10 changes the direction of light transmitted through it, for example, as it changes the location of the output optical signal from location 5a to 5b.

In the optical display system 3 embodiment illustrated in FIG. 1 the electro-optical dithering system 1 also includes a switch 11 that can be operated to change the characteristic of light relevant to the birefringent material 10 to change the location of the output optical signal. In the exemplary embodiment of FIG. 1 refraction of light or transmission of light without refraction by the birefringent material 10 depends on the direction of polarization of plane polarized light incident on the birefringent material 10, and the switch 11 is able to switch the direction of polarization of such light incident on the birefringent material 10.

In the embodiment illustrated in FIG. 1 the switch 11 is a liquid crystal cell or liquid crystal shutter type device which is able to transmit light to the birefringent material 10 such that the light incident on the birefringent material has a plane of polarization that can be changed by the switch. Accordingly, if the switch is in one operative state or mode, the light incident on the birefringent material 10 may have a plane of polarization such that the output optical signal 5 occurs at the location of the arrow 5a, and with the switch 11 in a different state of energization the plane of polarization of the light incident on the birefringent material 10 can be changed (e.g., switched to an orthogonal direction to the first-mentioned plane) thereby to cause the output optical signal to occur at the location of the arrow 5b.

A linear polarizer (sometimes referred to as a plane polarizer) 12 is between the switch 11 and the CRT display 2. The light 4 provided by the display 2 is plane polarized by the polarizer 12. The direction of polarization in cooperation with one condition of the switch 11 will result in the light being transmitted directly through the birefringent material 10 without refraction so as to appear at location of arrow 5a. However, in response to the other condition of the switch 11, the light will be refracted by the birefringent material 10 so as to occur at the location of the arrow 5b.

With the foregoing in mind, then, it will be appreciated that the invention includes a material that can move the location of an output optical signal relative to the location of an incident (input) optical signal depending on a characteristic of the incident optical signal, such as the direction of plane polarized light. The electro-optical dithering system 1 of the invention includes birefringent, double refracting, or equivalent material and a means to switch or to discriminate the characteristic of the incident optical signal.

In the embodiment illustrated in FIG. 1, the light 4 from a CRT is unpolarized. The polarizer 12 gives the light a characteristic of linear (plane) polarization. The switch 11 can change the direction of polarization, e.g., the direction of the electric vector of the polarized light. The birefringent material provides the output optical signal at the location 5a, 5b, depending on the characteristic of the light incident on the birefringent material.

The switch 11 may be a liquid crystal cell or several liquid crystal cells, such as twisted nematic liquid crystal cells, birefringent liquid crystal cells, such as those disclosed in U.S. Pat. No. 4,385,806, RE.32,521, and U.S. Pat. No. 4,540,243, the entire disclosures of which hereby are incorporated by reference. If desired, the liquid crystal cells may be arranged in optical series and operated as a push-pull arrangement to improve linearity of response, and/or for other purposes, for example, as is disclosed in one or more of the aforementioned patents. Other types of liquid crystal cells also may be used for the switch 11. Further, other types of devices that are able to switch the optical characteristic of light, such as the direction of plane polarization, etc., may be used for the switch 11; several examples include ferroelectric liquid crystal cells, variable optical retarders, PLZT devices, and so on.

An advantage to using a liquid crystal display (LCD) as the display 2 with the dithering system 1 is that the output light from an LCD usually already may have a characteristic of optical polarization, such as linear polarization. In such a case, the linear polarization characteristic provided by such displays may eliminate the need for a separate linear polarizer 12.

In FIG. 2 the electro-optical dithering system 1 is shown in use in an optical display system 13 having a transmissive LCD 20. The LCD 20 may be a twisted nematic liquid crystal display, birefringent liquid crystal display, or some other type of liquid crystal display which produces in response to input light 21 from a light source 22, output light represented by an arrow 23. The LCD 20 may be transmissive or reflective. The output light 23 may be, for example, a graphic image, one or more light beams that are selectively turned on or off depending on operation of the liquid crystal display 20, etc. The graphic image may be a moving image, an alphanumeric display, etc. The dithering system 1 includes a birefringent material 10 and a switch 11. To simplify the following description, the switch 11 may be referred to as a polarization rotator, which rotates the plane of polarization of the light represented by arrow 23 an amount depending upon the energization state or condition of the polarization rotator. For example, if the switch 11 were a twisted nematic liquid crystal cell, when it is de-energized, it would rotate the plane of polarization by 90 degrees (or some other amount depending on the nature of the liquid crystal cell), and when the twisted nematic liquid crystal cell is in a fully energized condition, it would not rotate the plane of polarization of the light incident thereon. Similar operation could be obtained by using birefringent liquid crystal cells. Additionally, if desired, compensation may be provided for residual retardation in a liquid crystal cell, whether of the birefringent or twisted nematic type; such compensation may be provided by a wave plate or the like, such as a quarter wave plate positioned in a particular orientation relative to the rub direction or axis of the liquid crystal cell used in the switch 11.

Further, a wave plate, such as a half wave plate, may be used to rotate the plane of polarization of light 23 so it is appropriately aligned with the optic axis (sometimes referred to herein as the rub direction, optical axis, or simply axis) of the switch 11. For example, if the switch 11 were a twisted nematic liquid crystal cell, the plane of polarization of the light 23 may be parallel or perpendicular to the rub direction of one of the plates of the liquid crystal cell. If the switch 11 were a birefringent liquid crystal cell, such as a surface mode cell or a pi-cell (e.g., as the above-mentioned patents or in U.S. Pat. No. 4,582,396, which is hereby incorporated by reference), the plane of polarization of light 23 may be at 45 degrees to the rub direction. In using a half wave plate to adjust plane of polarization, for example, the axis of the half wave plate would be aligned to one half the angular distance between the orientation of the plane of polarization of the light incident on the half wave plate and the angular orientation desired for the light output from the half wave plate.

Turning to FIG. 3, there is shown an example of birefringent material 10 in the form of the mineral calcite, also referred to as a calcite crystal 30. Unpolarized light 31 enters the calcite 30 at the left hand face 32 thereof. The light enters at a right angle to the face 32. The light 31 is resolved into two orthogonally polarized components 33, 34 in view of the birefringent nature of the calcite. The optical axis of the light components 33, 34 are oriented such that one component 33 has a plane of polarization or electric vector direction into and out of the plane of the drawing of FIG. 3, as is represented by the dots shown in FIG. 3, and such light 33 experiences an index of refraction change between the environment 35 outside the calcite 30 and the environment 36 inside the calcite 30. However, the axis of the calcite crystal 30 is at a right angle to the plane of polarization to the light 33, and, therefore, this components of light 33 travels through the calcite crystal 30 without deflection (refraction); sometimes this light is referred to herein as the undithered light.

The light component 34 is polarized vertically in the plane of the drawing of FIG. 3 and is represented by a double-headed arrow in the drawing. The light component 34 experiences a change in index of refraction as above; however, the light component 34 also encounters the calcite crystal axis at an angle which is other than a right angle. Therefore, the light component 34 is refracted and its path is deflected (direction is changed) as it enters and leaves the crystal on its travel through the crystal 30, as is shown in FIG. 3; sometimes this light is referred to herein as the dithered light. This property of refraction of one polarization component and no refraction of the other polarization component of light incident on a birefringent material sometimes is called double refraction, and it occurs in many materials. The amount of physical displacement between the light components 33, 34 where they exit the right hand face 37 of the calcite crystal 30 and become, respectively, output light 33a, 34a represented by arrows at locations 38a, 38b, respectively, depends on the thickness of the calcite crystal, indices of refraction of the calcite crystal and the external environment thereof, and the orientation of the optical axis of the specific material, as is known.

In the optical display system 3 of FIG. 1 in which the display 2 is a CRT and in the optical display system 13 of FIG. 2 which uses an LCD 20 the direction of polarization of light incident on the switch 11 and the orientation of the switch 11 may be related for optimal operation. In one example of the invention, the switch 11 is a birefringent liquid crystal cell (or a pair of them operating in push-pull manner), and such liquid crystal cell(s) has (have) an axis which sometimes is referred to as the rub direction, alignment direction, optic or optical axis, etc. of the liquid crystal cell. Using such a liquid crystal cell in the systems 3 or 13, for optimal operation the polarization direction (transmission direction axis of the polarizer 12 or of the LCD 20, for example) should be at 45 degrees relative to the axis of the switch 11. Additionally, preferably the projection of the axis of the calcite crystal 30 is oriented at 45 degrees to the axis of the switch 11. These relationships are depicted in FIGS. 4A, 4B and 4C.

Briefly referring to FIGS. 4A, 4B and 4C, the above-described relationships of axes is shown. In FIG. 4A the transmission axis of the polarizer 12 or the plane of polarization of light delivered by the liquid crystal display 20 or by CRT 2 and polarizer 12 is shown as horizontal at 40. However, such direction also may be vertical, because it is desired that the relationship between that axis and the axis of the liquid crystal cell(s) of the birefringent liquid crystal cell switch 11 be at a relative 45 degrees thereto. Such 45 degrees relationship is shown by the respective axes 41, 42 for the switch 11. In fact, such axes 41, 42 may represent the axis of one liquid crystal cell and the axis of a second liquid crystal cell, the two being arranged in optical series and being operated in push-pull fashion. The axes 43, 44 of the calcite crystal 30 are shown as horizontal and vertical. However, the vertical axis actually is tipped in or out of the plane of the drawing and it actually is the projection of that axes which would appear as vertical; alternatively or additionally the horizontal axis may be tipped. Such projection of the axes preferably is at 45 degrees to the axes 41, 42 of the switch 11. The described relative orientation of the axes of the various components used in connection with the invention is exemplary, and it will be appreciated that other arrangements may be used to obtain a particular type of operation. However, in the ideal simplified case described herein, the relationship described may be employed. Also, it will be appreciated that compensation may be provided to adjust the effective orientation of a particular axis. Such compensation can be provided using a birefringent material, a wave plate, such as a quarter wave plate or another one, etc., as was mentioned above.

It will be appreciated that whether the axis of a birefringent switch 11 is at plus or minus 45 degrees, represented by the axis lines 41, 42, for example, and whether a respective axis 43, 44 of the calcite 30 or other double refracting material 10 is at plus or minus 45 degrees to the axis of the birefringent switch (and parallel or perpendicular to the plane of polarization 40) will determine whether the dithered optical signal will be moved up, down, left or right relative to the undithered signal. If the switch 11 were a twisted nematic liquid crystal cell, the axis 40 may be parallel or perpendicular to one of the axes of the liquid crystal cell, and the orientation of the calcite 30 may be as shown in FIG. 4C relative to the plane of polarization of the light represented at 40 in FIG. 4A.

It will be appreciated that the arrangement of axes herein described are exemplary. The alignment of the switch 11, whatever that component is comprised of, preferably is such that the switch is able to change a characteristic of light in the display system 3, 13 (and others described herein, for example) so that selective dithering can be carried out by a double refraction or other functionally equivalent material or device. Orientation of the double refracting material may be such as to cause such selective dithering depending on an optical characteristic of the light, which is incident thereon and/or is transmitted therethrough, relative to the double refracting material.

Quarter wave plates, other wave plates, etc. may be used in conjunction with coupling of light along optical paths used in the electro-optical dithering system 1 and/or the optical display systems 3 or 13, etc. Also, such wave plates may be used to convert plane polarized light to circularly polarize light or vice versa, depending on the nature of the optical coupling occurring in the various components and optical paths and/or the switch 11 used in the invention.

Figure 5B:
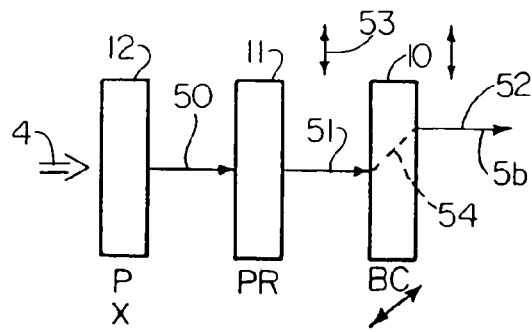
Figure 5C:
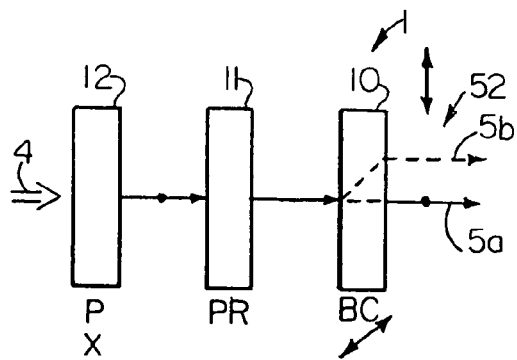

Referring to FIGS. 5A, 5B and 5C, operation of the EDS 1 according to the invention is depicted for use in the exemplary systems 3, 13, etc., which are expressly described herein, and in other display systems, too. Light 4, for example, from a CRT, is horizontally polarized by the polarizer 12. Arrow 50 represents such horizontal polarization, as does the dot in that arrow 50. The switch 11 is a birefringent liquid crystal cell of the type disclosed in the above-mentioned patents (such types sometimes being referred to as "surface mode" or "pi-cell" liquid crystal devices). When the switch 11 is in the high voltage state it does not affect the state of polarization of the light 50. Therefore, light 51 exiting the switch 11 also has horizontal polarization, e.g., into and out of the plane of the paper of the drawing. The light 51 enters the double refracting material (birefringent material) 10 and is transmitted without any deflection and is provided as output light 52 at the location and in the direction of arrow 5a.

Referring to FIG. 5B, when the switch 11 is in the low voltage state, it rotates the plane of polarization of the light 50 preferably 90 degrees, i.e., into the vertical plane, as is shown by the vertical arrow 53 associated with the light 51. The vertically polarized light enters the double refracting material 10 and its path is physically displaced, as is represented by dashed line 54 resulting in output light 52 at the location and in the direction of the arrow 5b.

Briefly referring to FIG. 5C, the electro-optical dithering system 1 is shown having the light output 52 selectively switched between the location of the arrows 5a when the switch 11 is in the high voltage (no rotation of plane of polarization) state and the location of the arrow 5b, which occurs when the switch 11 is in the low voltage (polarization rotating) state. The light represented by arrow 5a is horizontally polarized, and the light represented by the arrow 5b is vertically polarized, as is represented in the drawing of FIG. 5C. By selectively energizing and de-energizing or, in any event, operating the switch 11 between two mentioned voltage states, which switch the polarization characteristic of the light, the location of the output optical signal 52 can be switched between the locations represented by arrows 5a and 5b.

Figure 6:
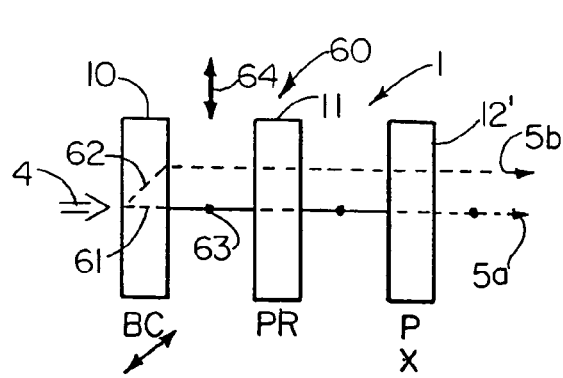
FIG. 6 is a schematic illustration of an alternate embodiment of electro-optical dithering system.

A modified optical display system 60 is shown in FIG. 6 using an electro-optical dithering system 1, as was described above, in combination with an output polarizer (analyzer) 12'. The analyzer 12' may be a linear (plane) polarizer or some other device which can discriminate between the characteristics of light incident therein, such as the direction of plane of polarization, circular polarization, etc. The parts of the electro-optical dithering system 1 include a birefringent material 10, such as a calcite material described above, and a switch 11, such as one of the liquid crystal cell devices described above, or some other device, as will be appreciated.

The incident light 4 is received from a light source or image source, such as a CRT 2 or some other device that delivers unpolarized light output. Such unpolarized light 4 incident on the birefringent material 10 is divided into two components 61, 62. The light component 61 is horizontally polarized and it is transmitted directly through the birefringent material 10 without deflection or refraction. The light component 62 is polarized in the vertical direction, and it is refracted so that its direction is changed (path is deflected) in the manner shown representatively in FIG. 6.

It will be appreciated that here and elsewhere in this description reference to directions is meant to be relative and exemplary; for example, horizontal and vertical are meant to indicate orthogonal relationship. Directions are exemplary and are used to facilitate description and understanding of the invention.

The horizontally polarized light component 61 and the vertically polarized light component 62, the directions of polarization being represented by the dots 63 and the arrow 64, respectively, are incident on the switch 11. From the switch 11 the light components 61, 62 are incident on the analyzer 12'. That light component which has a polarization direction that is parallel to the transmission axis of the analyzer 12' will be transmitted through the analyzer, and the other light component will be blocked. Depending on whether the switch 11 is in the operative state to transmit light without rotation of the plane of polarization or is in the operative mode to rotate the plane of polarization of the light transmitted therethrough, one or the other of the light components 61, 62 will be transmitted through the analyzer 12' at a respective location represented by one of the arrows 5a, 5b.

Figure 7:
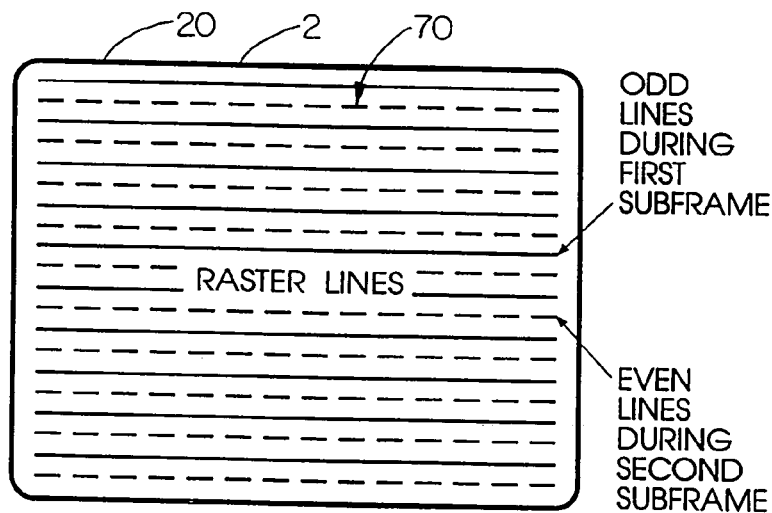
FIG. 7 is a schematic front view of the face or display output of a CRT showing exemplary raster lines.

An exemplary use of the invention is illustrated in FIG. 7 for the CRT display 2 or for a liquid crystal display 20, for example. The display 2, 20 has a resolution of some fixed number of raster lines or rows of pixels that are updated periodically, for example, 60 times per second.

Assume that the speed of the display is increased, for example, is doubled to 120 times per second to re-scan the raster lines and/or the rows of pixels. The switch 11 can be synchronized with the switching of the display (CRT 2 or liquid crystal display 20) such that the raster images, for example, are alternately displaced and not displaced, e.g., to locations 5a and 5b, respectively. Such synchronization may be with respect to the blanking pulse or some other signal.

The amount of such shifting or displacement can be adjusted as aforesaid so that the displaced raster lines (or pixel rows) interdigitate the non-displaced raster lines (pixel rows). The information on the displaced and non-displaced rasters (pixel rows) are selected to carry complementary information; and, therefore, the resolution of the entire image displayed by the optical display system 3 or 13 is increased by a factor of 2. The same technique can be used to provide image coverage over the dead space between adjacent pixels in a liquid crystal display (or in a CRT, e.g., where a shadow mask blocks transmission of electrons) or to cover areas where conductors or other electrical connections or components of a liquid crystal display, such as parts of an active matrix array, are located, usually between adjacent pixels.

The display ordinarily would be refreshed or updated 60 times per second to cover both the odd and even raster lines. However, by increasing the refresh or update rate to 120 times per second and using the electro-optical dithering system to shift the location of the output image or optical signal for part of the time, essentially the odd and even raster lines, while unshifted, can be refreshed or updated 60 times per second and the odd and even raster lines, while shifted, can be refreshed or updated 60 times per second. The update or refresh times or rates presented here are exemplary; others may be used.

In FIG. 7, assuming the display 2 is a CRT, the front face 70 has a plurality of odd raster lines and a plurality of even raster lines. During operation of the CRT display 2, initially the odd raster lines are scanned to produce a first subframe (field). Subsequently, the even raster lines are scanned, and a second subframe (field) is produced. The information produced during the respective first and second subframes is referred to as complementary and together complete an image (sometimes referred to as a frame or picture) that is viewed. The time between producing one subframe and the next is sufficiently fast that the eye of an observer (viewer) integrates the respective first and second subframe images to see one complete (composite) image. Similarly, using the principles of the present invention, the space between adjacent raster lines can in effect be scanned to produce additional complementary image information. Thus, for example, the odd lines can be scanned during the first subframe; the even lines can be scanned during the second subframe; the odd lines can be scanned during a third subframe but during which the switch 11 of the electro-optical dithering system 1 is operative to cause shifting of the image to the space between respective adjacent pairs of odd and even raster lines; and finally during a fourth subframe analogous to the third, the even raster lines can be scanned while the electro-optical dithering system provides a shift of optical output, to produce the shifted image between respective pairs of odd and even raster lines. In this way resolution of the output image produced by the optical display system 3 is increased without having to increase the resolution or space between relatively adjacent raster lines (scan lines) of the CRT display 2 and a similar technique can be used to increase the effective number of the pixels, pixel rows, etc. to increase resolution of the liquid crystal display 20.

Turning to FIGS. 8 and 9, an auto-stereoscopic display system 80 is shown using the electro-optical dithering system 1 of the invention. The principles of auto-stereoscopic display are well known and will not be described in detail here. However, the technique of obtaining the auto-stereoscopic display effect will be described.

In the auto-stereoscopic display 80, there is a CRT display 2, which provides a light output 4, which is delivered to a linear polarizer 12. The plane polarized light from the linear polarizer 12 is provided to the electro-optical dithering system 1, which includes a surface mode device (surface mode liquid crystal cell) switch 11 and double refracting material (birefringent material) 10. At the output of the electro-optical dithering system 11 is a cylindrical lens array 81. The cylindrical lens array includes a plurality of cylindrical lenses located in an appropriate arrangement or pattern, as is known, to direct light to or toward respective eyes 82, 83 of a person, or to some other device able to detect or "see" the light received thereby. By providing a left eye image to the left eye 82 and a right eye image to the right eye 83, an individual viewing the auto-stereoscopic display system 80 will discern a three dimensional or stereoscopic effect.

Using the electro-optical dithering system 1 of the invention in combination with a display source, such as a CRT display 2, a liquid crystal display 20, or some other display, light beam steering can be accomplished to obtain the left eye and right eye images. Therefore, auto-stereoscopic display systems can be provided easily and relatively inexpensively.

In FIG. 9 the technique for obtaining beam steering for auto-stereoscopic effect is illustrated. Incident light 4, which is unpolarized, as is represented by the arrows and dots on the light is incident on the plane polarizer 12. Alternatively, plane polarized light can be provided from an image source or light source, such as a liquid crystal display (and polarizer 12 may be eliminated). In any event, the light which exits the polarizer 12 is plane polarized, for example, in a horizontal plane, as is illustrated in FIG. 9. Such light then enters the switch 11 and from there the light enters and transmits through the double refracting material 10. Depending on whether the switch 11 rotates the plane of polarization or it does not rotate the plane of polarization of the light transmitted therethrough, the double refracting material 10 will deflect or will not deflect the light transmitted therethrough. In the case that the switch 11 does not rotate the plane of polarization, and the above-described alignment of the double refracting material 10 is provided, the light will transmit directly through the material 10 without deflection as light ray 90. When light ray 90 is transmitted through the interface 91 between the cylindrical lens 92 of the cylindrical lens array 81 and the external environment, such as air, represented at 93, the light 90 will refract in the direction of the arrow 94 toward the left eye 82 of the observer (viewer). The light 90 traveling in the direction of the arrow 94 remains polarized in the so-called horizontal direction, i.e., into and out of the plane of the paper of the drawing.

However, when the switch 11 rotates the plane of polarization of light transmitted therethrough, the double refracting material 10 deflects the light, as was described above, resulting in the light 95, which travels to a different location of the interface 91 of the lens 92. The light 95 refracts at the interface 91 and is bent or deflected in the direction of the arrow 96 toward the right eye 83 of the observer. The light 95 is vertically polarized, i.e., the plane of polarization is parallel with the plane of the paper of the drawing of FIG. 9.

In operation of the auto-stereoscopic display 80, left eye and right eye images sequentially are produced by the display 2 (20) for example. When the left eye image is displayed, the switch 11 does not rotate the plane of polarization, and the light 90 follows the direction of the arrow 94 to the left eye 82 of the observer. When the right eye image is produced by the display, the switch 11 does rotate the plane of polarization so that the material 10 deflects the light as light 95 which is refracted to the direction of the arrow 96 to the right eye 83 of the observer. For convenience of this description, it is understood that the indices of refraction of the material 10 and the material of which the lens 92 is made would be the same or about the same to avoid further refraction at the interface therebetween; however, if there is refraction there, such refraction can be taken into account, as will be appreciated by those having ordinary skill in the art.

Referring to FIGS. 10 and 11, a display system 99, which includes a liquid crystal display 100, is shown in top plan and top section views. The display system 99 is similar to the several other display systems described herein, such as those designated 3, 13, etc. The LCD 100 has a plurality of pixels 101 arranged in respective rows 102 with dead space 103 between respective rows and also at the edge 104 of the display 100. As is seen in FIG. 11, the liquid crystal display 100 includes a substrate 105 on which an active matrix array 106 is located. The liquid crystal display also includes a further substrate 107, a space 108 between substrates where liquid crystal material 109 is located, a seal 110 to close the space between the substrates, and (not shown) appropriate driving circuitry, as is well known. Light 120 represented by respective arrows illustrated in FIG. 11 is provided by a light source 121 and is selectively transmitted or not through the liquid crystal display. The light 120 is plane polarized by a plane polarizer 122 located between the light source 121 and the liquid crystal display 100, and the light 120 is transmitted or is not transmitted as a function of the plane of polarization thereof relative to an analyzer 123, as is well known. An electrode 124 on the substrate 107 and respective transistors and electrodes of the active matrix array 106 on the substrate 105 apply or do not apply electric field to liquid crystal material 109 at respective pixels 101 to determine whether or not the plane of polarization of light 120 is rotated and, thus, whether such light will be transmitted or will not be transmitted through the analyzer 123.

The light 120 which is transmitted through the analyzer 123 is incident on the electro-optical dithering system (EDS) 1. The electro-optical dithering system may be operated to not shift or to shift the location of the light 120 to locations 5a, 5b in the manner described above. If the optical signal at locations 5a, 5b is complementary, as was described above, the resolution of the optical display system 99 shown in FIG. 11 can be increased. Moreover, as part of such increased resolution, the dead space 103 where transistors 131 and/or other components that are not light transmissive in the active matrix array 106 effectively are covered over by the shifted light 5b, for example. Therefore, using the electro-optical dithering system 1 in a display system 99 as described, the light blocking portions of the active matrix array, of conductors, etc., can be in effect overcome or negated while the overall resolution of the display is improved.

The parts shown in FIGS. 10 and 11 are in a relatively horizontal relation showing dithering in a vertical direction. It will be appreciated that dithering can alternatively be in a horizontal direction or, if desired, multiple electro-optical dithering systems 1 can be used in optical series in order to obtain both vertical dithering and horizontal dithering.

The LCD 100 preferably is relatively fast acting to turn on and off. Therefore, using the combination of the fast acting LCD with the EDS 1 the respective lines of one subframe of information can be displayed by the respective rows of pixels of the LCD and subsequently the interlaced lines of the next subframe can be displayed by the same respective rows of pixels of the LCD.

The light source for the LCD 100 may be a pulsed source, which produces light output in pulses or sequential bursts. In such case, it is desirable to synchronize the light pulses or bursts of the light source with the LCD and/or with the EDS 1. Therefore, the respective pixels of the LCD would transmit or block light when the light source is producing a desired light output. The amount of time that the light source is transitioning between a light transmitting or light blocking state may be reduced and preferably is minimized. Also, the LCD would be operative to transmit or to block light when the light source is producing its intended light output rather than when the light source is not producing a burst of light or a desired light output. This tends to increase the contrast of the output image, since the shutter element (LCD 100) is not changing state when the light is pulsed, e.g. is changing its state from light producing to not producing or vice versa.

The EDS 1 and the LCD 100 preferably are synchronized. Therefore, when the LCD is producing scan lines of information from one subframe the EDS is in one state, and when the LCD is producing scan lines of information from the other subframe, the EDS is in its other state thereby causing the lines of one subframe to be interlaced with the lines of the other subframe. The EDS and a pulsating type light source also may be synchronized so that the EDS switches states during the time that no light output or non-optimal light output is produced by the light source. This further enhances contrast of the display system 3, 13, 99.

Figure 12:
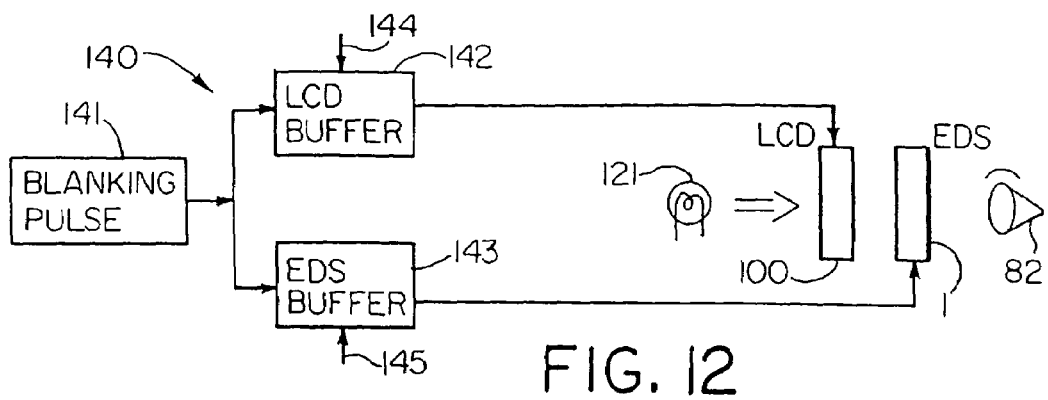
FIGS. 12 and 13 are schematic block diagrams of synchronizing circuit techniques useful in the various display systems of the invention.

Various circuitry may be used to obtain the aforementioned synchronization. Two examples are shown, respectively, in FIGS. 12 and 13. In FIG. 12 an exemplary display system 140 is shown. In the display system 140 a blanking pulse from a source 141 is supplied to respective LCD buffer and EDS buffer circuits 142, 143 to synchronize operation of them. The actual information signals from line 144 indicating the light transmitting or blocking state, for example, of the pixels of the LCD 100, for example, as is shown in FIGS. 10 and 11, are provided the LCD buffer 142. Those information signals are not delivered to the LCD 100, though, until appropriately coordinated or synchronized with the blanking pulses. The EDS 1 is connected to the EDS buffer 143 and receives its drive signal from line 145 to dither or not the optical output from the LCD 100. The EDS buffer also receives the blanking pulse from the source 141 to synchronize delivery of the signals to the EDS with such blanking pulses and/or with the operation of the LCD buffer and information signals delivered to the LCD. The buffers 142, 143 can be synchronized with respect to each other by appropriate timed operation thereof with respect to the blanking pulse; or, alternatively, the buffers can be directly coupled to each other to synchronize operation thereof so that the dithering function is coordinated with switching of pixels or writing of information to the LCD.

Figure 13:
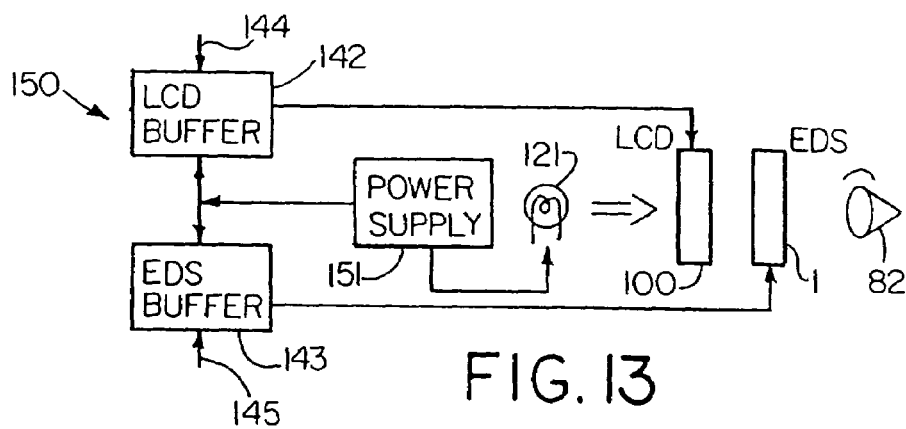

As another example of synchronization, FIG. 13 depicts a display system 150 in which a pulsed light source 121, for example, receives pulsed power from a power supply 151. A signal representing the characteristics of the pulsed power from the powers supply 151 is provided to the LCD buffer 142 and EDS buffer 143, which respectively receive information and power signals on lines 144, 145 as described above. By synchronizing the LCD 100 and EDS 1 with respect to each other and/or with respect to the pulsing light source, the LCD can switch states as new information is written thereto when the light source is not producing significant light output, and/or the EDS can switch from direct transmission to dithered transmission of light states when the light source is not producing a bright output and/or the LCD is not in the process of switching display states.

The foregoing are but two examples of synchronization useful in the various display systems and embodiments of the invention. It will be appreciated by those having ordinary skill in the art that many other types of synchronizing techniques may be used to obtain the desired synchronization.

Although it may be desired to obtain full interlacing and separation of respective lines as in a CRT display, for example, even less than full interlacing, e.g., an amount of displacement that does not fully separate the lines but nevertheless reduces the amount of overlap thereof, will tend to reduce the above-mentioned jitter and improve the optical output of the LCD.

Interlacing or dithering can be used to effect vertical displacement (changing of location of the optical output signal), horizontal (lateral) displacement, and/or diagonal displacement of the optical signal, such as that produced as the output from a pixel of a display, e.g., a CRT, LCD, or any other type of display. The direction of displacement will depend on the orientation of the various components of the optical system. For example, in the EDS of FIG. 1 having orientation of axes of components shown in FIGS. 4A, 4B and 4C, vertical displacement will occur. However, by changing the relative orientation of the axes by 45 degrees or 90 degrees, the displacement as a function of the state of the switch 11, for example, can be changed to diagonal or horizontal.

Using the vertical displacement of optical signals by the EDS 1 in combination with a display, such as an LCD, for example, it possible in effect to double the resolution of the display in the manner described above. Thus, in a sense, the EDS becomes an optical line doubler which doubles the number of horizontal lines of resolution of the display system. However, by using both vertical and horizontal displacement functions in a display system, it is possible to obtain in effect up to quadruple the resolution of the display relative to operation of the display absent the EDS.

Referring to FIGS. 14 and 15A-15E an EDS system 201 used with a display 202, in the illustrated embodiment an LCD (although other types of displays can be used), is shown as a display system 203. In FIGS. 14 and 15A-15E reference numerals which designate parts that are the same or similar to those described above are the same as the reference numerals that designate such above-described parts except being increased by the value 200. Thus, display system 203 is similar to display systems 3, 13, 99, etc. mentioned herein.

However, the EDS system 201 of display system 203 includes two EDS portions 201$v$ and 201$h$, which respectively can be operated to obtain vertical and horizontal displacement of the optical signal transmitted therethrough. Each EDS 201$v$, 201$h$ includes, respectively, a double refracting material 210$v$, 210$h$ and a switch 211$v$, 211$h$. For example, each double refracting material may be a calcite crystal and each switch may be a surface mode (birefringent) liquid crystal cell. The source of optical signals in display system 203 is a flat panel liquid crystal display 202, although other types of displays may be used. The LCD 202 provides light output that is plane polarized, and, therefore, a separate polarizer like the polarizer 12 of FIG. 1, for example, may be unnecessary in the illustrated embodiment of display system 203. It will be appreciated that although the display system 203 uses two EDS devices or portions, the principles of the invention may be used with more than two EDS portions to obtain not only horizontal and vertical displacement but also displacement in even another direction.

The relative orientation of the axes of the respective components of the display system 203 is shown in FIGS. 15A-15E. Plane (linear) polarized light having a horizontal plane of polarization is provided by the LCD 202, as is seen in FIG. 15A. In the vertical displacement EDS 201$v$, the axis of the birefringent liquid crystal switch 211$v$ shown in FIG. 15B is oriented at 45 degrees to the plane of polarization of light from the source 203; in the illustrated embodiment, such orientation is actually −45 degrees relative to vertical, for example. The projection of the axis of the double refracting material 210$v$ is vertical, as is seen in FIG. 15C. In the horizontal displacement EDS 201$h$, the axis of the birefringent liquid crystal switch 211$v$ is oriented at +45 degrees to the vertical (FIG. 15D), and the projection of the axis of the double refracting material 210$h$ is horizontal (FIG. 15E). The actual alignments may be slightly different from those illustrated to accommodate or to compensate for residual birefringence in the liquid crystal switches and/or for other purposes. Also, if desired wave plates and/or other optical components may be included with one or more of the EDS devices 201$h$, 201$v$ to compensate for such residual retardation and/or other factors.

The display system 203 can be operated in four different states. In one state shown in FIG. 16A with both EDS devices 201$v$, 201$h$ of FIG. 14 not displacing light, the light from the display source 202 is transmitted without being displaced; this may occur with birefringent switches 211$v$, 211$h$ being in high voltage, non-polarization rotating state and low, polarization rotating states, respectively. In a second state shown in FIG. 16B with EDS device 201$v$, 201$h$ respectively not displacing and displacing light, the light from the display source 202 is transmitted while being horizontally, but not vertically displaced; this may occur with both birefringent switches 211$v$, 211$h$ being in high voltage, non-polarization rotating state. In a third state shown in FIG. 16C with both EDS devices 201$v$, 201$h$ displacing light, the light from the display source 202 is transmitted while being displaced both horizontally and vertically; this may occur with both birefringent switches 211$v$, 211$h$ being in low voltage, polarization rotating state. In a fourth state shown in FIG. 16D with EDS device 201$v$, 201$h$ respectively displacing and not displacing light, the light from the display source 202 is transmitted while being vertically, but not horizontally displaced; this may occur with EDS 211$v$ in the low voltage, polarization rotating state and birefringent switch 211$h$ being in high voltage, non-polarization rotating state.

Figure 17:
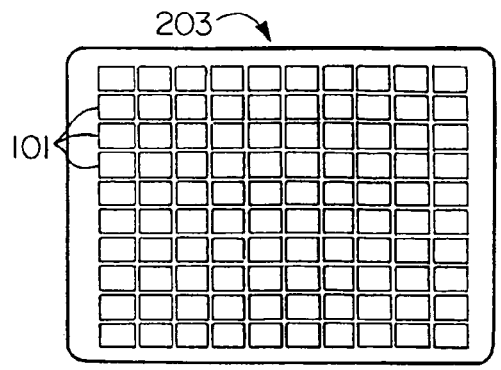
FIG. 17 is a composite of the pixel patterns of FIGS. 16A-16D.

In FIG. 17 is illustrated a composite of the display conditions depicted in FIGS. 16A through 16D. By using relatively fast acting LCD as the display source 202 and two EDS devices 201$h$, 201$v$ synchronized and operated in the manner just described so that the pixels first are shown in the manner in FIG. 16A, then as in FIG. 16B, etc., sufficiently quickly that the observer's eyes tend to integrate the respective images, a high resolution image with a pixel density like that shown in FIG. 17 can be obtained. It will be appreciated that an exemplary optimum improvement in resolution using the display system 203 in the described manner can increase resolution of the display 202 by approximately a factor of 4.

Thus, it will be appreciated that the respective switches 211$v$, 211$h$ may be operated according to the following table to obtain the above-described operation controllably to vertically shift or displace and/or to horizontally shift or displace the optical signals from the display 202. High means electrically operated so as to be not polarization rotating and low means electrically operated so as to be polarization rotating, although other conventions may be used.

TABLE 1

| Switch 211v | Switch 211h |
|---|---|
| High | Low |
| High | High |
| Low | Low |
| Low | High |

In the present invention the switches and double refracting material may be substantially optically transparent. Therefore, those components do not tend to absorb light. The use of such components in a display system 203, for example, does not ordinarily significantly reduce the brightness of the display output. Although two or more images are placed sequentially in the field of view provided by the display system 3, 13, 99, 203, etc., brightness of the display output is not diminished; rather, image resolution can be increased.

Other types of birefringent materials and/or devices may be used in place of or in addition to the calcite material double refracting device 10 described above. For example, other types of crystal materials and/or minerals may be used; the amount of displacement between an unrefracted optical signal and a refracted optical signal by such double refracting material would depend on index of refraction characteristics of the double refracting material, the index of refraction of the environment external of the double refracting material, wavelength of optical signal, and distance the optical signal travels in the double refracting material.

Another double refracting material which may be used in the invention as component 10, for example, is liquid crystal material. Liquid crystal material, such as nematic liquid crystal and smectic liquid crystal material may be birefringent and may be used. Other types of birefringent liquid crystal materials also may be used. By organizing or orienting the liquid crystal material in a particular organization or orientation, the transmission of light therethrough with or without refracting the light can be dependent on the direction of electric vector of the light, e.g., the plane of polarization of plane polarized light.

A polymer liquid crystal may be especially useful as such a double refracting material, for such material both can have a relatively large birefringence and also can be formed into a solid material which maintains the orientation of the structure of the liquid crystal material thereof. Polymer liquid crystal materials are known.

However, if the double refracting material were of a liquid crystal material whose structural orientation or organization could be switched, e.g., in response to application of a prescribed input such as an electric field (or removal of such field or changing voltage or some other characteristic of the field, etc.), then the function of the two components of an EDS may be replaced by a single switchable liquid crystal shutter type device. In this case the liquid crystal shutter could provide one index of refraction or birefringence characteristic to refract light transmitted therethrough a given amount and a different index of refraction characteristic with no birefringence so as not to refract such light or with parameters to refract the light a different amount.

Figure 18:
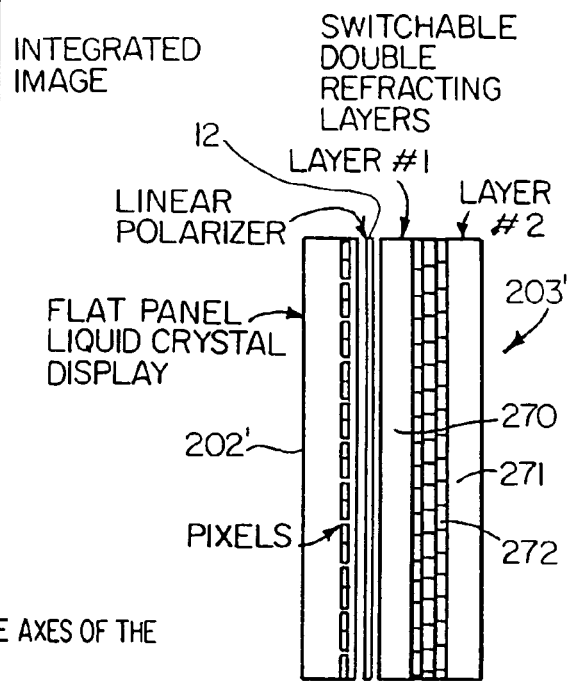
FIGS. 18 and 19 are schematic illustrations of a display system with a double electro-optical dithering system and parts thereof using switchable liquid crystal birefringent devices.
Figure 19:
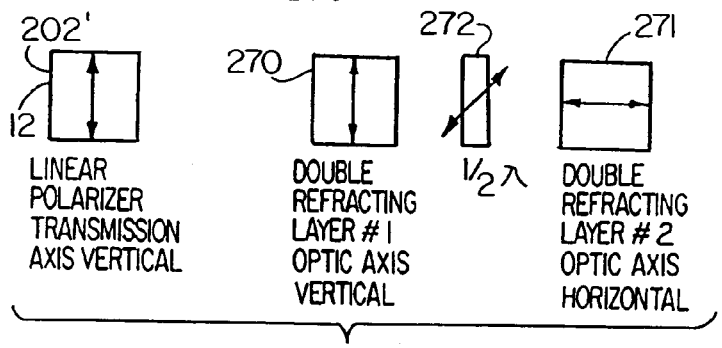

An embodiment of display system 203' which uses a pair of switchable liquid crystal cells 270, 271 associated with a liquid crystal display 202' is shown in FIGS. 18 and 19. Each of the liquid crystal cells 270, 271 functions as a combination of birefringent or double refracting material 210h, 210v and as a switch 211h, 211v. The liquid crystal cells may be, for example, aligned like a birefringent liquid crystal cell using nematic or smectic liquid crystal material between a pair of glass plates. The plates are treated so the liquid crystal is aligned generally in the same direction at both plates without twisting; and, therefore is so aligned throughout the cell. The liquid crystal material preferably is tilted, e.g., at 45 degrees, to obtain a desired birefringence characteristic; but although tilted, the projection of the axis of the liquid crystal structure would be in the same plane as the plane of polarization of incident light thereon to obtain the desired birefringence characteristic. The exemplary arrangement of axes of the display system 203' is shown in FIG. 19.

By changing the electrical drive signal to the respective liquid crystal cells 270, 271, the index of refraction characteristics thereof can be changed, and, as a result, the location of the optical signal transmitted therethrough can be changed, e.g., dithered as described herein. For example, for plane polarized light incident on liquid crystal cell 270 which has liquid crystal therein structurally aligned such that the light experiences the ordinary index of refraction of the liquid crystal and no birefringence, the light will transmit directly through the liquid crystal cell without refraction. However, if the liquid crystal is structurally aligned such that the light experiences the extraordinary index of refraction and, thus, birefringence, the light will be refracted at the interface between the liquid crystal material and the glass plate or the like forming or at one surface of the liquid crystal cell 270 at one side; and the light will be refracted again at the interface between the liquid crystal and the glass plate etc. at the other surface of the liquid crystal cell so as to be parallel with the light incident on the liquid crystal cell 270 but displaced from the extension of the transmission axis of the incident light.

Thus, by selectively operating, e.g., energizing and deenergizing or changing energization level, the liquid crystal cells 270, 271, then, can change the location of the optical signal output by the display system 203'. The liquid crystal should be aligned to present to the light transmitted therethrough either the ordinary or extraordinary axis or index of refraction and appropriate birefringence characteristic as described above. If only one liquid crystal cell 270 is used, the optical signal can be changed back and forth in one plane or direction. If two liquid crystal cells 270, 271 (like the cell 270, for example) are used and are arranged such that the axes thereof are non parallel, then the optical signal can be changed back and forth in two planes or directions. Such non-parallel alignment may be perpendicular alignment to obtain up/down dithering and left/right dithering relationships. Since the plane of polarization of light incident on the liquid crystal cell 271 should be parallel to the axis of that cell, a half wave plate 272 may be placed between the liquid crystal cells 270, 271 to rotate the plane of polarization of the light exiting the liquid crystal cell 270. For example, the axis of such half wave plate may be oriented at 45 degrees relative to the plane of polarization, i.e., half way between the 90 degrees desired rotation. It is noted that a polarizer 12 is shown in FIGS. 18 and 19; such polarizer helps assure the quality of polarization of the light from the display; but such polarizer can be eliminated if the output from the display is of sufficient quality of polarization, e.g., minimal amount of unpolarized light included therein.

Figure 20:
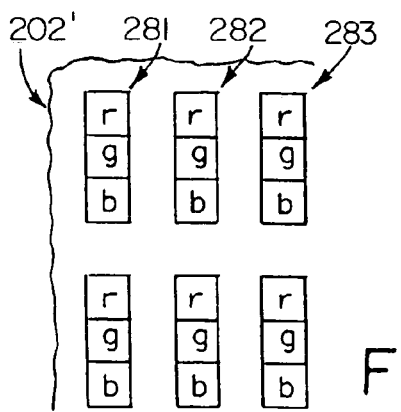
FIG. 20 is a schematic illustration of part of a red, green and blue pixel arrangement for a multicolor display.
Figure 21:
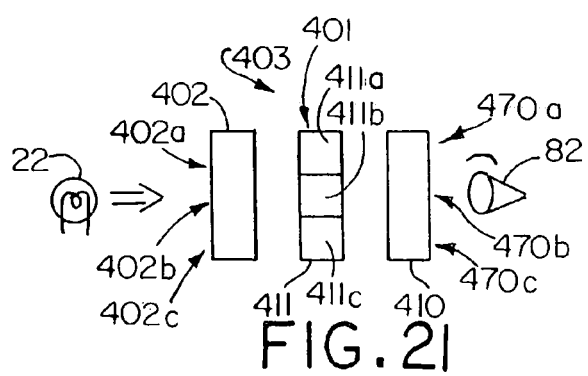
FIG. 21 is a schematic illustration of a segmented display system with selective time sequenced dithering of respective segments.

The EDS 1, 201 may be used in a display system 3, 13, 99, 203, 203', etc. which is monochrome or multicolor. Operation for a monochrome display system would be, for example, as is described above. One embodiment exemplifying operation for a multicolor, such as a red, green and blue (rgb), display system can employ the above-described type of operation for each color. Therefore, when one color or a group of colors is being displayed by respective pixels of such a color display, the optical signal output can be either transmitted without displacement or with displacement in the manner described above. As is depicted schematically in FIG. 20, part of a display 202', e.g., similar to display 202, is shown including three representative adjacent pixel triads 281, 282, 283, each including a red, green and blue pixel portion. The display 202' may be operated in a color frame sequential mode in which respective red, green and blue frames or images are produced in time sequence. In this case all red pixels of respective pixel triads 281, 282, 283, etc. would be red where it is desired in the final image to have red light; subsequently green and then blue pixels of the image would be created. Alternatively, the respective red, green and blue pixels of respective triads can be displaying respective colors simultaneously. In either case, the principles of the invention using the EDS 1, 101, etc. may be used to increase resolution of the output image in the above-described manner.

However, the EDS may be used for the purpose of selectively dithering (displacing) less than all of the color frames of a multicolor display, especially if the display is operated in a color frame sequential mode. For example, the dithering function can be used selectively to displace or not the green optical signal (light produced during the green frame) of the display 3, 13, 99, 203, 200'; however, the EDS may be used so it does not selectively to dither the optical signal during one or both of the other color frames. Since the human eye is more sensitive to green light than to red or blue light, a significant enhancement of the apparent resolution of the multicolor display can be achieved by only selectively dithering the green light optical signal. If desired, the green and red optical signals can be selectively dithered without selectively dithering the blue optical signal; and this will result in an even greater apparent resolution of the multicolor display than if only the green optical signal were selectively dithered. Since the human eye is not as sensitive to blue light as it is to red or green light, the fact that resolution of the blue light or blue frame component of the overall image is not enhanced by the dithering of the invention may not significantly reduce the resolution of the composite multicolor output image. By reducing the amount of dithering required, it is possible that the complexity and/or cost of the electronic drive and timing circuitry employed in the invention can be reduced.

Figure 22A:
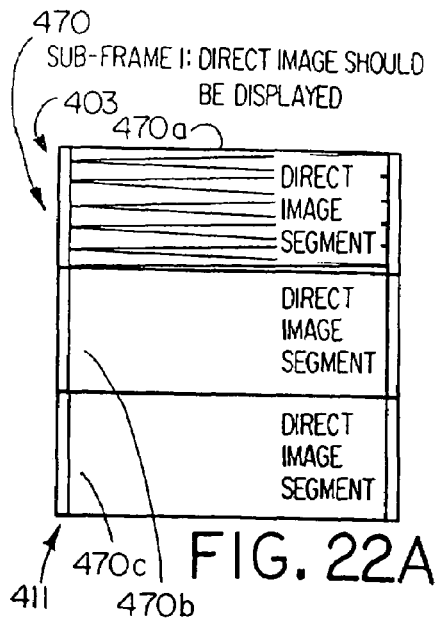
FIGS. 22A-22F are schematic illustrations of the segmented display system of FIG. 21 showing the time sequence of operation thereof.
Figure 22D:
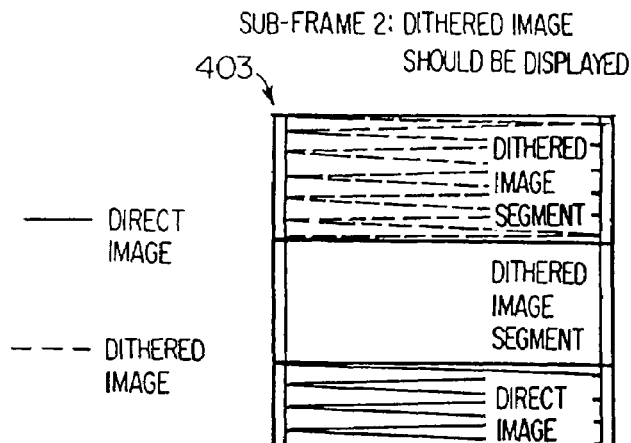
Figure 22B:
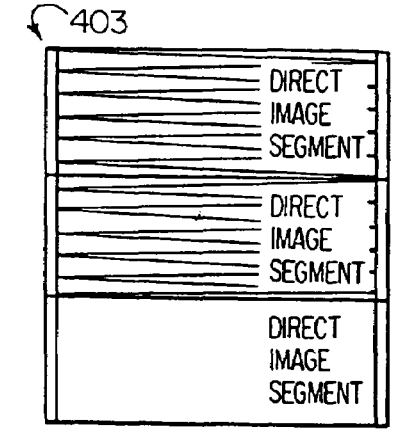

Referring to FIGS. 21, and 22A-22F, there is shown a schematic illustration depicting a time sequence of operation of the invention using a segmented display system 403. FIG. 22A represents the output operation of the display system 403 at one period of time; FIG. 22B represents operation at the next period of time; and so on. In FIGS. 21 and 22A-22F the various parts which correspond to parts described above are identified by the same reference numerals but increased to a 400 series. Thus, display system 3, 13, 99, 203, 203', etc. in FIGS. 21 and 22A-22F is designated 403, for example.

The face 470 of the display system 403 in FIGS. 21 and 22A-22F is divided into three separate segments 470a, 470b, 470c. More specifically, the display 402 may include a CRT or an LCD 2, 20, 102, etc., and between the display and the viewer, for example, is at least one, and possibly several in series, electro-optical dithering system 1, 11, 21, 101, as was described in the several embodiments above. For simplicity of description here the display system 403 is described with only one EDS, though.

The EDS 401 includes, for example, a double refracting material 410 and a switch 411 such as a surface mode liquid crystal cell. However, the switch 411 is segmented into several areas which can be separately addressed to change the optical characteristics thereof. The switch 411 is shown in FIGS. 21 and 22A-22F as having three separate segments 411a, 411b, 411c; but it will be appreciated that the switch may have fewer or more segments. Each segment 411a, 411b, 411c can be separately operated to change or not to change the direction of plane of polarization of light transmitted therethrough. Each segment can be a separate liquid crystal cell or each can be part of the same liquid crystal cell which has an electrode arrangement which permits operating of the different parts separately.

Figure 22E:
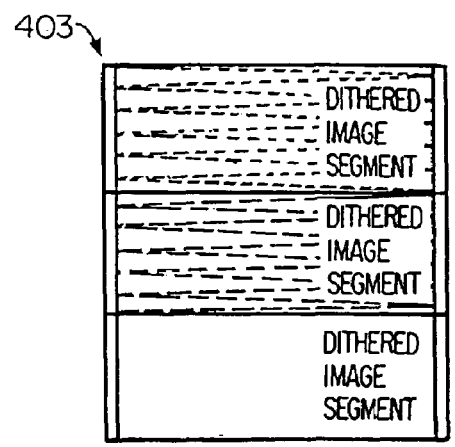
Figure 22C:
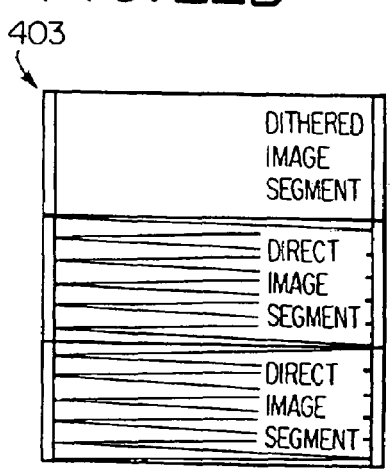
Figure 22F:
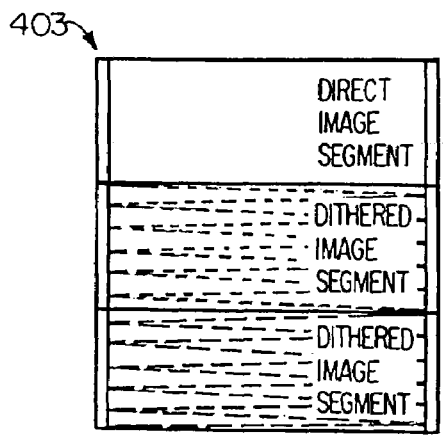

In FIGS. 22A, 22B, 22C, respectively, (with reference also to FIG. 21) the first subframe (field) of information is written sequentially to the upper, middle and lower thirds 402a, 402b, 402c of the display 402 for direct transmission without being dithered or shifted in position. By the time the information is being written to the middle third of the display 402, the information written to the top third begins fading; and by the time the information is being written to the bottom third, the information at the top third is substantially fully faded and that at the middle third is beginning to fade.

In FIG. 22D the start of information representing the second subframe (field) being written to the display 402, initially to the top third 402a of the display, is shown. The dithered information optical signal in the top third of FIG. 22D is represented by the illustrated dashed lines. Since such information is for the second subframe, the optical signal output is intended to be dithered/changed; however, at this time the image or optical output presented by the middle third 402b of the display 402 has not completely faded. Therefore, if the optical output of the entire display 402 were dithered at this time, the optical information or optical output signal still being displayed at the middle third would be shifted to an incorrect location. To avoid this wrongful shifting of the optical signal from the middle third at this time, only the top third 402a of the display 402 is dithered. Preferably the top third actually is dithered when the previous image there has faded; and that actually can occur at the time period represented in FIG. 22C.

At the time period represented by FIG. 22D the middle third of the display 402 has faded, and is dithered; and at the time period represented by FIG. 22E, information is written to that dithered middle third of the display, and the bottom third which has faded is dithered. At the time period represented by FIG. 22F, the dithered image information is written to the bottom third of the display 402 and the top third is dithered since the information previously written there by now has faded.

The above-described operation of the display system 403 can continue sequentially as the respective subframes are sequentially displayed, e.g., the optical signals comprising such subframes are presented as the output of the display system. In each subframe the different respective parts or segments are sequentially dithered or not preferably so that a segment is already undithered or dithered before the raster, line, row, etc. of information to form the optical signal is written to the respective pixels of that segment. The dithering or undithering switching action, e.g., operation of the respective switches 411a, 411b, 411c from one state to the other, also can be carried out as the action of writing information to a segment is carried out; but ordinarily it would be better to effect the dithering or undithering when the segment is relatively blank (e.g., information there has faded) to avoid undertaking a dithering or undithering action while an optical output is being displayed.

It will be appreciated that the segmentation technique may be used with display system which uses a CRT display, a liquid crystal display or some other type of display. The segmented switch 411 approach also is useful to remove artifacts caused by a relatively slow acting LCD.

Further, it will be appreciated that the various EDS embodiments of the present invention and display systems using such EDS embodiments are operative to move, shift, translate, etc. an output optical signal from one location to another without substantially affecting brightness of the display system or optical signal. The components of the EDS generally are optically transparent, and, therefore, other than a relatively minor amount of absorption of light transmitted therethrough, there may be otherwise relatively little reduction in light intensity. Therefore, the features of the invention may be used for the various purposes described herein, for example, to increase resolution, to cover or to reduce the effective optical dead space, etc., without reducing brightness of the optical output.

A passive dithering system 500 in accordance with one aspect of the present invention is illustrated schematically in FIG. 23 in an optical display system 501. The passive dithering system 500 as shown is used in connection with a display 502 which produces an output of polarized light, such as might be produced by a twisted nematic (TN) based flat panel liquid crystal display 504 incorporating a linear polarizer 506 or by a CRT display with an added linear polarizer interposed, as is the polarizer 506, between the CRT display and the dithering system 500. The dithering system 500 includes a pair of double refracting or birefringent material layers 508h, 508v, such as a calcite crystal material, separated by a half wave plate 510. A wave plate 512, such as a quarter wave plate, turns plane polarized light into circularly polarized light; circularly polarized light can mathematically be resolved into equal amplitudes of vertical and horizontal plane polarization separated in phase by 90°. Thus, the quarter wave plate in a sense separates incident plane polarized light into relatively orthogonal plane polarized components for delivery to the birefringent material 508h as an input for the dithering system 500. The effect of the passive dithering system 500 can be to enhance the resolution of the display output by reducing fixed pattern noise in the display. The passive dithering system 500 can increase the number of output pixels provided simultaneously by an optical display system.

In FIG. 24a a very generalized example of the function of the passive dithering system 500 is shown considering an image 520a created by a single pixel 520 of the flat panel liquid crystal display 504 separated from adjacent pixels 522 in the display by optical dead space 524. The birefringent material 508h effectively creates a double image 520b of the image 520a which is displaced or dithered in, for example, a horizontal direction, as is shown in FIG. 24b. The second birefringent material 508v, which receives both images 520a and 520b, creates a second pair of images 520c, 520d displaced vertically from the first pair of images as is shown in FIG. 24c. In this way, the image produced by a single pixel, such as exemplary pixel 520, can be made to fill or at least to increase the fill of the optical dead space 524 between the pixels 522 which is typically used to electrically isolate adjacent pixels and to accommodate circuitry and electrical components. In other words, the dithering system 500 increases the fill factor of the display 502 as viewed. Therefore, the passive dithering system 500 expands or enlarges the respective pixels. In the example of FIGS. 24a, 24b, 24c, the pixel 520a can be said to have been expanded or enlarged to cover the area shown in FIG. 24c being occupied by images 520a, b, c, d.

If desired, the locations at which the passively dithered or created images 520b, c, d are placed may be other than or in addition to the optical dead space 524. For example, such image may be placed to overlap another image or pixel, to overlap several images or pixels, image(s) and optical dead space, etc., for example, as is described further below.

Figure 25B:
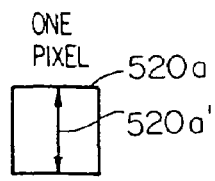
FIG. 25 is a schematic illustration of the orientations of the optic axes of the components of the passive dithering system of FIG. 23.

One possible manner of orienting the axes of the optical components of the passive dithering system 500 in the optical display system 501 is shown in FIG. 25a. The linear polarizer 506 or polarized display output is oriented vertically so that an image of a pixel emerging from the polarizer or display will be linearly polarized in a vertical direction, as is shown at pixel 520a in FIG. 25b. In FIGS. 25b-g the respective arrows represent direction or plane of polarization of light. The quarter wave plate 512 is aligned with its axis 512' at 45° to the plane of polarization of the plane (linearly) polarized light incident thereon, e.g., from the polarizer 506. With this arrangement the quarter wave plate 512 converts the incident plane polarized light to circularly polarized light. Circularly polarized light in effect can be resolved into two orthogonal plane polarized components 520a', 520a" which are out of phase by 90°, and such resolution is shown for pixel 520a in FIG. 25c. The birefringent material 508h is arranged relative to the linear polarizer 506 and quarter wave plate 512 with the projection of its optic axis 508h' into the plane of the polarizer 506 and quarter wave plate 512 being horizontal, e.g., parallel to the polarized light component 520a" and perpendicular to the polarized light component 520a'. The axis 510' of the half wave plate 510 is oriented at +22.5 degrees to vertical, and the second birefringent material 508v is oriented with the projection of its optic axis 508v' into the plane of the polarizer 506, etc. being vertical. It will be appreciated, however, that this arrangement is only one of many possible arrangements of the axes of the components which would produce the dithering or pixel expanding or enlarging effect described herein and/or similar or equivalent effects.

With further reference to FIGS. 25a-g, which additionally illustrates the path of an image through the passive dithering system 500, the path of the exemplary pixel image 520a through the system will be described in greater detail. As oriented, the linear polarizer 506 transmits optical information in the form of pixel images from pixels in the display which have effected the light transmitted therethrough so as to be polarized in the direction of the transmissive axis 506' of the linear polarizer. For the exemplary image 520a in FIG. 25b, the light would thus be polarized in a vertical direction represented by arrow 520a'.

Since the plane of polarization of the image 520a is at a 45 degree angle to the optic axis 512' of the quarter wave plate 512, the quarter wave plate converts the plane polarized incident light to circularly polarized light. The circularly polarized light can be resolved or considered as two plane polarized light components 520a', 520a" (FIG. 25c) the planes of polarization of which are orthogonal and the phases of which are 90° out of phase. It will be appreciated that other means or techniques may be used to divide the plane polarized light, which is delivered to the birefringent material 508h, into plural components which are acted on differently by the birefringent material, for example acted on in the manner illustrated in FIGS. 25a-g or in some other manner.

Figure 25C:
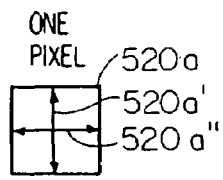
Figure 25D:
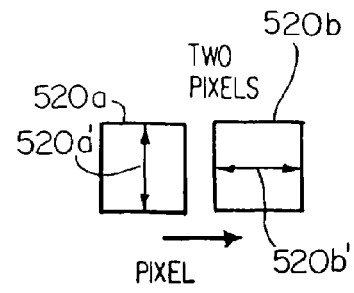

Since the plane of polarization 520a" of some of the light representing pixel 520a in FIG. 25c, which is incident on the birefringent material 508h, is in the place of the optic axis 508h' and encounters birefringence due to the tilting of the optic axis 508h' as was described above, e.g., with respect to FIGS. 1-6, such light is refracted by the birefringent material to form the pixel 520b at a location displaced, for example, to the right from pixel 520a, as is seen in FIG. 25d. Also, since the plane of polarization 520a' of some of the light representing pixel 520a in FIG. 25c, which is incident on the birefringent material, 508h, is perpendicular to the optic axis 508h', the path of such light is not altered by the birefringent material, and pixel 520a is located as is shown in FIG. 25d. Summarizing, as the orthogonally related polarized components pass through the birefringent material 508h, one of the polarized components will be refracted and deflected horizontally while the other component will be unaffected. As a result, the birefringent material 508h will yield two images, an image 520a in its original location and a horizontally displaced image 520b with the images being polarized orthogonally to one another.

Figure 25E:
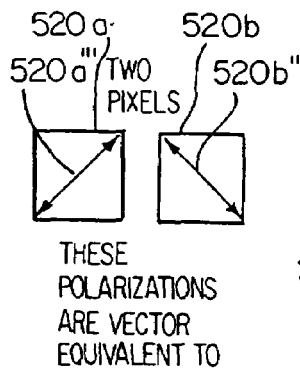
Figure 25F:
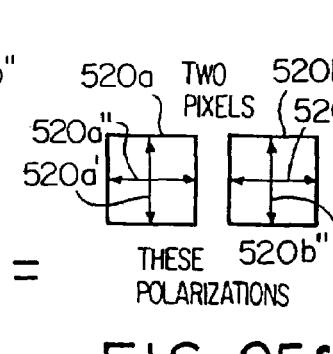
Figure 25G:
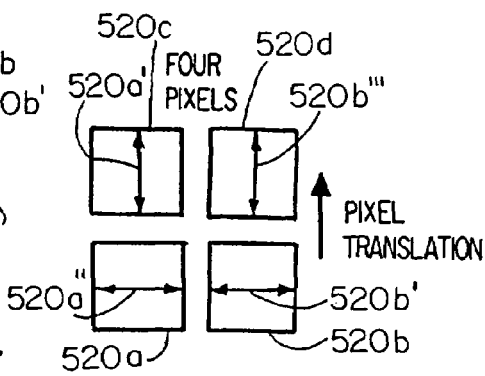

The images 520a and 520b then pass through the next optical component in the passive dithering system 500, the half wave plate 510, where the plane of polarization of each of the images 520a and 520b is effectively rotated +45 degrees so that the plane of polarization of each image is as shown in FIG. 25e. The polarizations represented by arrows 520a''' and 520b''' for pixel images 520a, 520b in FIG. 25e are the vector equivalents to the polarizations represented by the respective arrows 520a', 520a'', 520b', 520b'' for pixels 520a, 520b in FIG. 25f. Two of such vector equivalent polarizations of FIG. 25f are parallel to the optic axis 508v' of the second birefringent material 508v, and two are perpendicular to the optical axis 508v'. Due to such relationships of the planes of polarization of each of the images 520a and 520b in FIG. 25f to the axis 508v' of the birefringent material 508v, the images 520a and 520b will be resolved into their orthogonally polarized components 520c, 520d, respectively, as these components pass through the birefringent material 508v. The polarized components of each image 520a, 520b which are parallel (520a', 520b''') to the plane containing the axis 508v' will be refracted and deflected vertically to result in images 520c and 520d while the other polarized components 520a'', 520b', which are perpendicular to the axis 508v' (or the plane containing that axis) will be unaffected. As a result, the original image 520a is dithered into four images 520a, 520b, 520c and 520d. These images may be of substantially equal intensity.

While the passive dithering system 500 discussed above was illustrated as doubling images in two directions, horizontal and vertical, a passive dithering system that doubles the image in only a single direction only is also possible. Such a system may include a single birefringent material used in conjunction with a display producing a polarized or non-polarized output to result in a doubled pixel image or to perform passive line doubling.

Also, it will be appreciated that the above description with respect to FIGS. 23, 24a-c, and 25a-g is exemplary, and other arrangements of components to compose a passive dithering system to obtain a desired pixel enlarging, expanding, shifting, etc. may be employed. For example, a birefringent liquid crystal cell may be used as a wave plate: a surface mode liquid crystal (e.g., U.S. Pat. No. Re. 32,521) cell or a pi-cell liquid crystal cell (e.g., U.S. Pat. No. 4,582,396) which is tuned to the desired retardation of quarter wave or half wave are examples. The birefringent material may be liquid crystal cells. Various crystals, prisms, or other devices may be used to provide birefringence and/or polarizing functions. By changing the amount of birefringence and optical path length through a birefringent material the amount of deflection of a pixel image can be determined. Changing relative orientation of axis of one or more components can change the direction a pixel is shifted. Of course, the illustrated alignment of components is relative and reference to vertical, horizontal, into or out of the plane of the paper or drawing only is for convenience of description. All such equivalent and alternate or additional materials and/or alignments of components and functional operation are considered within the scope of the present invention.

As is evident from the description above with respect to FIGS. 23-25 and the description below with respect to FIGS. 26-32, in an exemplary passive dithering system of the invention, birefringent material may be used to change location of light representing a pixel, an image of a pixel, or another optical signal (for convenience sometimes simply referred to as pixel). The passive dithering system, therefore, is able to change the apparent location of the pixel. Such change may result in an increase in or enlarging of the pixel size, in a doubling or duplicating of the pixel, etc; such change in location may simply be a change in the apparent location of the pixel without any doubling, duplicating, changing of size, etc.

When the passive dithering system is used to dither a pixel to change size, e.g., effectively to enlarge the pixel, the dithering system may cause there to be multiple spaced apart pixels derived from the original pixel or pixels. Alternatively, one or more of the multiple pixels may overlap or be sufficiently adjacent to another pixel as to be considered touching or in any event not spaced apart. As an example, by enlarging a pixel to cover optical dead space of a display, the apparent resolution of the display usually is increased even without increasing the actual number of pixels driven by the display.

In the case of a pixel being expanded using an exemplary passive dithering system according to the invention, light from the original pixel is distributed over a viewed area that is larger than the area of the original pixel of the display. However, the total amount of light reaching the eye of an observer, for example, remains substantially the same as that provided by the original pixel before being expanded because the components of the passive dithering system are not the light absorbing or blocking type. Therefore, the apparent brightness of a display when used in combination with such a passive dithering system would tend not to be diminished.

The passive dithering system of the invention is described with respect to several embodiments. These embodiments are examples of components and arrangements of components to obtain the passive dithering effect of the invention. Many other components and arrangements of components also may be used to obtain passive dithering, as will be appreciated by those who have ordinary skill in the art.

For example, in the embodiments of passive dithering systems illustrated in FIGS. 23-27 a half wave plate is used to set up particular plane polarization conditions, such as direction of plane of polarization; and in the embodiments illustrated in FIGS. 28-32 a quarter wave plate is used to set up particular plane polarization conditions. In the embodiments of passive dithering systems illustrated in FIGS. 23-25 and 28-30 the passive dithering systems receive plane polarized light input from a liquid crystal display that provides plane polarized light output or from another display which may not provide a plane polarized light output but which is used in combination with a plane polarizer to obtain the desired polarized light input to the dithering system.

However, in the embodiments illustrated in FIGS. 26, 27, 31 and 32 the passive dithering systems receive and operate on unpolarized light.

The components of the respective passive dithering systems described with respect to FIGS. 23-32 are arranged to expand a single pixel or light forming that pixel to four pixels which are arranged in a two by two rectilinear array, such as that depicted by pixels 524a-d in FIG. 24c. However, it will be appreciated by those who have ordinary skill in the art that the passive dithering systems of the invention may be adjusted, including changing of optical axes orientations, changing of birefringence value, adding or deleting components, etc., to expand the single pixel to fewer or to more than four pixels and to arrange those pixels in a rectilinear array or in another pattern or arrangement. Also, although quarter wave plates and half wave plates are disclosed useful in passive dithering systems, it will be appreciated that other types of wave plates or appropriate means may be used, too. Preferably the wave plates and/or other appropriate means provide the same or substantially the same wave plate function, such as optical retardation, for all, for a relatively wide range of wavelengths of light or at least for the wavelength range intended to be used.

Using the principles of the invention to expand a pixel formed of plane polarized light, the incident plane polarized light is divided into two orthogonally related plane polarized components. A quarter wave plate may be used for this function. A quarter wave plate having its optic axis aligned at 45° to the plane of polarization of incident plane polarized light converts the plane polarized light to circular polarized light, which can be resolved to orthogonally related plane polarized components which are of equal amplitude but are out of phase by 90°. If the quarter wave plate is oriented at other than 45° to the plane of the incident plane polarized light, the output therefrom will be elliptically polarized, which also may be resolved to respective plane polarized components possibly with phases that differ by other than 90° and/or amplitudes which are not equivalent. Means other than a quarter wave plate also may be used to effect such separating of the incident plane polarized light into respective distinguishable components. The incident plane polarized light, which is resolved to respective distinguishable components, is directed to the birefringent material, which separates the components in effect by directing them to different locations and thereby expands the apparent area of the pixel.

For unpolarized light input to a passive dithering system of the invention used, for example, to expand a pixel, the incident light is directed to birefringent material usually without the need to plane polarize the incident light. Since the incident light already includes or can be considered as being resolved to two orthogonally related plane polarized components, the birefringent material separates the respective orthogonally plane polarized components in effect by directing them to different locations and thereby expands the apparent area of the pixel.

Figure 26:
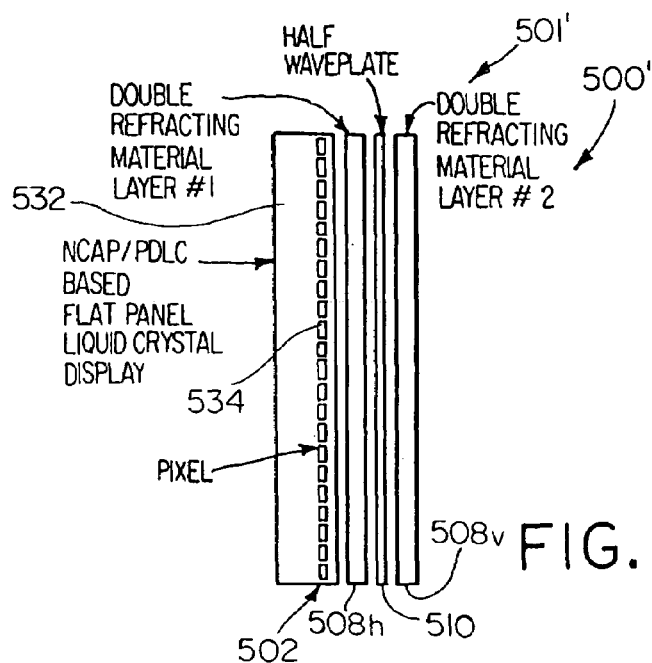
FIG. 26 is a schematic illustration of the passive dithering system of FIG. 23 used in connection with a display which produces a nonpolarized (sometimes referred to as unpolarized) light output.

Referring to FIG. 26, there is shown a passive dithering system 500' of an optical display system 501' used in connection with a display 532 which produces non-polarized (unpolarized) light, such as a nematic curvilinear aligned phase liquid crystal (NCAP), polymer dispersed liquid crystal (PDLC) or liquid crystal polymer composite (LCPC) based flat panel liquid crystal display. The passive dithering system 500' of FIG. 26 includes the same optical components as the dithering system 500 described above relative to FIG. 23-25, such as a birefringent material 508h, a wave plate 510 and a second birefringent material 508v. In this instance, neither the passive dithering system 500' nor the display 532 is provided with a linear polarizer to polarize the output light from the display.

In operation, the passive dithering system 500' when used in connection with a display producing non-polarized light will result in horizontal and vertical pixel image doubling similar to that produced by the passive dithering system 500 and shown in FIGS. 23-25. In fact, the orientations of the optic axes 508h', 510' and 508v' of the components 508h, 510, 508v, shown in FIGS. 26 and 27 may be the same as when those components are used in connection with a display producing a polarized output. (If it were desired to use the dithering system 500 with an unpolarized light producing display 532, the polarizer 506 could be placed optically between the display 532 and the dithering system 500 in the manner shown in FIGS. 23-25, for example).

Figure 27:
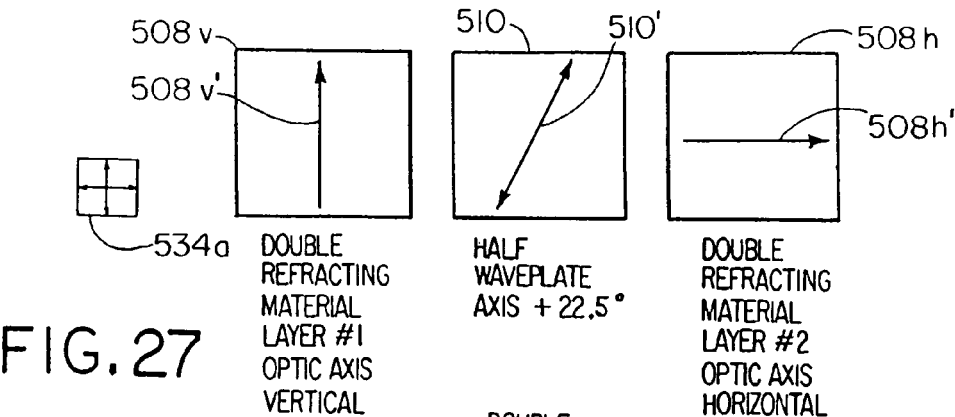
FIG. 27 is a schematic illustration of the orientations of the optic axes of the components of the passive dithering system of FIG. 26.

One possible set of orientations for the optic axes of these components is shown in FIG. 27. The optic axis 508v' of the first birefringent material 508v is vertical and is tipped as was described above, the axis 510' of the half wave plate 510 is at +22.5° to vertical and the projection of the optic axis 508h' of the second birefringent material 508h into the plane of the page is horizontal and is tipped as was described above. Although the light which enters the first birefringent material 508v is non-polarized, it can be visualized as polarized light resolved into two orthogonal components such as a vertical and horizontal polarized component as shown by arrows in the exemplary pixel image 534a created by a corresponding pixel 534 in the display 532.

The components 508v, 510 and 508h then function basically as described above in FIG. 25. The first birefringent material 508v will resolve the individual components of the pixel image 534a into their orthogonal components and will dither (shift location of) one polarized component relative to the other polarized component to produce a vertically displaced double image of the pixel image 534a. The half wave plate 510 will then rotate the polarization components of those images as in FIG. 25e so they are at 45° angles to the optic axis 508h' of the second birefringent material 508h where the images will be doubled and displaced in a horizontal direction as in FIG. 25g. As a result, the initial image 534a is doubled in the vertical direction and then the initial image and the doubled image are doubled in the horizontal direction to produce four adjacent images which may substantially cover the portion of the original pixel 534a in the display and dead space surrounding the pixel in one vertical and horizontal direction.

Figure 28:
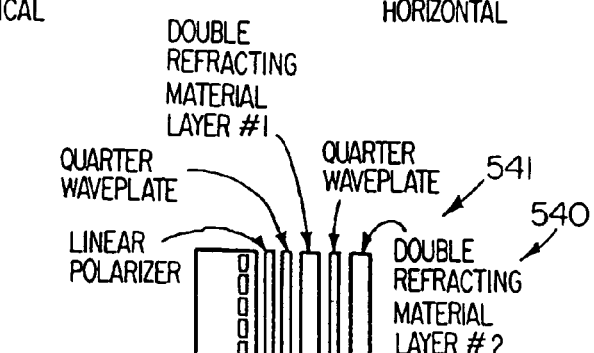
FIG. 28 is a schematic illustration of an alternate embodiment of a passive dithering system.
Figure 29:
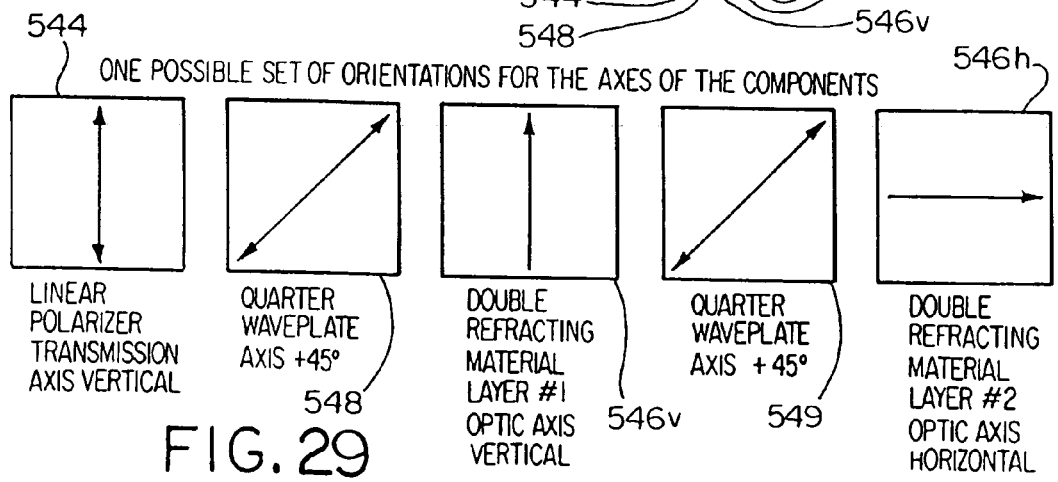
FIG. 29 is a schematic illustration of the orientations of the optic axes of the components of the passive dithering system of FIG. 28.

FIG. 28 illustrates an alternate embodiment of a passive dithering system 540 of an optical display system 541 shown with an optical display which produces linearly polarized output light, such as by a twisted nematic based flat panel liquid crystal display 542 incorporating a linear polarizer 544. The passive dithering system 540 includes a first birefringent material 546v, a second birefringent material 546h and quarter wave plates 548, 549, respectively, interposed between the source of polarized light (display 542 and, if used, polarizer 544) and the first birefringent material 546v and between the birefringent materials 546h and 546v. One possible set of orientations for the axes of the linear polarizer 544 of the display, the birefringent materials 546v and 546h and the quarter wave plates 548, 549 is shown in FIG. 29. The linear polarizer 544 has a transmissive axis in the vertical direction. The projection of the optic axis of the first birefringent material 546h into the plane of the transmission axis of the linear polarizer also is vertical, i.e., parallel to the axis of the polarizer. The axes of the quarter wave plates 548, 549 are oriented +45° to vertical and the projection of the optic axis of the second birefringent material 546h into the plane of the linear polarizer is at +90° to vertical, i.e., horizontal.

The passive dithering system 540 functions basically the same way as the passive dithering system 500 is described above relative to FIG. 25. The function of the half wave plate 510 in the passive dithering system 500 has been replaced in the system 540 by a quarter wave plate 549. The quarter wave plate 548 and birefringent material 546v function as the quarter wave plate 512 and birefringent material 508h of FIGS. 23-25. The quarter wave plate 549 effectively divides the polarized light components of light passing through the wave plate 549 by converting the light to circularly polarized light and its respective equivalent orthogonal plane polarized components like the quarter wave plates 512, 548 do. The components of the circularly polarized light are then dithered by the second birefringent material 546h in a horizontal direction as explained above for the passive dithering system 500. One advantage of using the quarter wave plate 549 as opposed to the half wave plate 510 or 510' is that the quarter wave plate 549 will tend to introduce less chromatic aberration on the light passing therethrough since a quarter wave plate usually is thinner material than a half wave plate and, therefore, usually is less dispersive, e.g., exhibits less optical dispersion.

In FIGS. 30a-30e are shown the operation of the passive dithering system 540 of FIGS. 28 and 29. In FIG. 30a a pixel 542a of display 542 is shown. Light from pixel 542a is vertically polarized and is represented by the vertical arrow therein. The linear polarization is produced by the display 542 and/or is due to the polarizer 544. A separate polarizer 544 ordinarily is unnecessary if the display 542 produces polarized light output. Optical dead space 550 surrounds the pixel 542a.

The quarter wave plate 548 divides the vertically polarized light from the polarizer 544 to obtain two orthogonal plane polarized components, as is seen in FIG. 30b. In FIG. 30c it can be seen that the birefringent material 546v changes the location of the vertically polarized light component portion of light incident thereon moving that light vertically relative to the location of the vertically polarized light component portion. Therefore, pixel 542a is expanded, e.g., is doubled, in that pixel area 542b now has been created. The quarter wave plate 549 divides (resolves) the plane polarized light from the birefringent material 546v so that each pixel 542a, 542b has both orthogonal plane polarized light components, e.g., horizontal and vertical, as is shown in FIG. 30d. In the manner described above, the double refracting material 546h expands, e.g., doubles, the pixels 542a, 542b to create pixel areas 542a, 542b, 542c, 542d shown in FIG. 30e.

FIGS. 31 and 32 illustrate a passive dithering system 540' which is identical to the passive dithering system 540 shown in FIGS. 28-30 but it is used in an optical display system 541' with a display producing non-polarized (unpolarized) output light, such as an NCAP, PDLC or LCPC based flat panel liquid crystal display 560 e.g., like the display 532 and pixels 534 of FIGS. 26 and 27. The orientation of the birefringent materials 546v and 546h and the quarter wave plate 549, which are represented in FIG. 32, may be the same as those described for the like components for the passive dithering system 540 although it would be appreciated that this is only one possible set of orientations for the axes of the components which would dither an image in the manner described above. The passive dithering system 540' functions in basically the same way described above for the system 540 but on unpolarized input light, which is resolved as orthogonally related plane polarized light components (see the description above concerning FIGS. 26 and 27), as opposed to the linearly polarized light which the system 540 receives from the display 542.

It also will be appreciated that the several features and embodiments of the invention illustrated and/or described herein may be used with other features and embodiments that are illustrated and/or described herein as well as equivalents thereof. For example, in the segmented display system described the EDS may be formed by a calcite crystal and a surface mode liquid crystal cell, by a calcite crystal and a twisted nematic liquid crystal cell or by some other type of switch and/or some other type of double refracting material. Also, the EDS may be a liquid crystal EDS in which both the switch function and the double refracting function can be carried out by the same device, e.g., as in the embodiment of FIGS. 18 and 19. Moreover, in many instances passive dithering systems may be used in conjunction with or as a substitute for some of all of the components described for the EDS. These are simply examples of combining features and it will be appreciated that other combinations also may be made consistent with the spirit and scope of the invention.

From the foregoing it will be appreciated that various embodiments of the invention using principles described herein may be employed with polarized light or unpolarized light. If it possible to operate based on an unpolarized light as an input to the dithering system, e.g., using an NCAP display, there is no need for a polarizer and the undesirable effect that a polarizer has in blocking approximately 50% of the transmitted light. It also will be appreciated that in various embodiments described herein a quarter wave plate may be used, a half wave plate may be used, and/or a combination thereof may be used. In various embodiments a half wave plate may be substituted for one or more quarter wave plates and vice versa. A quarter wave plate may be used to convert plane polarized light to circular polarized light or to orthogonal components of plane polarized light. A quarter wave plate also may be used to convert plane polarized light to elliptically polarized light. A half wave plate is used to rotate the plane of polarization of plane polarized light. Usually the half wave plate will rotate the plane of polarization by twice the angle between the plane of incident plane polarized light and the axis of the half wave plate.

Turning to FIG. 33 an active dithering system 601 is used with a display 602 in an optical display system 603. The dithering system includes a birefringent material 610, such as a calcite crystal, having an axis 610' that is oriented at an angle theta relative to horizontal, as is depicted in FIG. 33. The dithering system 601 also includes a switch 611, such as a birefringent liquid crystal cell of the type described above. The display 602 may be a liquid crystal display that provides plane polarized light output that has a vertical plane of polarization represented by the arrow 602'. Alternatively, the display 602 may provide other than plane polarized light output, and in that case a plane polarizer 612 may be used to provide such vertical polarization of the light delivered from the display and polarizer to the switch 611. The orientation of the axis of the birefringent liquid crystal switch 611 is at 45° to the vertical plane of polarization 602', as is represented by the arrow 611'. As was described, as the switch 611 is energized or not, the plane of polarization of the light output therefrom will be the same as the direction of the arrow 602' or not, i.e., vertical, or horizontal. A half wave plate 615 between the switch 611 and the birefringent material 610 has its axis 615' oriented at an angle relative to horizontal that is ½ theta.

With reference to FIGS. 33 and 34, which presents representative operation of the dithering system 601, when the light transmitted through the switch 611 has a given plane of polarization, such light will be transmitted through the half wave plate 615 and birefringent plate (calcite) 610 to appear at the same relative positions as they originally appear in the display 602. If such pixels are, respectively, red, green and blue pixels of a triad, such pixels may be at the locations of the pixel images 620r, 620g, 620b shown in FIG. 34. However, when the plane of polarization of the light exiting the switch 611 is such that it is appropriately rotated by the half wave plate 615 so as to impinge on the calcite 610 in a direction relative to the axis 610' to cause shifting of the light output, such pixels will appear as images 620r', 620g', 620b'. Thus, it will be seen that the offset or shifting is in a sense diagonal rather than horizontal or vertical. The angle at which such diagonal occurs relative to horizontal, for example, depends on the magnitude of the angle theta. Thus, it will be appreciated by appropriately selecting the angles of the respective axis of the components and their relationship to each other, whereas desired directions of shifting can be obtained. Also, the extent or distance of such shifting can be determined, for example, by the thickness of the birefringent device 610, i.e., the effect of optical thickness thereof having an affect on the light transmitted therethrough.

Referring to FIGS. 35 and 36 and the Chart I below, an optical display system 640, which includes two active dithering systems 641, 642 and one passive dithering system 643 is illustrated. The optical system 640 receives plane polarized light input 644 from a display 645. If the display 645 is not the type that provides a plane polarized light output, than an additional polarizer 646 may be used to provide such plane polarization. The orientation of respective components of the display system 640 is depicted by respective double-headed arrows above the various components.

The display system 640 may be used to provide a video output display operation. In an exemplary video display system, such as an NTSC or PAL system, it is conventional to compose a picture or a frame from two interlaced and sequentially presented fields (sometimes referred to as sub-frames). The optical display is able to produce four output conditions and signals in the manner described below. Such four output conditions may correlate to two respective frames and the two respective fields in each frame in a video display system, such as a television system using a liquid crystal display or some other display as the image source. However, it will be appreciated that the four output conditions described below may be correlated with the operation of other types of display systems or with a video display system in a way different from the exemplary operation described below.

In the optical system 640 the active dithering system 641 includes a switch 650 and a birefringent device 651. The active dithering system 642 includes a switch 652 and a birefringent device 653. The passive dithering system 643 includes a quarter wave plate 654 and a third birefringent device or material 655. The first and second switches 650, 652 may be respective surface mode birefringent liquid crystal cells or some other switch as is described elsewhere herein. The first, second and third birefringent devices 651, 653, 655 may be calcite material or some other birefringent material having axis oriented generally in the manner illustrated and tipped in the manner described above.

In describing operation of the optical display system 640, reference is made to a pixel of the display and light representing that pixel. The passive dithering system 643 effectively doubles the size of the pixel received by it from the display 645 and via the respective active dithering systems 641, 642. Therefore, as is seen in FIG. 36, each pixel input to the passive dithering system 643 is shown in solid lines and the doubled image thereof is shown in dotted lines adjacent thereto. For example, the pixel provided the passive dithering system 643 for the first field of the first frame is represented at 660, and the dithered image 660' is shown adjacent thereto in dotted lines. The passive dithering system operates in the manner of the passive dithering systems described above, for example.

Referring to the Chart I below, at frame 1, field 1, the voltage or energization of the first switch 650 is low so that the switch rotates the plane of polarization of the input vertically polarized light to horizontally polarized light as the output therefrom; see the column labeled "polarization direction output 1" having the letter "H" representing such horizontal polarization. Delivery of that horizontally polarized light to the first calcite 651 results in no shift of location. Continuing in the first line for frame 1, field 1 in the Chart I below, the voltage of the second switch 652 is low, whereby that switch rotates the plane of polarization back to vertical, as is represented by the letter "V" in the column labeled polarization direction output 2; and, therefore, the second calcite member 653 does not shift the location of the pixel. When the vertically polarized light output from the second calcite 653 enters the quarter wave plate 654, such light is divided into horizontal and vertical polarized components; the vertically polarized component transmits through the third calcite material 655, and the horizontally polarized component is shifted horizontally thereby effectively doubling the size of the pixel and producing the image 660', as is represented in the last column of the table designated calcite 3 shifting and doubling in the horizontal direction the particular pixel.

The second field of the first frame, for example, each pixel of the second frame, is displaced vertically relative to the corresponding pixel of the first field of the first frame. The pixel 661 represents the location of such downwardly vertically displaced pixel for the second field of the first frame when the display system is a video type using interlaced fields to produce a frame. The second line of the Chart I below shows the conditions of the surface mode switches 650, 652, both being at high voltage so as not to rotate the plane of polarization of light transmitted therethrough, the resulting vertical downward displacement caused by the first calcite 651, and the doubling of the pixel by the passive dithering system 643 to produce not only pixel 661 but also the dithered pixel 661'. In pixels 660, 660', the two digits one in each represent, respectively, first frame, first field; and in the pixels 661, 661', the digits one and two represent first frame, second field, respectively.

Lines three and four of the Chart I below represent conditions and shifting resulting from those conditions of the switches 650, 652, direction of plane of polarization, etc. as was described above with respect to the first two lines of the Chart I below in order to achieve pixels 662, 662' and 663, 663', the primed pixels representing the dithered images that doubles the effective size of the overall pixel, such as the doubled size 663 plus 663'. As was mentioned above, the amount of shifting or translating of a particular pixel may be a function of the birefringence and/or optical thickness of the respective birefringent device, such as the respective calcite plates 651, 653, 655. Also, in a conventional video system there usually is no horizontal interlacing. The two field of the second frame represented by pixels 662, 662', 663, 663' may represent images moved to fill optical dead space, images to effect super imposing respective colors, as is described further below, or some other purpose. The increasingly effective size of each pixel, such as by doubling it to increase pixel 660 to the effective size of the sum of pixels 660, 660', can be used to improve resolution by effectively covering optical dead space in the display. The vertical displacing of pixels can be used to cause a liquid crystal display to provide a true or more nearly true interlaced operation whereby a pixel presented in one field of a frame is presented at a different location when the second field of that same frame is produced.

An advantage to the use of a dithering system with a display, such as a liquid crystal display, wherein the location of a pixel in the output can be shifted even though the actual location of the pixel in the display itself, such as an LCD, remains fixed is that correct data can be used to drive the pixel to provide the desired image output with relatively accurate following of the video signal. In a conventional LCD used to provide a video output a particular pixel may average the two fields of a frame; the average is not an accurate representation of the data received from the video signal. However, using a dithering system in accordance with the present invention, a pixel of the LCD may be driven based on information from the video signal intended to drive that pixel for a particular field of a frame to provide a visual output from the display system, such as display system 640. Subsequently when the image output of the respective pixel is shifted so that it is in the location desired for the second field of the particular frame, the actual information from the video signal that ordinarily would be used, say in a CRT, for example, could be the information that is used to operate or to drive the pixel which then provides a relatively accurate output representative of the appropriate input signal.

Using the two active and one passive dithering systems of the optical display system 640 is it possible to obtain eight copies of the original image, if desired, namely that provided at pixel 660, for example. Such eight copies may be obtained for every field for every frame, if desired and, thus, provide a macro pixel effectively about eight times the size of the pixel 660. In another embodiment, the data picked off the incoming analog signal or other video signal that operates the pixel 660, e.g., to turn it on or off, may be selected at the appropriate time to drive the pixel 660; and subsequently the pixel 661 may be operated as a function of information picked off the incoming video or analog signal representing the desired operation of the pixel 661 for interlaced fields operation of a conventional NTS or PAL system. However, additionally, if desired, the information from the incoming signal also could be picked off to represent the on/off or intensity effect of a pixel presented at location of pixel 662 accurately to represent that pixel even though that pixel physically may not be in the display 645 but rather is represented by the pixel of the display 645 that produces pixel image 660 shifted to the location of pixel 662. In other words, in an exemplary LCD there may be two relatively adjacent pixels, and the information from the incoming video signal would be picked off from that video signal to drive the respective pixels at the appropriate times. However, there also may be information contained in the video signal that would represent a desired optical output from the optical display system 640 from a pixel located between the two mentioned pixels. The present invention allows the information from the video signal that would be used to drive such intermediate pixel to be delivered to the pixel of the display 645 that would produce pixel image 660 while the dithering systems in the optical display system 640 effect horizontal or lateral displacement of the optical output to a location where such intermediate pixel might otherwise appear in the output image from the optical display system 640. This operation can enhance the resolution provided by the optical display system 640 and the accuracy of representation of the information carried by the input video signal, etc.

Superimposed Color Operation

Referring to FIG. 37 there is a shown a layout of an exemplary group of red, green and blue pixels of an exemplary liquid crystal display. The pixels are arranged in respective parallel rows and columns. Capital letters represent the color of the pixel, e.g., whether the pixel will deliver output like that is red, green or blue. Portions of two rows are shown.

In the viewing of a color liquid crystal display the eye of the viewer, i.e., a human eye, may receive light input from many different pixels, and the eye effectively integrates the light inputs. One way of considering such viewing is to analogize the adjacent pixels, which are extremely small, effectively being superimposed so that the light therefrom is superimposed. Therefore, the combination of red, green and blue light that is superimposed would provide a white light as seen by the viewer.

The various embodiments of dithering systems in accordance with the present invention, including those disclosed and equivalents thereof, may be used to effect real superimposing of respective pixels, thereby enhancing the color output or color response of a color liquid crystal display. Such superimposition is depicted in FIG. 37 and now is described. The two rows of pixels shown in FIG. 37 are portions of respective rows of pixels in a color liquid crystal display. In the first row shown there are five pixels of the indicated colors; and in the second row there also are five pixels of the indicated colors. The sequence of colors is red, green and blue in both rows, but the sequence is offset by one pixel one row to the other. Therefore, in the first (top) row the first pixel row, and in the second row the first pixel is green. The arrangement of pixels in FIG. 37 is exemplary. Many other types of arrangements of pixels may be used whether in parallel rows and columns in the manner shown, in a so called delta configuration or pattern wherein there is an offset of rows, such as in FIG. 40, etc.

Using the optical display system 640, for example, the red pixel Ra at the top left of FIG. 37 is duplicated by the passive dithering system 643 to produce a red pixel or ra, which is represented in dash lines. Operation of the first dithering system 641 produces a second copy of both those red pixels displaced downward to locations of dash red pixels designated ra'. Such operation of the first dithering system 641 is coordinated with the second dithering system 642 to effect such downward shift. Similarly, horizontal shifting of all four red pixels just mentioned, namely Ra, ra, and the two designated ra' to a horizontally shifted or laterally shifted place results in the red pixels represented by dash lines and designated ra", one of which is superimposed over the green pixel Ga and one of which is superimposed on the blue pixel Ba. Such shifting may occur in a time sequence that is sufficiently fast that the human eye does not perceive the various shifts. Additionally, such shifting occurs in a time sequence coordinated with the desired color output from the display as represented by the input video signals to the display so that the superimposed colors provide a good quality and accurate representation of the color output from the display intended as a result of the input video signal. Similarly to the just described shifting of the red pixel Ra, shifting of the green pixel Ga also occurs, and such shifted pixels are represented by dotted outline at pixel locations represented by Ga due to the passive dithering system 643, and the other shifted pixels represented by dotted lines labeled ga' and ga" resulting from coordinated operation of the active dithering systems 641, 642. Furthermore, similar operation occurs for the blue pixel Ba, which is represented by phantom lines at pixels or pixel locations designed ba, ba', and ba". The four blue pixels represented by respective designations ba' and ba" near the bottom of FIG. 37 would overly or be superimposed on other pixels which are not shown in order to simplify the drawing and description.

Briefly referring to FIG. 38, shifting of the red pixel R into respective gaps and also superimposed on other pixels is shown schematically and simply. Specifically, pixel R is doubled by the passive dithering system 643 of the optical display system 640 in FIG. 35, for example to provide pixel r. Both pixels R and r are duplicated also at pixel image locations r' shown in FIG. 38 in the gap between respective parallel rows of actual pixels. Pixels R, r and r' also are duplicated to the right relative to the illustration of FIG. 38 as pixel images r+, some of which are in the same gap as pixel images r' and one of which overlies or is superimposed on the green pixel G. Thus, it will be seen that the pixels can be shifted to various locations in the display to achieve the desired optical output.

As the display of FIG. 38 is operated as part of the optical display system 640 to duplicate pixel images and/or to translate pixel images, so, too, the display shown in FIG. 39 represents similar modified operation of the optical display system 640. In particular, in FIG. 39 lateral shifting occurs like that in FIG. 38; but in FIG. 39 the vertical shifting of images results in the shifted image overlying the gap between adjacent rows of pixels of the display 645 and also overlying at least a portion of the pixel of the display 645 which is vertically displaced beyond such gap between pixel rows. Placing the pixel image in a gap increases the fill factor of the display. As was mentioned above, the shifting may result in superimposing pixel images to achieve the superimposed color response described above. Also, if desired, the vertical shifting may result in a portion of the shifted pixel image still overlapping a portion of the image in the original row, such as the illustrated pixel R and shifted pixel image r' therebelow. Such superimposing of pixels may provide a desired type of visual output for the optical display system 340.

Briefly referring to FIGS. 40 and 41, there is shown a delta design of pixel layout for a display in FIG. 40, such as an LCD 645 and the output images therefrom after transmitting through an optical display system 680, which includes one active dithering system 681 and two passive dithering systems 682, 683. The active dithering system 681 includes a switch, 684, such as a birefringent liquid crystal cell, and a calcite crystal 685 able to transmit an image or to shift the image vertically ½ pixel, depending on the direction of plane of polarization of light incident thereon. The passive dithering system 682 includes a half wave plate 686, which rotates the plane of polarization of incident light 45 degrees, and a second calcite crystal 687, which can transmit the incident pixel image and has a thickness, birefringence, axial orientation and tipped to displace the image ½ triad pitch horizontally. The passive dithering system 683 includes a half wave plate 688, which rotates the plane of polarization of incident light 45 degrees, and a second calcite crystal 689, which can transmit the incident pixel image and has a thickness, birefringence and axial orientation and tip to be able to displace the image 1 pixel pitch horizontally.

The optical display system 680 and dithering systems 681, 682, 683 thereof are set up to effect shifting ½ triad pitch to the right; 1 pixel pitch left and ½ pixel vertical pitch down. This arrangement is represented by only the blue pixel Ba. In shifting that pixel ½ triad pitch to the right, pixel ba results. In shifting both pixel Ba and ba 1 pixel pitch to the left, two respective pixel images ba' are produced—one is superimposed over the green pixel G, and one is in the gap between the blue pixel Ba and the red pixel R horizontally adjacent to the blue pixel Ba. Such shifting provides both for filling the optically dead space and effecting a superimposing of respective color pixel images as was described above. The shifting of pixel images vertically to form the four pixel images ba" places some of those in the gaps between rows of pixels and some in superimposed relation to the same and/or other pixels or shifted pixel images.

Referring to FIG. 42, a person 704 is shown wearing a head mounted viewing system 705 in accordance with the present invention. The viewing system may be part of a virtual reality viewing system having one or more displays which are viewed by the person. The viewing system may be part of a telecommunications system, entertainment system, or some other device in which light, optical, etc. information can be presented for viewing, projecting, photographing, or other use. Exemplary systems in which the invention may be used are disclosed in the above-mentioned patent applications; of course there may be other uses, too.

The head mounted viewing system 705 includes a housing 705*h* in which the various components of the viewing system 705 are included, and a mounting device 705*m*, such as a strap, eyeglass or goggles type frame support structure, etc. The mounting device 705*m* mounts the housing 705*h* for support from the head of the individual 704 placing the viewing system 705 in position in front of one of the eyes for viewing of an image presented by the viewing system 705. Whether the viewing system 705 is hand held, head mounted, or otherwise supported, for example, from a pedestal, tripod, frame, etc., from a table, from the floor, from a console 9, etc., preferably the viewing system 705 and housing 705*h* thereof is relatively small and sufficiently lightweight to facilitate moving, transporting, mounting, and/or holding. If the viewing system 705 is to be hand held or head mounted, it especially should be relatively lightweight to avoid being a weight burden on the hand or head of the individual using the viewing system 705. Also, to facilitate holding the viewing system 705 manually or head mounting the viewing system, the viewing system 705 should be relatively small. An exemplary viewing system may be, for example, approximately 4 to 5 inches in height, approximately 2 to 3 inches wide, and approximately 1½ to 2 inches deep. These are exemplary only, and it will be appreciated that other dimensions may be used.

In using the viewing system 705 it may be head mounted, hand held, coupled to a control box, console or the like, for example, similar to the main body of the conventional telephone when used in a telecommunication system.

Turning to FIG. 43, the viewing system 705 is shown in detail as a monocular viewing system. The housing 705*h* includes a viewing portion 711 and a support portion 712. The viewing portion 711 is intended to be viewed by an eye 713 of a person 704 (FIG. 42), and the support portion 712 is intended to be held in the hand of that individual. As was mentioned above, a head mount 705*m* may be provided to support the viewing system 705 from the head of a person. Thus, the housing 705*h* may be hand held, supported by a strap, cap, temple piece as in eyeglasses, or otherwise mounted for viewing by a person.

The viewing system 705 includes an optical system 714 in the housing 705h. The optical system 714 includes an image source 715, such as an LCD, that provides images for viewing by the eye 713 through a viewing port 716. A viewing lens 717 (or group of lens) presents to the eye 713 an image which appears at a comfortable viewing distance, such as about 20 inches or more away. An image resolution enhancing device 18 (sometimes referred to as an optical line doubler or OLD, dithering device or system, EDS, etc.) optionally included in the optical system 714 may be used to enhance the resolution or other qualities of the image produced by the image source 715.

A number of optical components 720 are included in the optical system 714. The optical components include focusing optics 721 (sometimes referred to simply as "lens" or as projection optics or as a projector), a beam splitter 722, and one or more retroreflectors 23, 23'.

The image source 715 includes a display 724d and a source of incident light 724i. The light source illuminates the display 724d, and the display in turn presents images which can be projected for viewing by the eye 713, as will be described in greater detail below. It will be appreciated that other types of image sources may be used, examples being cathode ray tube displays, other liquid crystal displays, plasma displays, etc. Examples of several displays and light sources are presented in the above-referenced co-pending patent applications. A connection cable 28 provides electrical and/or optical signals and/or power to the optical system 714, and is particular to the image source 715 and OLD 18 to develop the above-mentioned images for viewing by the eye 713. A control system 729 is coupled to the cable to provide such electrical signals for controlling operation of the display system 705, as is described in further detail below.

Summarizing such controlled operation, though, the display 724d may be a twisted nematic liquid crystal display, and the OLD 18 includes an optical switch, such as a surface mode liquid crystal cell, that switches polarization characteristics of light to cause the light output to viewed by the eye 713 to be, for example, of enhanced resolution, as is described further below. Therefore, the control system 729 provides signals to generate the image by the display 724d; and the control system 729 also controls the optical switch to effect a synchronization such that there is a phase or time delay between the signals to the twisted nematic LCD and the signals to the optical switch. Accordingly, the optical switch which operates at a different speed, e.g., faster or in shorter time than the twisted nematic LCD will be coordinated with the operation of the twisted nematic LCD to improve operation and optical output of the display system 705. Detailed operation of the control system is described further below, for example, with respect to FIGS. 44-46 and 48.

Dithering may refer to the physical displacement of an image. The dithering system 718 may be an electro-optical dithering system (EDS), which refers to an electro-optical means to physically shift or to change the location of an optical signal, such as an image. The shifting may result in doubling of the number of pixels or scan lines of a display—thus, reference to OLD (optical line doubler). The shifting also may result in quadrupling (or more or less increase) pixels or scan lines; and in such case OLD also may be used as a generic label. The shifting may be active in response to an electrical, magnetic or other input. The dithering system 718 may be passive, e.g., in which shifting occurs constantly or substantially constantly (or continuously); in other words such shifting may occur all the time without the need for a separate input to cause shifting. Various embodiments of dithering systems useful in the invention are described above.

The image may be shifted along an axis from one location to another and then back to the first, e.g. up and then down, left and then right, or both, etc. The optical signal may be moved in another direction. The dithering may be repetitive or periodic or it may be asynchronous in moving an image from one location to another and then holding it there, at least for a set or non-predetermined time. Also, as was mentioned, the dithering may be passive, and, thus, constant, e.g., without changing. When the dithering is passive there usually are provided simultaneously the original image at the undithered location and a second or dithered image at another location, e.g., located adjacent or spaced apart from the undithered image.

Figure 44:
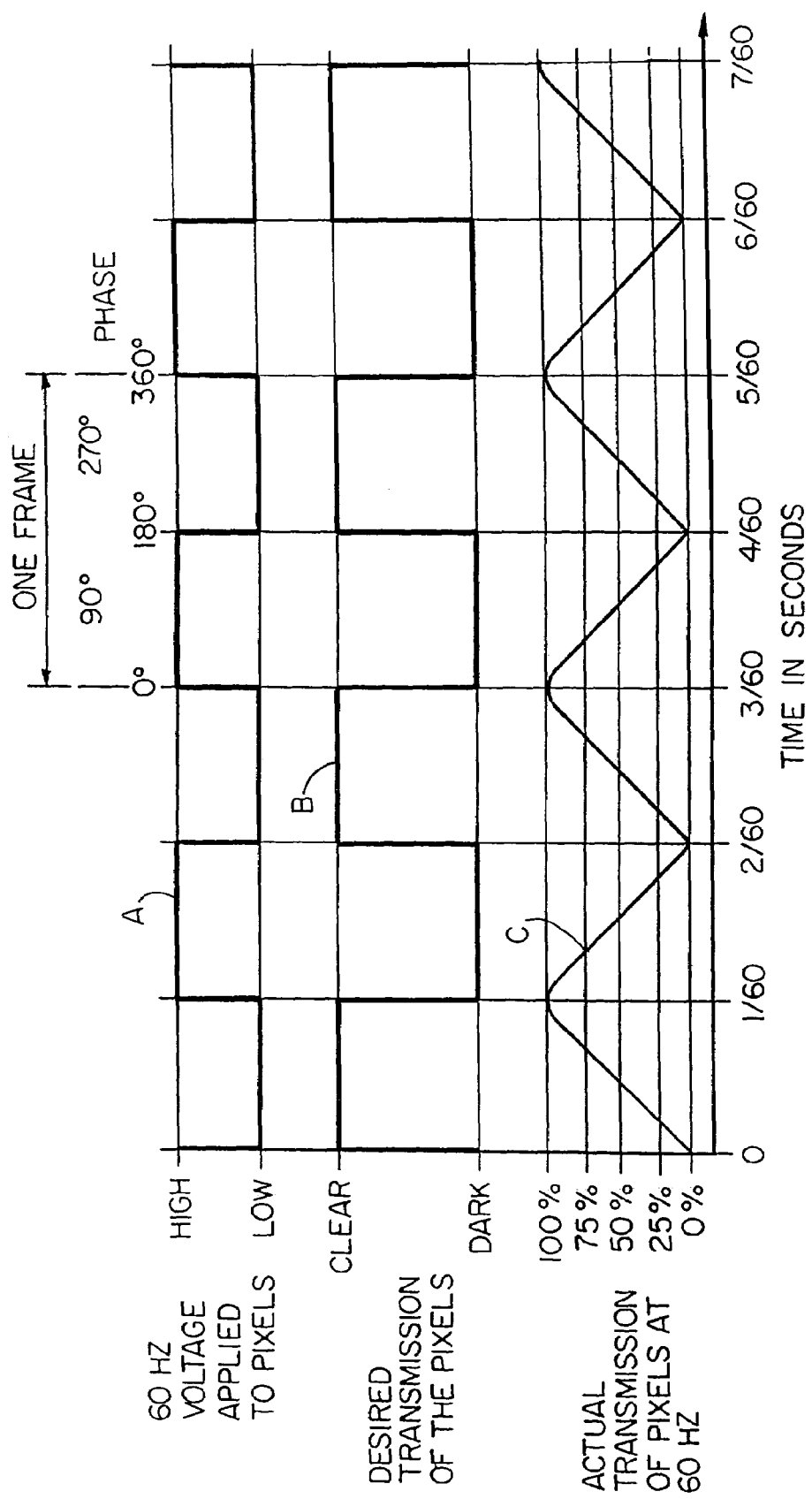
FIG. 44 is a compilation of graphs representing the response of a twisted nematic LCD display pixel when addressed at 60 Hz (Hertz)

Referring to FIG. 44, the top line A in the graph represents an electrical signal, namely the voltage applied to a given display pixel (sometimes referred to as picture element or component) as a function of time. The pixel may be a part of a twisted nematic type LCD, such as part of the display 724d, especially an active matrix LCD, although the pixel may be a part of some other type of display, optical device, etc. When the voltage is applied to an active matrix display, it results in an electric field being applied across the liquid crystal material causing a particular type of operation, e.g., alignment with respect to the field or when no field is applied relaxing to an alignment which may be influenced, for example, by the surfaces, surface coatings, etc., of the liquid crystal cell or device forming LCD. The voltage A illustrated in FIG. 44 is applied at a frequency of 60 Hz.

The second line B in FIG. 44 represents the desired light transmission characteristic of an ideal pixel as a function of time. In the illustrated example, the pixel is switched between clear (sometimes referred to as the white state) and dark (sometimes referred to as the black state). As illustrated, the clear state would occur when the voltage A is high, and the dark state would occur when the voltage A is high.

In the illustrated case of an ideal pixel in FIG. 44, the pixel switches transmission B from dark to clear at the same time the voltage switches from high to low. That is, the ideal pixel switches in phase with the applied voltage A. Furthermore, in the OLD or EDS 1, etc. (FIGS. 1, 2-6, 11-12, etc.) hereof (hereinafter referred to as EDS 1 for brevity although such reference includes the various embodiments of active and passive dithering systems disclosed herein), the position of the pixel changes by switching the voltage applied to the surface mode birefringent liquid crystal cell, optical switch or polarization rotator 11 (FIGS. 1, 5 and 6, for example). Therefore, it follows that in the ideal case, i.e., for use with the ideal pixel, the voltage applied to the optical switch 11 also would be switched synchronously with the voltage A applied to the ideal pixel and in phase.

However, a real liquid crystal display 20, 724d utilizing the twisted nematic effect cannot switch between transmission states as rapidly as indicated in the second line B of FIG. 44. For example, the active matrix liquid crystal display used in the Sony XC-M07 monitor can switch from dark to clear in about 20 milliseconds and from clear to dark in about 11 milliseconds. Switching time is defined conventionally as the time required for the transmission to change between 10% and 90% of the final values. This real switching behavior is illustrated in the third line C of FIG. 44. In this third line C depicting light transmission, the transmission of the clear state has been normalized to 100% and the transmission of the dark state has been normalized to 0%. It will be appreciated that the graph line C is schematic only, and the precise times mentioned above are not necessarily accurate.

Figure 45:
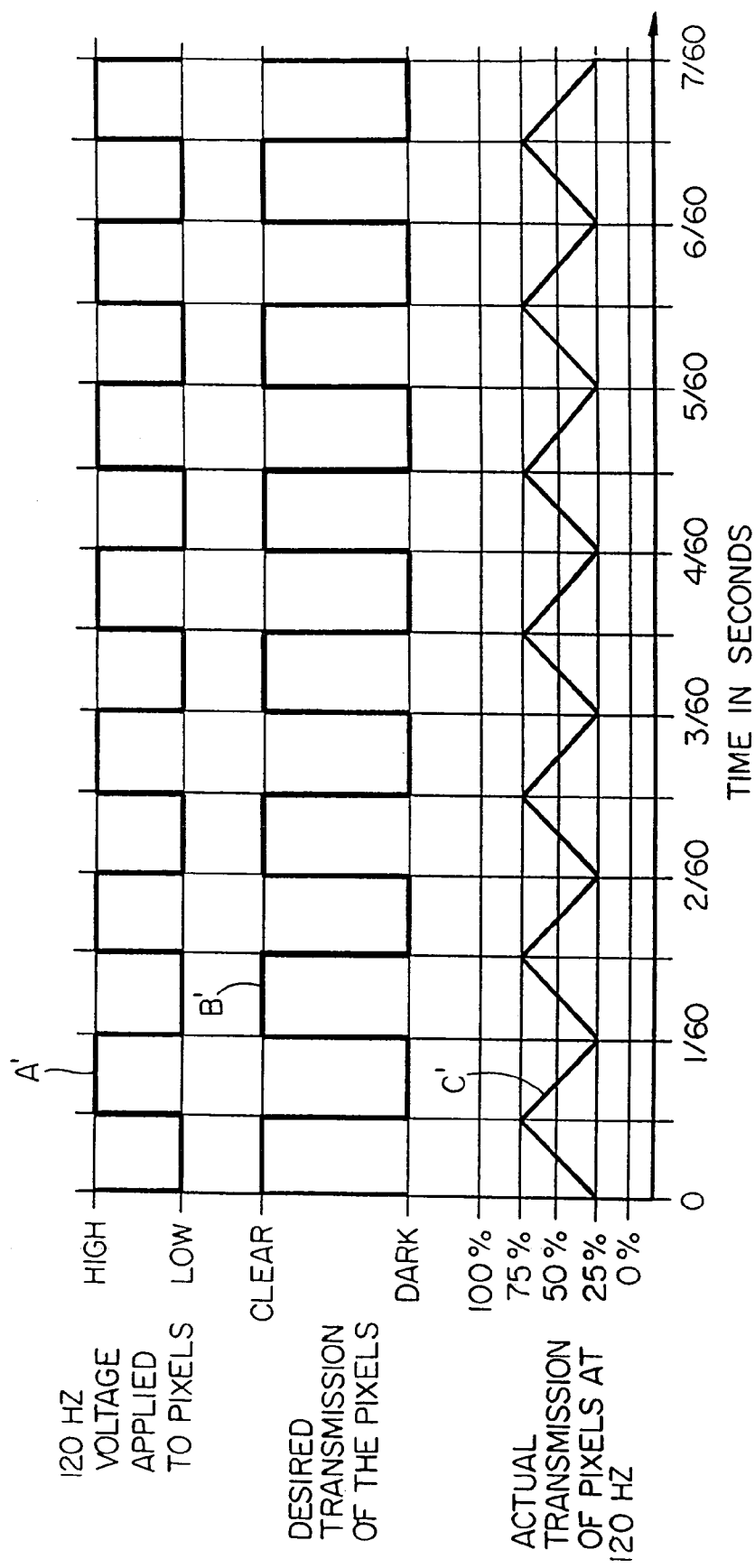
FIG. 45 is a compilation of graphs representing the response of a twisted nematic LCD display pixel when addressed at 120 Hz.

In FIG. 45 the graphs present information similar to that presented in the graphs of FIG. 44 except that in the graphs of FIG. 45 the frequency of the applied voltage A' to the pixel, e.g., of the display 724d, is doubled to 120 Hz. The transmission B' of the ideal pixel in FIG. 45 is shown synchronized and in phase with the applied voltage A'. However, the actual transmission C' of a real pixel is illustrated in the third line of FIG. 45. As is shown, within the available time of respective half cycles of the applied voltage A', the real pixel is able to switch transmission between about 25% and 75%. This means that the contrast ratio would be reduced by a factor of about one half ($\frac{1}{2}$) compared to the 60 Hz case of FIG. 44. This behavior is characteristic of many twisted nematic effect LCDs; starting at a modulation of about 60 Hz. every increase in the frequency of the applied voltage by a factor of two (2) usually results in a reduction in the contrast ratio by a factor of about one half ($\frac{1}{2}$).

Figure 46:
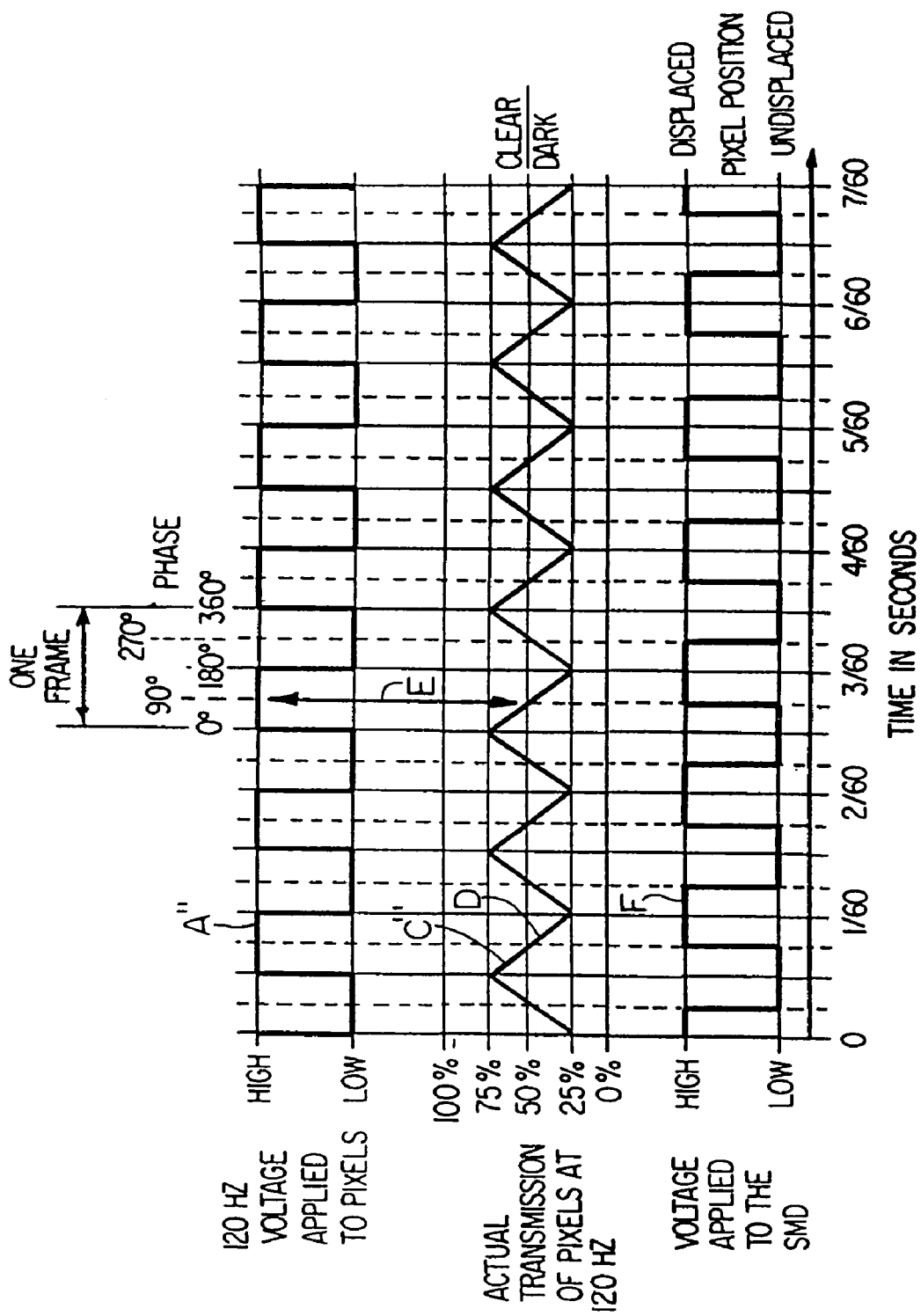
FIG. 46 is a compilation of graphs representing the response of a surface mode type birefringent liquid crystal light shutter operating as an optical rotator or switch coordinated with the operation of a twisted nematic LCD display pixel which is addressed at 120 Hz.

Referring to FIG. 46, line A" represents the applied voltage to the pixel at 120 Hz. The second line C" represents the transmission response of a real pixel of an active matrix twisted nematic LCD. Note that line C" is similar to line C' in FIG. 45. A guide line D has been drawn in the graph of line C" in FIG. 46 at 50% transmission. That portion of a particular frame, in which the real pixel is presenting an image of clear or dark, having a transmission greater than 50% is defined here as the clear state. That portion of the frame having a transmission less than 50% is defined here as the dark state. As seen, the real pixel does shutter light at 120 Hz but the transmission modulates between 25% and 75% rather than the 0% to 100% experienced when the frequency of the applied voltage signal A was 60 Hz. in FIG. 44.

Another feature of the 120 Hz response of the real pixel is shown in FIG. 46. Consider the point marked along the time scale by the double headed arrow E. The bottom part of the arrow E indicates the point in time that the transmission of the real pixel switches from dark to clear; the top of the arrow E indicates the corresponding applied voltage. It can be seen that the applied voltage A" is out of phase with the transmission characteristics of the pixel, i.e., when the real pixel switches between what is considered the clear state and the black state, by 90°.

In the present invention the EDS 1 may be adjusted to introduce a similar phase shift in the voltage F (FIG. 46) applied to the optical switch 11. An exemplary optical switch 11 is a surface mode birefringent liquid crystal cell. Such device usually can switch between states in response to a change in input signal much faster than does a twisted nematic liquid crystal cell or LCD. Therefore, by introducing the indicated phase shift in the driving of the surface mode liquid crystal cell and the twisted nematic LCD, the optical switch can be coordinated to switch optically at the same time that the LCD 724d, for example, switches optically from what is considered its clear state to what is considered its dark state or vice versa. As a result, as the EDS 1 operates in coordination with the LCD 724d, for example, to crispness or sharpness of the output image can be improved and there is less likelihood of a bleeding effect between images produced by pixels which are periodically optically shifted using the dithering principles of an OLD or the like.

After the phase of the surface mode liquid crystal cell optical switch 11 has been adjusted as described, the contrast of the display 724d would be reduced by a factor of about one half ($\frac{1}{2}$) when the display is optically doubled and one fourth ($\frac{1}{4}$) when the display is optically quadrupled. The decrease in contrast is due to the increased frequency at which the display liquid crystal cell (LCD) is driven, not due to the EDS or how it is driven. It has been found that the contrast reduction is nearly undetectable by the human eye and, therefore, has been found acceptable for many applications.

It will be appreciated that although the above description regarding FIGS. 44-46 presents phase shift of 90° for the indicated purpose, the principles of the invention may be used to introduce other phase shifts to achieve a similar coordination between two optical devices which have different response characteristics, such as, for example, change in light transmission or polarization as a function of change in electrical input, or other input, e.g., magnetic input.

Figure 47:
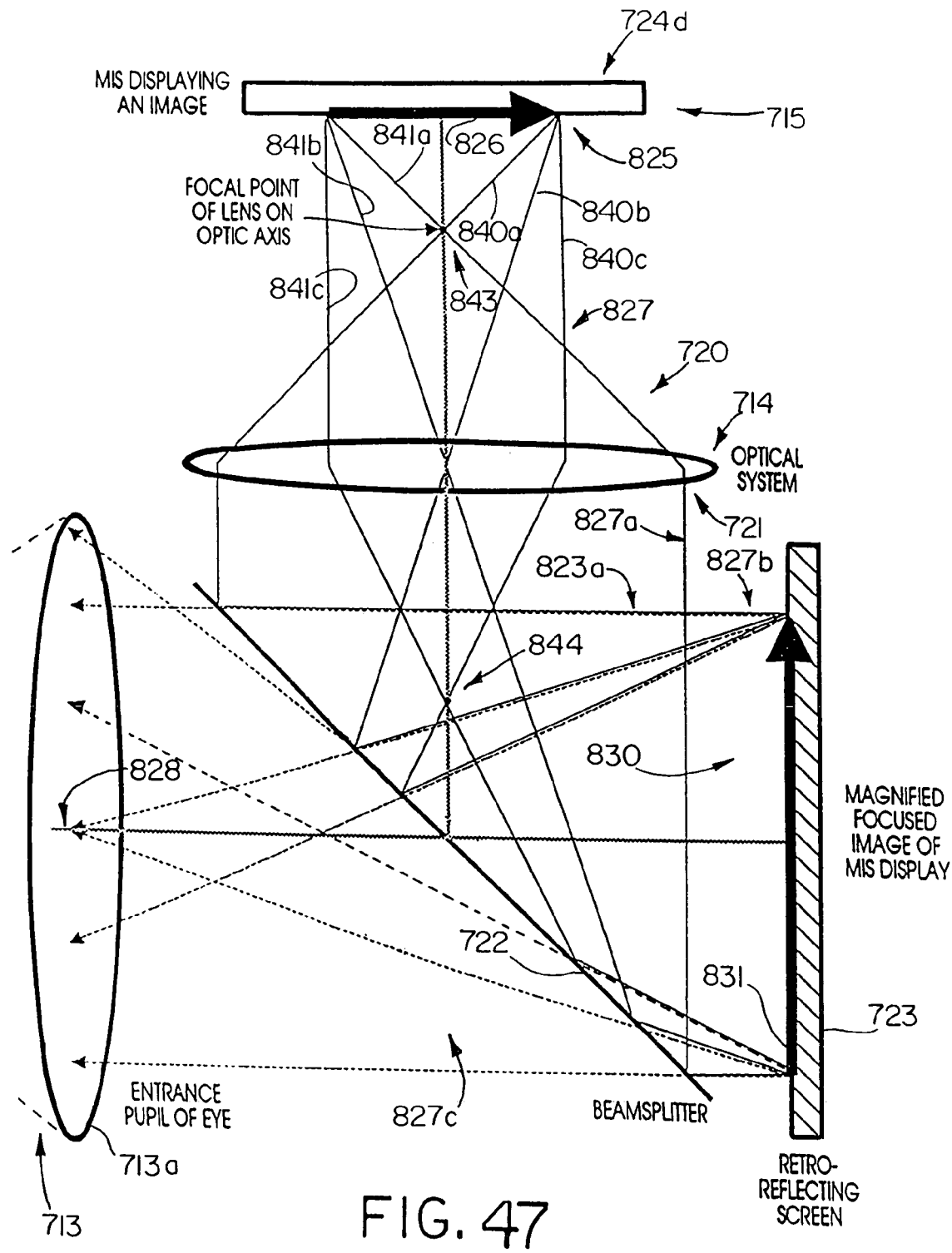
FIG. 47 is a schematic illustration of a display optical system used in the viewing device of FIGS. 42-43, for example, and/or in other viewing devices or display systems disclosed herein.

In FIG. 47 details of optical components of the optical system 714 of the display system 705 are shown. The optical components shown in FIG. 47 are similar to those included in the housing 705h of FIG. 43; however, in FIG. 47 the housing 705h and support 705m are not shown to facilitate illustrating the invention and to simplify the drawing.

The optical components 720 of the optical system 714 include focusing optics 721 (sometimes referred to simply as "lens" or as projection optics or as a projector), a beamsplitter 722 and retro-reflector 723. The display system 705 also may include an image source 715 (FIG. 43) which provides images or light having characteristics of an image and, if desired, may be part of the mentioned projector. An exemplary image source is a liquid crystal display, such as a small liquid crystal television having a cross-sectional display area on the order of about one square inch or less. As shown, the image source 715 includes a liquid crystal display 724d which modulates light from the light source 724i to form images for viewing by the eye 713. Alternatively, the image source may be separate and simply used to provide one or more images or light having image characteristics that can be provided by the viewing system 705, such as that shown in FIG. 1, or a head mounted display, sometimes referred to as HMD to the eye 713. Additional optical components of the optical system 714 may include linear polarizers, circular polarizers, wave plates, focusing elements, such as lenses or mirrors, prisms, filters, shutters, apertures, diaphragms, and/or other components that may be used to provide a particular type of output image for viewing by the eye 713. Examples of several embodiments using such additional optical components are described below with respect to other drawing figures.

The invention is useful with virtually any type of image source or display source. An example of such a display source is a compact flat panel display, and especially one utilizing a reflective liquid crystal display made from a single crystal silicon active matrix array.

In FIG. 47 the image source 715 displays an image 825, which is shown in the drawing as an arrow 826. The light 827 leaving the image source 724 represents an image or has characteristics of an image, and that light is collected by the focusing optics 721 of the optical system 714 of the display system 705 and travels to the beamsplitter 722. In FIG. 47 and in a number of the other drawing figures hereof the focusing optics 721 is represented as a single lens. However, it will be appreciated that the focusing optics 721 may include one or more other components, such as lenses, reflectors, filters, polarizers, wave plates, etc.

Although the image source(s) 715 is shown in FIG. 47 located relatively above the beamsplitter 722, the image source may alternatively be located below the beamsplitter as is shown in FIG. 2.

At least some of the light 827a incident on the beamsplitter 722 is reflected by the beamsplitter as light 827b toward the retro-reflector 723. The retro-reflector may be, for example, a screen made of retro-reflecting material. Exemplary retro-reflectors are well known. One example is that known as a corner reflector or a sheet having a plurality of corner reflectors. Another example is a material having plural glass beads or other refracting and/or reflecting devices on or in a support. An example of a retro-reflector is a film or sheet material having a plurality of corner cubes which material is sold by Reflexite Corporation of New Britain, Conn. Such material is available having about forty-seven thousand corner reflectors per square inch.

The light (light rays) 827c, which are shown as broken lines, are reflected by the retro-reflector 723 such that their path is exactly back along their direction of incidence on the retro-reflector. In this way some of the light rays 827c pass through the beamsplitter 722 and are directed toward a location in space designated 828 in the illustration of FIG. 47. The eye 713 of a viewer (person) can be placed approximately at location 828 to see the image, and the pupil and lens, individually and collectively designated 713a, of the eye, accordingly, are shown at that point. The lens 713a focuses the light incident thereon as an image on the retina of the eye 713.

The projection lens 720 projects light toward the retro-reflector 723 to cause a real image to be formed at the retro-reflector or in front or behind the retro-reflector. As is defined in Jenkins & White, *Fundamentals Of Optics*, McGraw-Hill, 1976, for example, using an exemplary projection lens, an image is real if it can be visible on a screen. The rays of light are actually brought to a focus in the plane of the image. A real image is formed when an object is placed beyond the focal plane of a lens; the real image is formed at the opposite side of the lens. If the object is moved closer to the focal plane of the lens, the image moves farther and is enlarged. In contrast, a virtual image occurs if an object is between the focal point of a lens and the lens itself.

In FIG. 47 the broken lines represent light rays which travel after reflection by the retro-reflector along the same or substantially the same path, but in the opposite direction to, respective incident light rays impinging on the retro-reflector. Thus, the retro-reflector 723 is part of a conjugate optics path 823a in which light incident thereon is reflected in the same path and opposite direction as reflected light. The beamsplitter 722 directs light from the focusing optics 721 into that conjugate optics path and toward the retro-reflector; and the beamsplitter also passes light in the conjugate optics path from the retro-reflector to the output port 16 (FIG. 2) for viewing by the eye 713. The beamsplitter 722 and retro-reflector 723 cooperate as a conjugate optics system to provide that conjugate optics path.

Using the described conjugate optics path and system, relatively minimal amount of the light from the image source 724 and focusing optics 721 is lost and, conversely, relatively maximum amount of light is directed to the eye 713. Also, there is substantial accuracy of image and image resolution conveyed to the eye. Furthermore, especially if a relatively good quality retro-reflector is used so that the precise location at which the image 830 is in focus will not be critical, e.g., it can be behind or in front of the retro-reflector, the tolerance required for the relative positioning of the components of the optical system 714 is less severe. This makes the HMD display system 705 relatively robust and reliable.

In FIG. 47 the viewed image 830 is represented by an enlarged arrow 831. Such arrow 831 is shown in FIG. 47 as a magnified focused image of the image 825 from the image source 724. The image 830 may be in focus at or approximately at the retro-reflector 723, and this is especially desirable for good quality images to be provided the eye 713 when a relatively low quality retro-reflector is used. A low quality retro-reflector is one which has relatively low resolution or accuracy of reflecting light in a conjugate manner in the same path but opposite direction relative to the incident light. With a low or poor quality retro-reflector and the image not being focused at the retro-reflector, it is possible that too much light may be lost from the desired conjugate optics path back to the eye 713, and this can reduce the quality of the image seen. However, the image 830 may be in focus at another location or plane either behind the retro-reflector (relative to the eye) or in front of the retro-reflector, and this is easier to do while maintaining a good quality image for viewing when the retro-reflector is a good quality one. The better the retro-reflector, the more self-conjugating is the optical system 714 and the less the need to focus with precision at the retro-reflector.

Retro-reflector quality may be indicated by the radians of beam spread of light reflected. For example, a relatively good quality retro-reflector may have from zero or about zero radians of beam spread to a few milliradians of beam spread. The quality usually is considered as decreasing in proportion to increasing beam spread of reflected light.

In considering the brightness of the image seen by the viewer, the nature of the beamsplitter 722 plays a role. The light produced by the image source 724 may be polarized or unpolarized. If the beamsplitter 722 is of a non-polarizing type, then a balanced situation is to have 50% of the light incident on the beamsplitter 722 be reflected and 50% transmitted. Thus, of the light 827a incident on the beamsplitter 722, 50% is reflected and sent toward the retro-reflector screen 723 as light 827b. Of the reflected light 827c from the retro-reflector 723, 50% of the light will be transmitted through the beamsplitter 722 and will travel to the viewer's eye 713. This configuration of the optical components 720 of the display system 705 can transfer to the viewer's eye a maximum of 25% of the light produced by the image source 724. If desired, the beamsplitter 722 can be modified in ways that are well known to change the ratio of the reflected light to transmitted light thereby. Also, the beamsplitter 722 may include an anti-reflection coating so that all or an increased amount of the image comes from one side of the beamsplitter and thus to reduce the likelihood of a double image.

Since the optical system 714 of the display system 705 provides good resolution of the image and maintains the characteristics thereof, the image source can be a relatively inexpensive one that does not have to compensate for substantial loss of image quality that may occur in prior display systems. Furthermore, since a relatively large amount of the light provided by the image source 724 is provided to the eye 713 for viewing, e.g., since the retro-reflector can virtually focus the light for viewing at the eye, additional brightness compensation for loss of light, as may be needed in prior display systems, especially portable, e.g., hand held or head mounted, ordinarily would not be required.

For exemplary purposes, in FIG. 47 three light rays 840a, 840b, 840c (collectively 840) originating at the tip of the arrow 826 constitute a portion of the light 827. Three light rays schematically shown at 841a, 841b, 841c (collectively 841) also are examples of light emanating at the tail of the arrow 826. The light 827 has characteristics of the image 825 from or provided by or at the image source 715, and represented by the exemplary light rays 840 and 841, is focused by the focusing optics 721 onto the retro-reflector 723. The size of the image 830 seen as the arrow 831 on the retro-reflector 723 depends on the focal length of the focusing optics 721 and the distances between the image source 724 and the retro-reflector 723 from the focal points 843, 844 of the focusing optics 721. Thus, magnification can depend on such focal length. The image source 715 should be located relative to the focusing optics 721 such that an image can be focused, e.g., in focus as is shown in FIG. 47, at or approximately at the retro-reflector. For example, the image source 715 may be beyond the focal point 843 of the focusing optics 721, and the retro-reflector likewise preferably is beyond the focal point 844 of the focusing optics so that the image can be focused at the retro-reflector.

In the illustration of FIG. 47 the image 830 on the retro-reflector 723 is magnified relative to the size of the image at the image source display 724d; it does not have to be magnified. The image 830 may be the same size as the image 825 or it may be smaller. Thus, although the image source display 724d may be relatively small and/or may provide a relatively small size image 825 at its output, the size of the image 830 viewed by the eye 713 may be different.

The optical system 714 is operable to place the image plane effectively at the retina of the viewer's eye 713. This is accomplished by effectively putting the plane of the eye lens (or pupil) 713a effectively at the position occupied by the focusing optics 721 relative to the source of the image provided to the focusing optics. In a sense the lens 721 is optically superimposed on the lens 713a of the eye 713.

The invention provides an optical system in which there are conjugate paths from a lens, such as focusing optics 714, which corresponds to the "lens means" of an optical sensor, e.g., the eye 713. Stated in another way, the invention presents visual information or optical data with a wide field of view by taking the output from a lens (focusing optics 721) and reflecting the light back along a conjugate path toward a location corresponding to that of the same lens which was in the original path, but actually direct that reflected light onto the eye placed at such corresponding location. This is obtained by using the conjugate optics arrangement disclosed herein.

The human eye is most comfortable when viewing an image at a distance of about twenty inches, approximately at the distance at which one would place a book, document, etc. to be read. It is desirable that the final image as seen by the viewer be located at such distance, e.g., approximately twenty inches from the pupil 713a of the eye. This can be accomplished in the manner, if desired, by adding an additional lens 717 (FIG. 43) or other optical system (not shown) between the beamsplitter 722 and the eye 713. Such lens may cause the person to see a virtual image behind the retro-reflector, as is described in several of the above patent applications. Although in many viewing devices further spacing between the eye and the optical component of the optical system nearest the eye may be desired to obtain desired eye relief, the use of the lens 717 at the indicated distance of about ½ to 1 inch from the eye usually is acceptable and reasonably comfortable because that is the approximate spacing of ordinary eye glasses to which people ordinarily relatively easily become accustomed.

The function of the lens 717 may be obtained by using a negative lens at the focusing optics 721.

Figure 14:
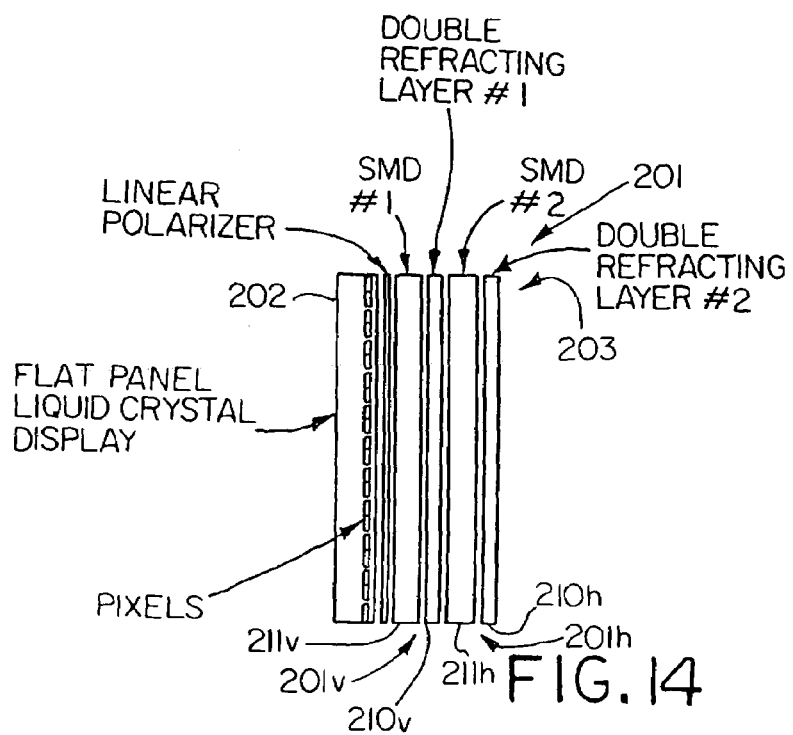

Referring to FIG. 14 an EDS 201 in the form of an electro-optical dithering system which includes two line doublers in optical series is shown used with a display 202, in the illustrated embodiment an LCD (although other types of displays can be used), as a display system 203. The display 202 and the EDS 201 may be substituted for the display 724d and EDS 1 in the display system 705 of FIGS. 42 and 43. The display 202 may include a light source or a separate light source 724i may be used to illuminate the display 202.

Figure 48:
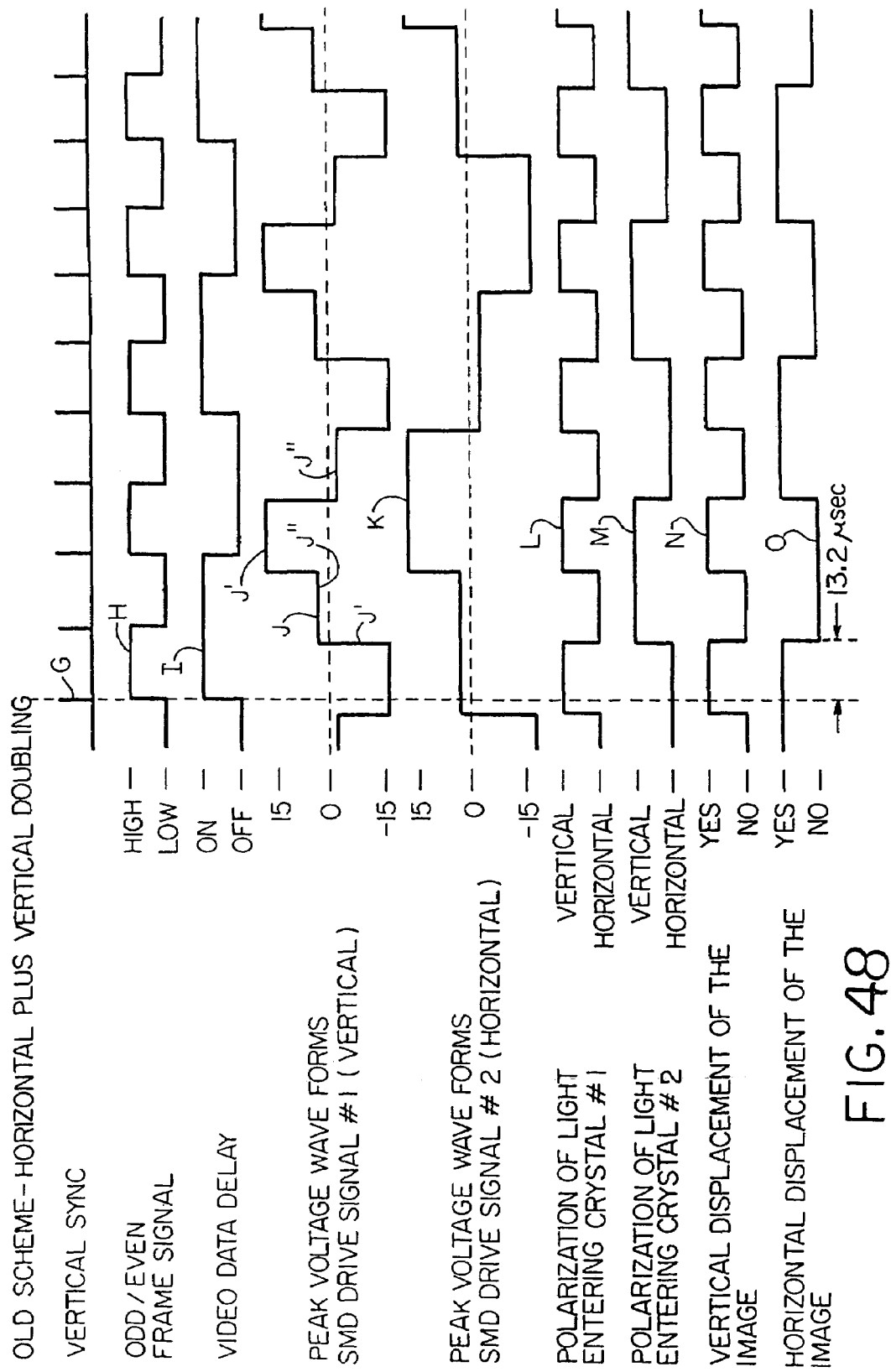
FIG. 48 is a compilation of graphs showing the relationship of timing signals for an optical line doubler system that provides both horizontal and vertical doubling (e.g., quadrupling of respective pixels), for example, as in the embodiment depicted in FIGS. 14-17.

FIG. 48 presents a number of graphs representing signals in the control system 729 for the display system 705 or display system 203 to present an image that is enhanced by optical dithering (optical line doubling, in fact quadrupling) and that is enhanced by the phase shifting of the invention as described herein. The respective signals are shown on a time scale presented on the "x" axis. Vertical sync pulses G from a conventional video signal used for driving a television, CRT, LCD, etc., are presented at periodic intervals, e.g., at a frequency of 60 Hz. (one pulse each about 16.67 milliseconds (ms)). An odd/even frame signal H also is presented; this signal is approximately a square wave having high and low half cycle portions, each half cycle occurring over a period of about 16.67 ms. The high portion of the frame signal represents an odd or even frame, and low represents the other frame. A video data delay signal I controls delivery of video data; high is on and low is off.

In the display system 203 there are two surface mode liquid crystal cells 211v, 211h, hereinafter sometimes abbreviated SMD (for surface mode device), which serve as respective polarization rotators or optical switches. It will be evident that other types of switches may be used. As is known, one type of operation of an SMD results in the SMD having two states, one in which it provides substantially no optical phase retardation of light, for example, zero or near zero, and one in which it provides a relative maximum amount of optical phase retardation, for example, 90 degrees, 45 degrees, etc., depending on the optical thickness of the SMD and/or on other properties of the particular SMD. Usually the minimum and maximum optical phase retardations are produced, respectively, when a respective relative maximum and minimum voltage is applied across the liquid crystal cell forming the SMD. Usually, the minimum voltage is a non-zero rms voltage which preconditions the liquid SMD crystal cell, sometimes referred to as biasing the SMD, to help maintain the alignment of the liquid crystal material in the maximum optical retardation condition. In one example, the preconditioning is provided by a constantly applied voltage in the "low voltage" or maximum optical retardation state. In another example, the precondition is provided by the effect of an rms voltage occurring as a result of periodically driving the liquid crystal cell with a voltage that varies between an instantaneous value of a maximum level and zero. In this case, the voltage is reapplied before the liquid crystal cell can relax fully. Other techniques for driving an SMD also may be possible.

As is seen in curve J, the voltage waveform applied to the SMD 211v (FIG. 14) varies at the extremes J' between −15 volts and +15 volts which provides minimal optical phase retardation (rotation of the plane of polarization). Portions J" of the voltage J also are at plus and minus a small voltage that is slightly above and below, respectively, the zero voltage level; these portions J" are the voltage of the SMD when it is in the maximum optical phase retardation condition (providing maximum rotation of plane of polarization).

Each portion J' and J" of the voltage J is the same duration as the respective half cycle of the odd/even signal H and the same duration as the time period between vertical sync pulses G. However, the phase of the voltage waveform J is shifted from the phase of the vertical sync G and odd/even frame signal H by an amount which is determined in the manner described above with respect to FIGS. 44-46, for example. That phase shift in the illustrated example is 13.2 milliseconds, as is evident from the scale at the bottom of FIG. 48. Waveform signal or voltage K in FIG. 48 is applied to the SMD 211*h* (FIG. 14). It varies only at one half ($\frac{1}{2}$) the frequency of the waveform J.

As an example of operation of the display system 203, which is not necessarily coordinated with the sequence of FIGS. 16A-16D, although producing the result of FIG. 17, incident plane polarized light is provided to and transmitted through the SMD's 211*h* and 211*v*, which are operated generally according to the waveforms J and K. Therefore, the polarization of light respectively entering the birefringent crystals, e.g., calcite or other birefringent material, 210*h*, 210*v* will vary generally in the manner depicted by curves L and M, which is synchronized and in phase or approximately in phase with the operation of the SMD's 211*h*, 211*v*. As light transmits through the respective birefringent crystals 210*h*, 210*v*, the location of the image from respective pixels of the display 202 will vary generally along the lines of the curves N and O. The description herein refers to direction, e.g., horizontal and vertical; it will be appreciated that such reference only is exemplary, and where vertical shifting or orientation is referred to, horizontal could be substituted, and vice versa.

The phase shifting for coordination of optical switching with an optical display, for example, as described above, also may be used in a display system that provides multicolor output with good contrast even though brightness or intensity of the output light is varied, for example, of the type disclosed in above-referenced patent application Ser. No. 08/187,163. Using such phase shifting in coordination with the liquid crystal display system of such patent application and/or with the dithering of others of the patent applications referenced above to provide a multicolor output can increase the resolution, sharpness and crispness of the viewed image, for example.

Figure 49:
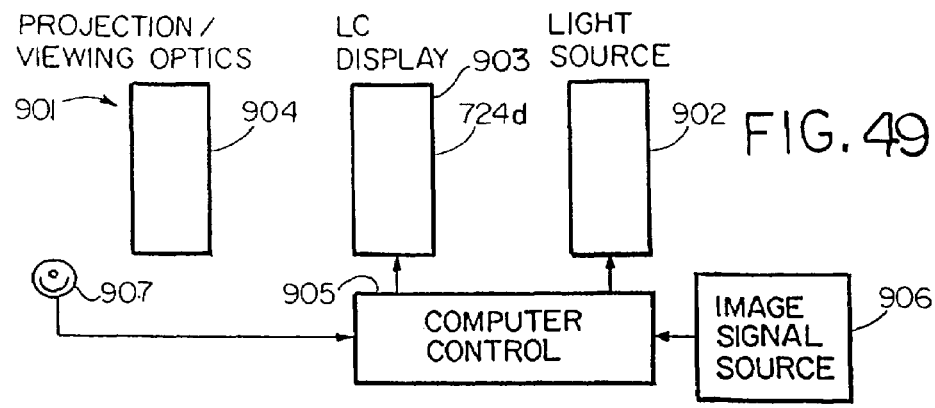
FIG. 49 is a schematic illustration of a light transmissive display system according to an embodiment of the invention.

Referring to FIG. 49, a light transmissive display system according to an embodiment of the invention is illustrated at 901. The display system 901 includes a light source 902, liquid crystal display 903, such as that shown at 724*d* in FIG. 43, optics 904, such as that shown at 14 in FIG. 43, for projection or viewing of the images created by the liquid crystal display, a computer control 905, such as the control 729 in FIG. 43, and an image signal source 906, which may be part of the control 905 or a separate source of video signals or other signals as may be appropriate. A photodetector 907 also may be included in the system 901.

The light source 902 may be one or more light emitting diodes, incandescent light source, fluorescent light source, light received via fiber optics or other means, a metal halide lamp, etc.

The liquid crystal display 903 may be a twisted nematic liquid crystal cell, a variable birefringence liquid crystal cell, a supertwist liquid crystal cell, or some other type or liquid crystal cell able to modulate light. The liquid crystal display 903 may include polarizers, wave plates, such as quarter wave plates or other wave plates, means for compensating for residual birefringence or for problems encountered during off axis viewing, etc. Other types of display devices which modulate light as a function of some type of controlled input can be used in place of the liquid crystal cell 903. Exemplary liquid crystal cells and display devices which may be used for the liquid crystal cell 903 are disclosed in U.S. Pat. Nos. 4,385,806, 4,436,376, 4,540,243, Re. 32,521, and U.S. Pat. No. 4,582,396, which disclose surface mode and pi-cell liquid crystal devices, and in concurrently filed, commonly owned U.S. patent application Ser. No. 08/187,050, entitled "Folded Variable Birefringence Liquid Crystal Apparatus."

The optics 904 may be one or more lenses separate from and/or included as part of the liquid crystal display for the purpose of providing an output image for viewing or for projection. If for viewing, such optics 904 may be one or more lenses which focus an image for close, e.g., as in a head mounted display of the heads up display type, virtual reality type or multimedia type, or far viewing, e.g., as in a slide viewer or a television. If for projection, such optics 904 may include projection optics which project an image formed by the display 903 onto a screen for transmissive viewing or reflective viewing.

The image signal source 906 may be a source of computer graphics signals, NTSC type television (video) signals, or other signals intended to produce an image on the display 903. Such signals are decoded in conventional manner by the computer control 905, for example, as is the case in many display systems, and in response to such decoding or deciphering, the computer control 905 (or some other appropriate control, circuit, etc.) operates the display 903 to produce desired images. If desired, the computer control 905 can operate the display 903 in sequential manner to produce multiple images in sequence while the display is being illuminated by only a single light source or color of light, e.g., a monochromatic type of operation. Exemplary operation of this type is summarized in the above '396 patent. Other exemplary types of operation of the computer control 905 include those employed in conventional liquid crystal display televisions of the hand-held or larger type and/or liquid crystal type computer monitors. Alternatively, the computer control can operate the display 903 in a field sequential or frame sequential manner whereby a particular image is formed in several parts; while one part is formed, the display is illuminated by light of one color; while another part is formed, the display is illuminated by light of a different color; and so on. Using this field sequential type operation, multicolor images can be produced by the display system apparatus 901.

In a typical input signal to a television or liquid crystal television, there is information indicating brightness of the light to be transmitted (or reflected) at a particular pixel. The computer control 905 is operative to compute the brightness information of a particular image or scene and in response to such computation to control the intensity or brightness of the light source 902. While intensity or brightness of the light source is controlled in this manner, the computer control 905 operates the liquid crystal display 903 to modulate light without having to reduce the number of pixels used to transmit light. Therefore, the full number or a relatively large number of pixels can be used to form the image or scene even if the brightness of the scene as controlled by the controlled light source is relatively dark.

Information coming through from the image signal source 906 may indicate various levels of illumination. There usually is a blanking pulse and a data line pulse. The computer control 905 can take the integral of the data line electrically or an integral of the whole set of data (from all of the data lines of the scene) or all of the pixels while electrically skipping the blanking. Based on that integral, the brightness of the light incident on the display 903 is controlled by the computer control 905. It will be appreciated that a person having ordinary skill in the art would be able to prepare an appropriate computer program to provide the integral functions and to use the results of such integration to provide brightness control for the light source 902.

From the foregoing, then, it will be appreciated that the apparatus 901, including the computer control 905, is operative to control or to adjust the brightness of a scene without degrading the contrast ratio. Thus, the same contrast ratio can be maintained while brightness of a scene or image is adjusted. For example, the same contrast ratio or substantially the same contrast ratio can be maintained by the apparatus 901, whether depicting a scene of a bright sunlit environment or of the inside of a dark cave. Therefore, the scene will have the appearance of illumination under natural illumination conditions.

The features of the invention described below can be used in virtually any passive display system.

Power requirements of the apparatus 901 can be reduced over prior display systems because the intensity of light produced by the source 902 is controlled to create dark images. In prior systems, though, the intensity of the light produced by the source was maintained substantially constant while the amount of light permitted to be transmitted through the passive display would be reduced to create a dark scene image.

In addition to controlling intensity of the light source 902 as a function of brightness of a scene, the computer control 905 also may be responsive to measurement or detection of the ambient environment in which the apparatus 901 is located. The brightness of such ambient environment may be detected by the photodetector 907. The photodetector 907 may be place in a room or elsewhere where the image created by the display 903 is to be viewed; and the brightness of the source 902 can be adjusted appropriately. For example, if the room is dark, it usually is desirable to reduce brightness of the source; and if the room is bright or the apparatus is being used in sunlight, the brightness of the source may be increased.

Figure 50:
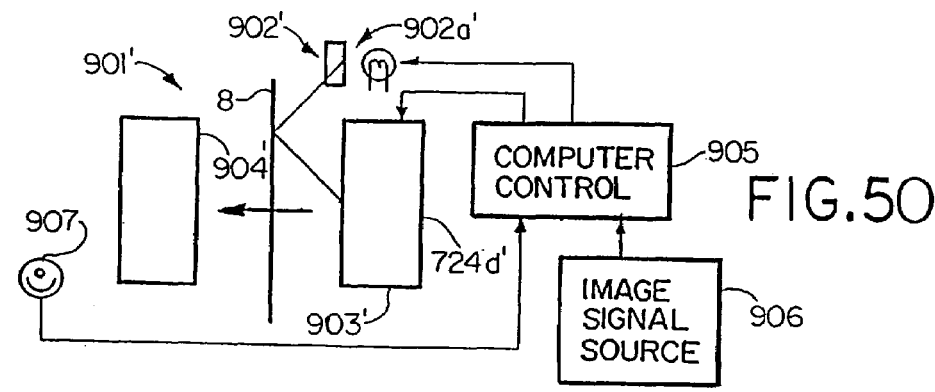
FIG. 50 is a schematic illustration of a light reflective display system according to an embodiment of the invention.

Turning to FIG. 50, a light reflective display system according to the invention is illustrated at 901'. The display system 901' includes a light source 902', liquid crystal display 903', optics 904' for projection or viewing of the images created by the liquid crystal display 903', a computer control 905', and an image signal source 906. A photodetector 907 also may be included in the system 901. The various parts of the display 903' and optics 904' may be the same or similar to those disclosed in the U.S. patent applications referred to above. The light source 902' and display 903' may be of the type disclosed in concurrently filed, commonly owned U.S. patent application Ser. No. 08/187,262, entitled "Illumination System For A Display."

For example, the light source 902' may include a source of circularly polarized light 902a' and a cholesteric liquid crystal reflector 908. The liquid crystal display 903' may be a reflective variable birefringence liquid crystal display device.

Full Color Frame Sequential Illumination System and Display.

Figure 51:
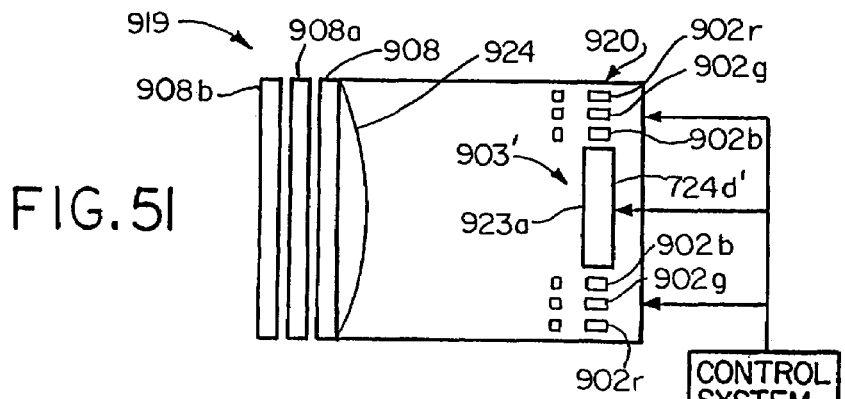
FIG. 51 is a schematic view of a reflective field sequential display and illumination system using plural cholesteric liquid crystal reflectors and plural light sources of respective colors to provide a multicolor or full color display useful in various embodiments of the invention.

Turning to FIG. 51 a full color display subsystem 919 including illumination system 920 is shown. However, in the display subsystem 919 the illumination system 920 includes several sources of light, each having a different wavelength. For example, three separate light sources 902r, 902g, 902b provide red, green and blue wavelength light, respectively, or light that is in respective wavelength bands or ranges that include red, green and blue, respectively. The light sources may be respective light emitting diodes or they may be other sources of red, green and blue light or other respective wavelengths of light, as may be desired for use in the display subsystem 919. The cholesteric liquid crystal reflector 908 is able to reflect green light; the reflector 908a is able to reflect red light; the reflector 908b is able to reflect blue light. Such reflection occurs when the circular polarization characteristic of the light is the same direction as the twist direction of the cholesteric liquid crystal material in the respective reflector. The reflectors 908, 908a, 908b are transparent to the other polarizations of incident light and to the other wavelengths of incident light.

The illumination system 920 is intended sequentially to illuminate the display 903', which may include a wave plate, such as a quarter wave plate, (or respective portions of the display) with respective wavelengths of light. For example, for a period of time the display 903' (or portion thereof) is illuminated with red light; subsequently illumination is by either green or blue light; and still subsequently illumination is by the other of green or blue light. Such sequential illumination may be carried out sufficiently rapidly so that respective red, green and blue images created by the display 903' when illuminated by the respective colors of light are output from the display subsystem 961 and are integrated by the human eye. As a result, the human eye effectively sees a multicolor image. Other examples of frame sequential switching to provide multicolor and/or full color outputs are known in the art. Various advantages inure to a frame sequential multicolor display, including the ability to provide high resolution with approximately one-third the number of picture elements required for a full color r, g, b display system in which respective pixels are red, green or blue.

The sequential delivering of red, green and blue light to the display 903' is coordinated by the control system 905 with the driving of the display 903'. Therefore, when a red image or a portion of a red image is to be produced by the display 903', it is done when red light is incident on the display 903'; and the similar type of operation occurs with respect to green and blue images.

If the respective light sources 902r, 902g, 902b are light emitting diodes, they may be sequentially operated or energized to provide light in coordination with the operation of the display 903' under direct control and/or energization by the control system 905. Alternatively, the control system 905 may be coordinated with whatever other means are used to provide the respective red, green and blue color lights of the light source.

Another example of frame sequential or field sequential operation of a displays subsystem like that shown at 961 herein is described in the above-referenced patent applications. Another example of field sequential operation is described in U.S. Pat. No. 4,582,396, which is mentioned above and incorporated by reference.

Figure 52:
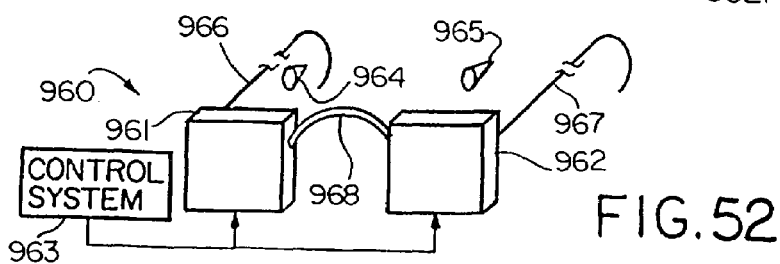
FIG. 52 is a schematic view of a head mounted display system including a pair of display subsystems in accordance with various embodiments of the invention.

Referring to FIG. 52, a head mounted display 960 includes a pair of display systems 961, 962 and a control system 705 for creating images intended to be viewed by the eyes 964, 965 of a person. The display systems 961, 962 may be positioned in relatively close proximity, for example, at approximately one inch distance, to the respective eyes 964, 965. A mounting mechanism, such as temple pieces 966, 967 and a nose bridge 968 may be provided to mount the display 960 on the head of the person.

The control system 905 in conjunction with the display systems 961, 962 are intended to create images for viewing by the eyes. Those images may be monochromatic. The images may be multicolor. The images may be two-dimensional or they may provide a three dimensional, stereoscopic effect. Stereoscopic effect viewing is obtained when the control system 905 operates the display systems 961, 962 to provide, respectively, right eye and left eye images that are sufficiently distinct to provide depth perception. Right eye, left eye imaging and depth perception are techniques used in some stereoscopic imaging and viewing systems which are commercially available.

The display systems 961, 962 may be identical. The control system 905 provides control and/or power input to the display systems 961, 962 to create images for display to the eyes 964, 965. The display 960 may be a head mounted display, such as a heads-up display, a virtual reality display, or a multimedia display. The control system 905 may be generally a control system of the type used in known head mounted displays to create such images. Such a control system may provide for control of color, light intensity, image generating, gamma, etc. The display systems 961, 962 may include focusing optics so as to focus the image created by the display systems for comfortable viewing, for example from a few inches up to a few feet in front of the eyes, say, from about 20 inches to about several feet in front of the eyes.

It will be appreciated that the features of the liquid crystal cell 903' may be used in the display 960 of the head mounted type. Also, features of the invention may also be employed in other types of display systems. One example is a display system that uses only a single display system of the type described herein. Such display system may be located in proximity to an eye for direct viewing. Alternatively, such display system may be used as part of a projection type display in which light from the display system is projected onto a surface where the image is formed for viewing. Various lenses and/or other optical components may be used to direct from the display system light to create an appropriate image at a desired location.

Figure 53:
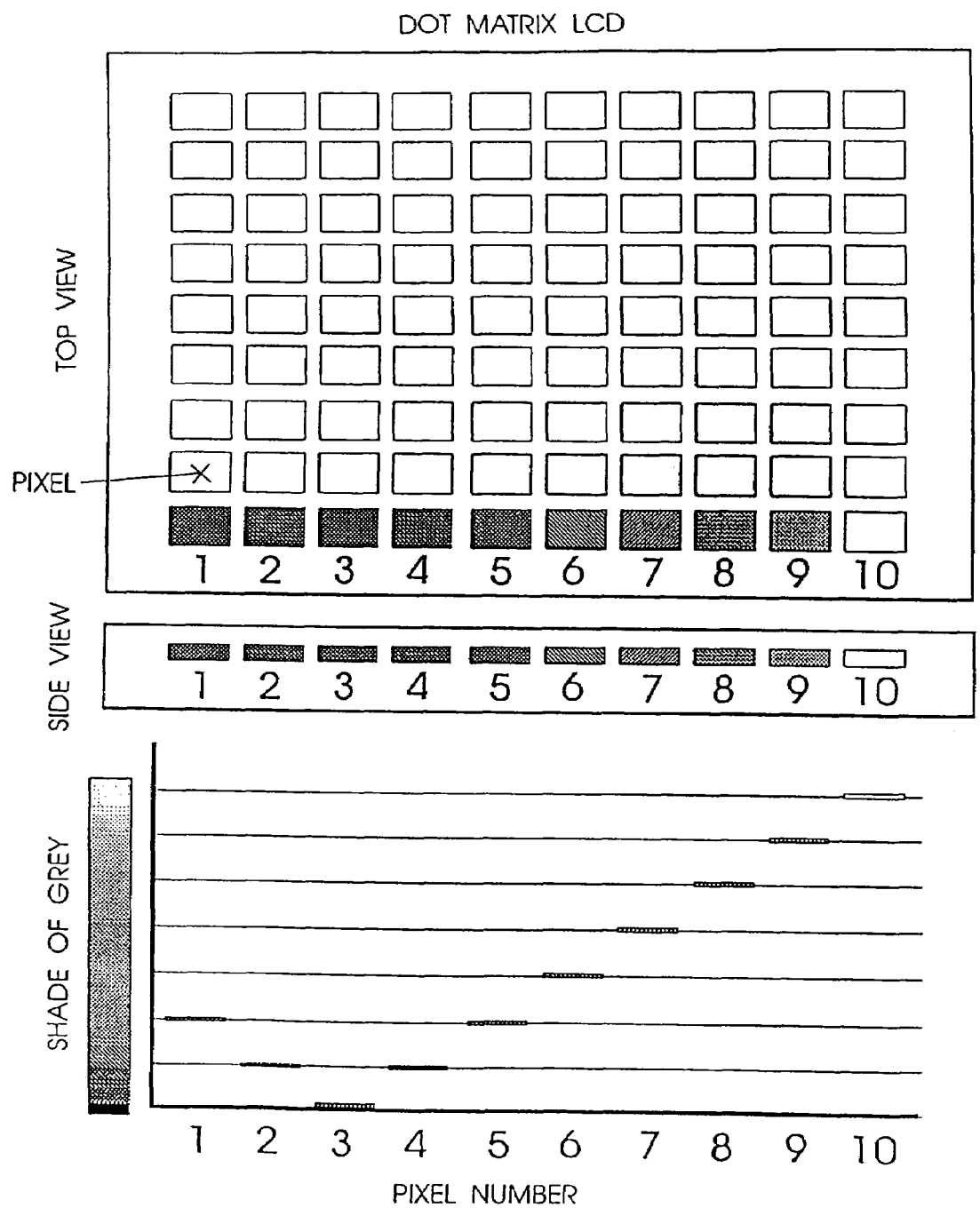

Turning to FIGS. 53-58, operation of the apparatus is described. In FIG. 53 a plan view of a dot matrix liquid crystal display is shown. The shade of grey measured at several pixels is indicated. According to the bottom graph in FIG. 53, the actual shade is shown; according to the dot matrix image at the side and top of FIG. 53, the actual shade of the pixel is shown. Thus, at location 1 on the graph at the bottom of FIG. 53, there is a shade 2. At location 2, there is a shade 1. At location 3 there is a shade 0, and so on. In pixel 1 marked in the top of FIG. 53, the pixel is a shade gray of 2; and at the adjacent pixel the pixel is a shade gray of 1, and so on. This is conventional. This would indicate the signals coming in to the computer control 905.

In FIG. 54, an example of a bright image scene produced by back light at a medium (normal) illumination level is illustrated at the top; the shades of gray are shown at the middle left; and the lamp light level is constant at the bottom left. The viewer sees a bright/low contrast image of a person as seen at the top right of the drawing. A side view of the display representing respective pixels and the gray levels thereof is shown at the bottom right of the figure.

FIG. 55 is similar to FIG. 54 again with average constant lamp light level. The average light level is produced; the average brightness output from the display is to be produced; and the viewer sees an average brightness high contrast image because all conditions are optimized.

Figure 56:
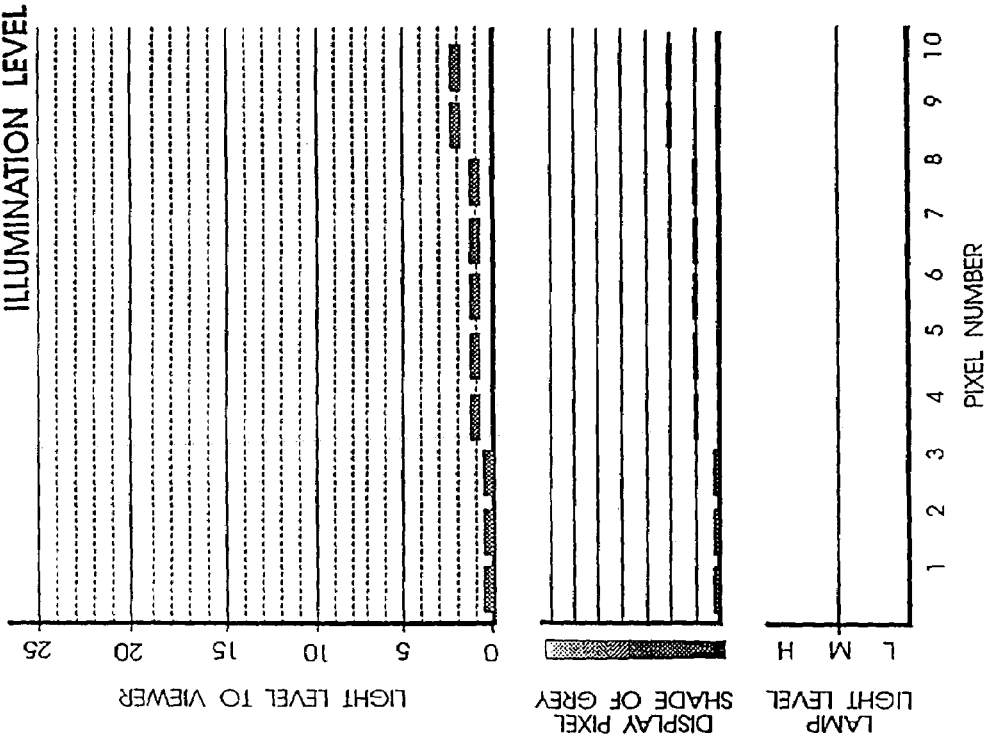

FIG. 56 is similar to FIG. 54 again with average constant lamp light level and a dark transmission provided by the liquid crystal cell; the viewer sees a dim low contrast image.

Figure 58:
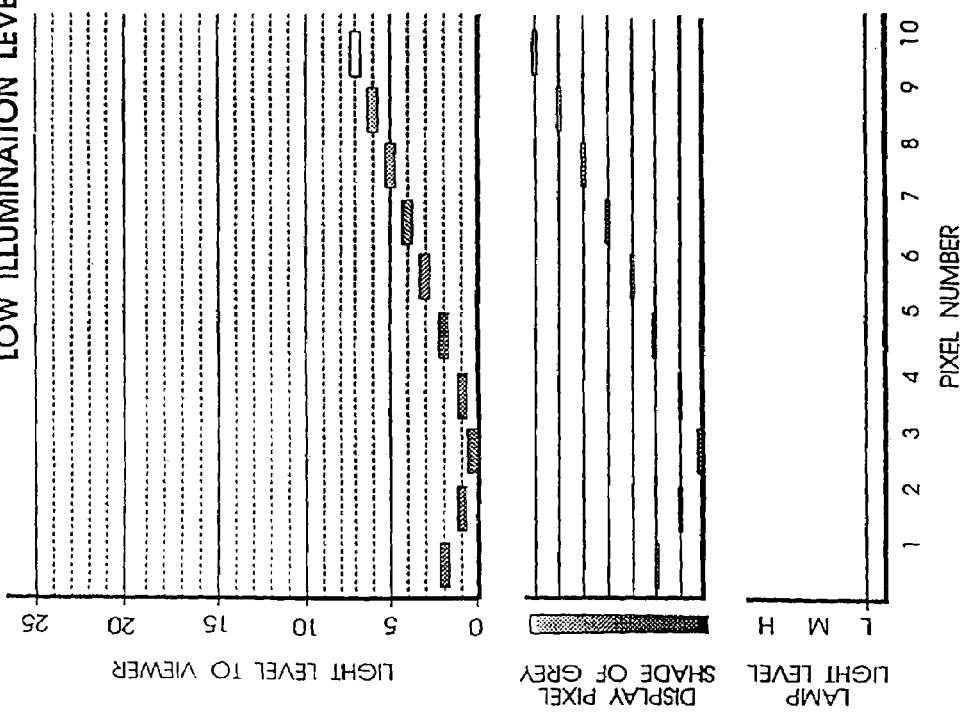

FIGS. 54-56 represent operation of a standard display apparatus. FIGS. 57 and 58 represent applying the principles of the present invention to develop high contrast images. In FIG. 57 it is seen that there is the intent to produce a wide range of gray levels; and this is possible by using a high intensity lamp level; the result is a bright high contrast image. In FIG. 58 it is intended that the viewer see a dim image; the same range of grey shades are provided as is depicted in the middle left graph of the drawing; but the lamp level is low. Therefore, there is a good contrast ratio provide to the viewer; from 0 to about 7 at the brightness level shown in the graph at the upper left of the drawing.

CHART I

| FRAME | FIELD | VOLT. SMD1 | POL DIR OUT1 | CALC1 SHIFT | VOLT SMD2 | POL DIR OUT2 | CALC2 SHIFT | ¼ × POL DIR OUT ÷ 2 | CALC3 SHIFT DOUBLES HORIZ PIXEL |
|---|---|---|---|---|---|---|---|---|---|
| 1 | 1 | Lo | H | None | Lo | V | None | H, V | X2 |
| 1 | 2 | Hi | V | Vert. Down | Hi | V | Non | H, V | X2 |
| 2 | 1 | Lo | H | None | Hi | H | Horiz. Right | H, V | X2 |
| 2 | 2 | Hi | V | Vert. Down | Lo | H | Horiz. Right | H, V | X2 |

The invention claimed is:

1. A method of displaying video images to improve dynamic range of both grey scale and color, wherein a display modulates input light from a light source capable of independently controlling intensity of color components of light to provide displayed images, comprising sensing the relative intensity of the red, green and blue components of an input signal; and adjusting the light source for color and intensity to recover the original relative brightness of the image without compromising image quality;

said sensing and adjusting being all in synchronization with the displayed video images.

2. A method of displaying video images to improve dynamic range of both grey scale and color, wherein a display modulates input light from a light source capable of independently controlling intensity of color components of light to provide displayed images, comprising sensing the relative intensity of the red, green and blue components of the an input signal;

optimizing the video signal for each color for contrast and/or resolution; and adjusting the light source for color and intensity to recover the original relative brightness of the image;

said sensing, optimizing and adjusting being all in synchronization with the displayed video images.

3. The method of claim 2, further characterized in that said adjusting the light source is carried out independently for different respective red, green and blue colors at video rates.

4. The method of claim 2, wherein the light source is comprised of respective light emitting diodes, and further characterized in that said adjusting the light source comprises independently adjusting respective diodes.

5. A method of controlling contrast of a display image of a display apparatus capable of displaying color within a predetermined grey range having a predetermined number of discrete shades of grey, wherein an input image signal uses a first number of discrete shades of grey that is less than the predetermined number of discrete shades of grey of the display apparatus in a range less than the predetermined grey range when an image corresponding to the input image signal is a bright image or a dim image, the display apparatus including an illuminating light source and a computer control, the method comprising:

processing brightness information and color information of the input image signal to determine the first number of discrete shades of grey; and changing the first number of discrete shades of grey to a second number of discrete shades of grey greater than the first number of discrete shades of grey while adjusting the amount of light from the illuminating light source if the input image is a bright image or a dim image.

6. The method of claim 5, wherein adjusting the amount of light from the illuminating light source comprises:

decreasing the amount of light if the image corresponding to the input signal is a dim image; and increasing the amount of light if the image corresponding to the input signal is a bright image.

7. The method of claim 5, further comprising displaying the image.

8. A method of controlling contrast of a display image of a display apparatus including an illuminating light source and a computer control, the method comprising:

processing brightness information and color information of an input signal and determining shades of grey used for the input signal using the computer control; and increasing the number of shades of grey used to display an image corresponding to the input signal while decreasing the amount of light if the image corresponding to the input signal is a dim image and increasing the amount of light if the image corresponding to the input signal is a bright image.

9. The method of claim 8, further comprising displaying the image.

10. A display device for displaying an image, comprising:

a display;

an illuminating light source;

a computer control, wherein the computer control receives an input signal including brightness and color information, determines shades of grey used for the input signal and increases a number of shades of grey used to display an image on the display corresponding to the input signal while increasing an amount of light from the illuminating light source if the brightness is high and decreasing an amount of light from the illuminating light source if the brightness is low.

11. A method of controlling contrast of a display image of a display apparatus including an illuminating light source and a computer control, the method comprising:

processing brightness information and color information and determining shades of grey used for an input signal using the computer control; and increasing the number of shades of grey used to display an image corresponding to the input signal while adjusting the amount of light if the image corresponding to the input signal is a dim image or a bright image.

12. The method of claim 11, further comprising displaying the image.

13. A display device for displaying an image, comprising:

a display;

an illuminating light source;

a computer control, wherein the computer control receives an input signal including brightness and color information, determines shades of grey used for the input signal and increases a number of shades of grey used to display an image on the display corresponding to the input signal while adjusting an amount of light from the illuminating light source if the brightness is high or if the brightness is low.

14. A display device for displaying an image, comprising:

a display;

an illuminating light source having a plurality of light sources of different colors;

a computer control, wherein the computer control receives an input signal including brightness and color information, determines shades of grey used for the input signal and increases a number of shades of grey used to display an image on the display corresponding to the input signal while increasing an amount of light from the illuminating light source if the brightness of the input image is high and decreasing an amount of light from the illuminating light source if the brightness of the input image is low.

15. The display device of claim 14, wherein the illuminating light source comprises a plurality of light source components of different colors where each color can be independently controlled.

16. The display device of claim 15, wherein the shades of grey for each component color of the backlight is determined for the input image and the shades of grey for each of the color components is independently increased for the display and decreasing or increasing the relative brightness of each of the component colors in the illuminating light source if the relative brightness of the component is dim or bright relative to the other component colors in the input image.

17. The display device of claim 15, wherein the light source components are light emitting diodes.

18. A method of displaying a color image, comprising:

providing light from an illuminating light source having at least three independently controllable colors to illuminate a display to display an image; and controlling contrast of the display image, using a computer control, by processing brightness information and color information and by determining shades of grey for each color used for an input signal; and independently by color component increasing the number of shades of grey used to display an image corresponding to the input signal while independently by color component decreasing the amount of light if the image corresponding to the input signal is a relatively dim image and independently by color component increasing the amount of light if the image corresponding to the input signal is a relatively bright image.

19. The method of claim 18, further comprising displaying the image.

20. A method of displaying a color image, comprising:
providing light from an illuminating light source having at least three colors to illuminate a display to display an image; and
controlling contrast of the display image, using a computer control, by processing brightness information and color information and determining shades of grey used for an input signal; and increasing the number of shades of grey used to display an image corresponding to the input signal while adjusting the amount of light if the image corresponding to the input signal is a relatively dim image or a relatively bright image.

21. The method of claim 20, further comprising displaying the image.

22. A method of controlling contrast of a display image of a display apparatus capable of displaying color within a predetermined grey range having a predetermined number of discrete shades of grey, wherein an input image signal uses a first number of discrete shades of grey that is less than the predetermined number of discrete shades of grey of the display apparatus in a range less than the predetermined grey range, the display apparatus including an illuminating light source and a computer control, the method comprising:
processing brightness information and color information of the input image signal to determine the first number of discrete shades of grey; and
changing the first number of discrete shades of grey to a second number of discrete shades of grey greater than the first number of discrete shades of grey while adjusting the amount of light from the illuminating light source.

23. The method of claim 22, further comprising displaying the image.

* * * * *

UNITED STATES PATENT AND TRADEMARK OFFICE
CERTIFICATE OF CORRECTION

PATENT NO. : 7,352,347 B2 Page 1 of 1
APPLICATION NO. : 10/983403
DATED : April 1, 2008
INVENTOR(S) : James L. Fergason It is certified that error appears in the above-identified patent and that said Letters Patent is hereby corrected as shown below:

In Column 1, line 13, replace "U.S. Pat. No. 6,154,969" with -- U.S. Pat. No. 6,184,969 --.

In column 41, line 21, replace "as pixels images r+" with -- as pixel images r" --.

Signed and Sealed this

First Day of July, 2008

JON W. DUDAS
*Director of the United States Patent and Trademark Office*